US009763478B2

(12) United States Patent
Cameron et al.

(10) Patent No.: US 9,763,478 B2
(45) Date of Patent: *Sep. 19, 2017

(54) ELECTRONIC VAPOR DEVICE IN COOPERATION WITH WIRELESS COMMUNICATION DEVICE

(71) Applicant: LUNATECH, LLC, Encino, CA (US)

(72) Inventors: John Cameron, Encino, CA (US); Dean Becker, Fairhope, AL (US); Gene Fein, Oxnard, CA (US)

(73) Assignee: LUNATECH, LLC, Encino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,588

(22) Filed: May 16, 2016

(65) Prior Publication Data

US 2016/0331035 A1 Nov. 17, 2016

Related U.S. Application Data

(60) Provisional application No. 62/162,639, filed on May 15, 2015.

(51) Int. Cl.
| | |
|---|---|
| G08C 19/16 | (2006.01) |
| A24F 47/00 | (2006.01) |
| G08C 17/02 | (2006.01) |
| H04M 1/725 | (2006.01) |
| F22B 1/28 | (2006.01) |
| F01K 5/00 | (2006.01) |
| H04Q 9/00 | (2006.01) |

(52) U.S. Cl.
CPC .......... *A24F 47/008* (2013.01); *A24F 47/002* (2013.01); *F01K 5/00* (2013.01); *F22B 1/28* (2013.01); *G08C 17/02* (2013.01); *H04M 1/72533* (2013.01); *H04Q 9/00* (2013.01); *G08C 2201/93* (2013.01)

(58) Field of Classification Search
CPC ........ A24F 47/008; A24F 47/002; F01K 5/00; H04Q 9/00; G08C 17/02; G08C 2201/93; H04M 1/72533; F22B 1/28
See application file for complete search history.

(56) References Cited

U.S. PATENT DOCUMENTS

| | | | |
|---|---|---|---|
| 7,978,564 B2 * | 7/2011 | De La Huerga | A61M 5/14212 |
| | | | 221/15 |
| 8,757,147 B2 | 6/2014 | Terry et al. | |
| 8,820,330 B2 | 9/2014 | Bellinger | |
| 8,851,083 B2 | 10/2014 | Oglesby et al. | |
| 8,955,522 B1 | 2/2015 | Bowen et al. | |
| 9,408,416 B2 | 8/2016 | Monsees et al. | |
| 9,413,181 B2 | 8/2016 | Ford | |

(Continued)

*Primary Examiner* — Erin File
(74) *Attorney, Agent, or Firm* — Hankin Patent Law, APC; Marc E. Hankin; Susan L. Mizer

(57) ABSTRACT

An apparatus is disclosed comprising a vapor output, a container for storing a vaporizable material, a vaporizer component coupled to the container, configured for vaporizing the vaporizable material to create a vapor and expelling the vapor out the vapor output, a processor, coupled to the vaporizer component, configured to control the vaporizing of the vaporizable material, and an input/output connector, coupled to the processor, configured for coupling to an electronic communication device to exchange one or more of power and data.

20 Claims, 26 Drawing Sheets

(56) References Cited

U.S. PATENT DOCUMENTS

| | | |
|---|---|---|
| 9,498,002 B1 | 11/2016 | Soreide |
| 9,585,981 B2 | 3/2017 | Wynalda, Jr. |
| 2007/0042792 A1 | 2/2007 | Perfetto et al. |
| 2009/0255534 A1* | 10/2009 | Paterno ............. A61M 15/0028 128/203.21 |
| 2013/0298905 A1* | 11/2013 | Levin .................... A24F 47/008 128/202.21 |
| 2014/0366898 A1* | 12/2014 | Monsees ............... A24F 47/008 131/329 |
| 2015/0027473 A1* | 1/2015 | Graf ........................ F22B 1/288 131/329 |
| 2015/0080053 A1 | 3/2015 | Ciccarello et al. |
| 2015/0136158 A1* | 5/2015 | Stevens ................. A24F 47/008 131/329 |
| 2015/0161883 A1 | 6/2015 | Satgunam |
| 2015/0242932 A1* | 8/2015 | Beguin ............. G06Q 30/0633 705/26.8 |
| 2016/0157524 A1* | 6/2016 | Bowen .................. A24F 47/008 128/200.14 |
| 2016/0286860 A1* | 10/2016 | Flayler .................. A24F 47/008 |
| 2016/0354561 A1* | 12/2016 | McCullough ..... A61M 15/0066 |
| 2016/0371437 A1* | 12/2016 | Alarcon ................. G06Q 50/24 |

\* cited by examiner

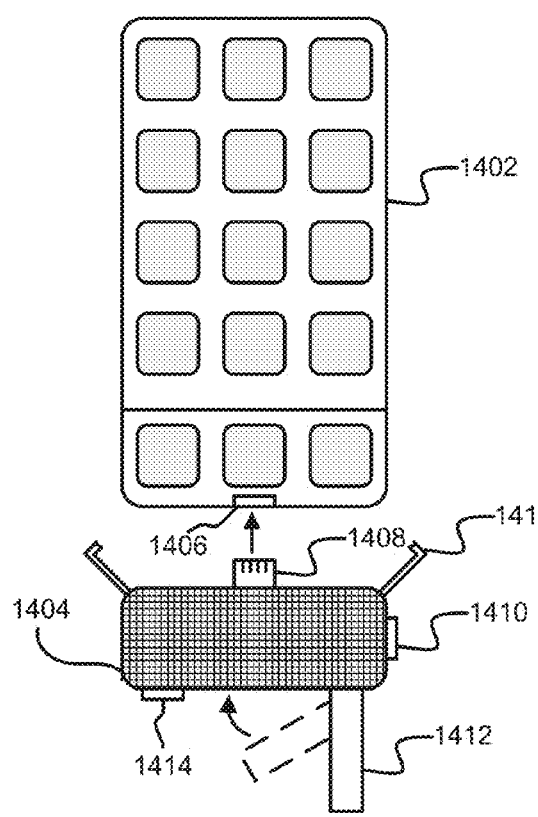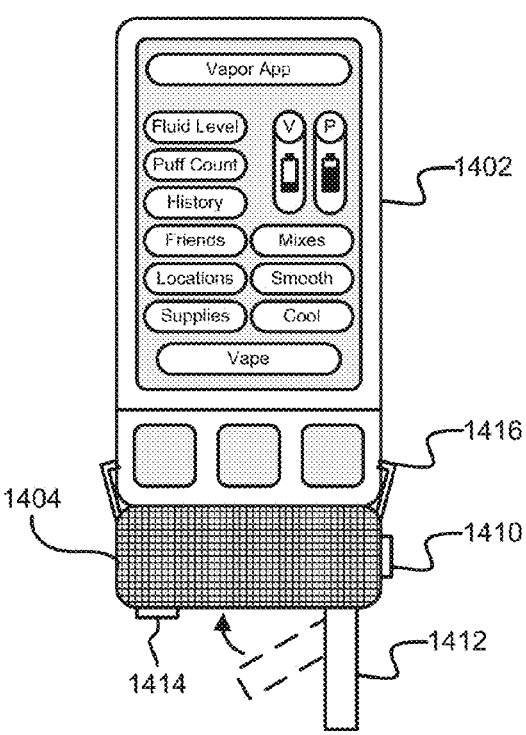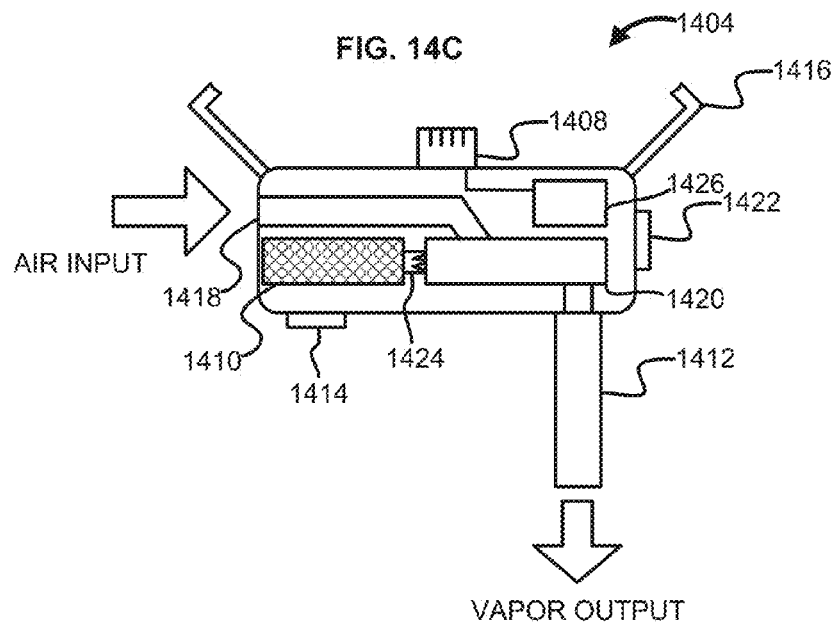

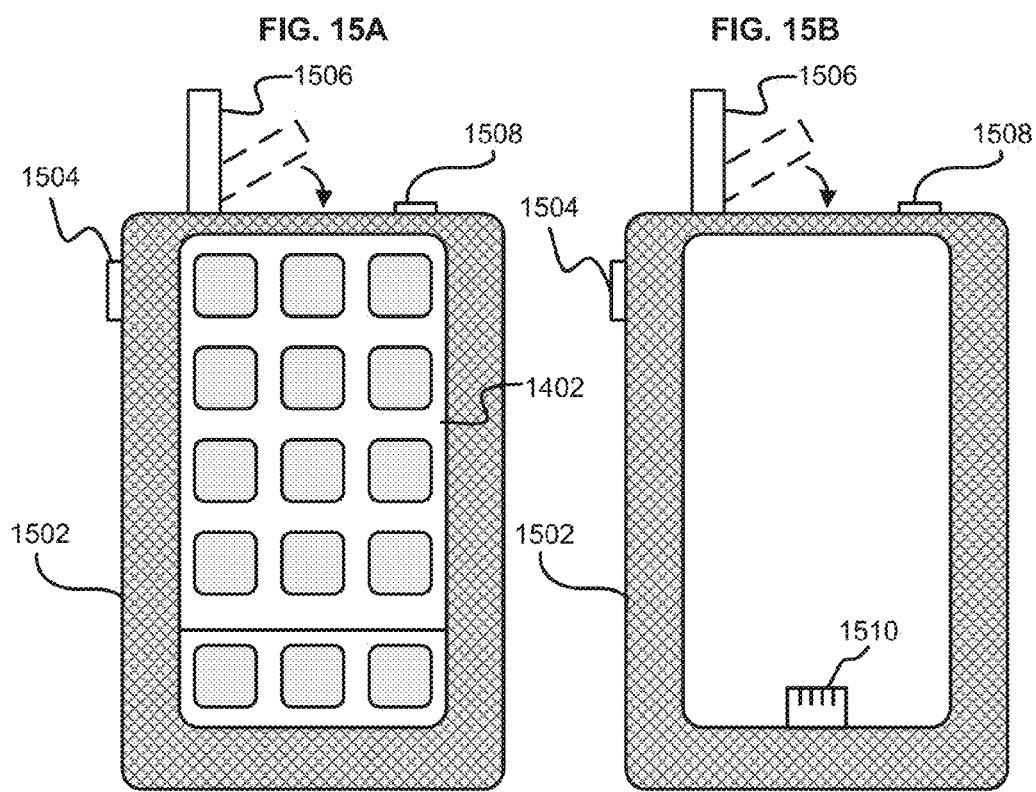

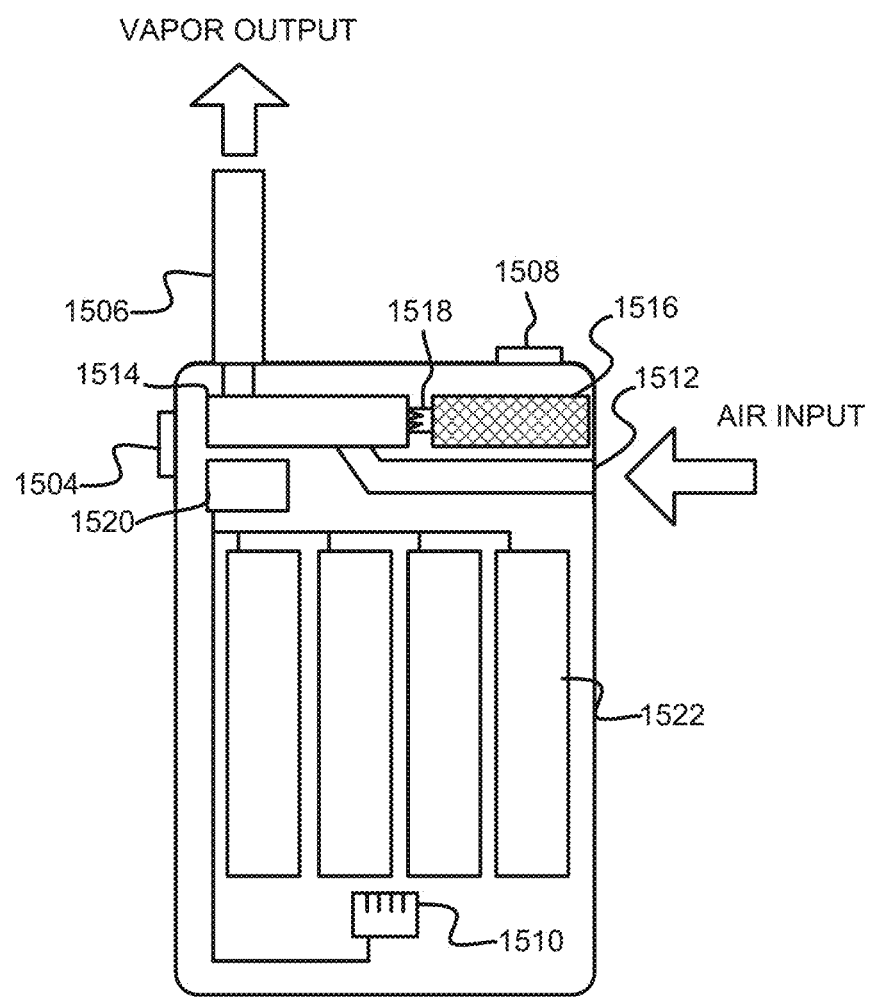

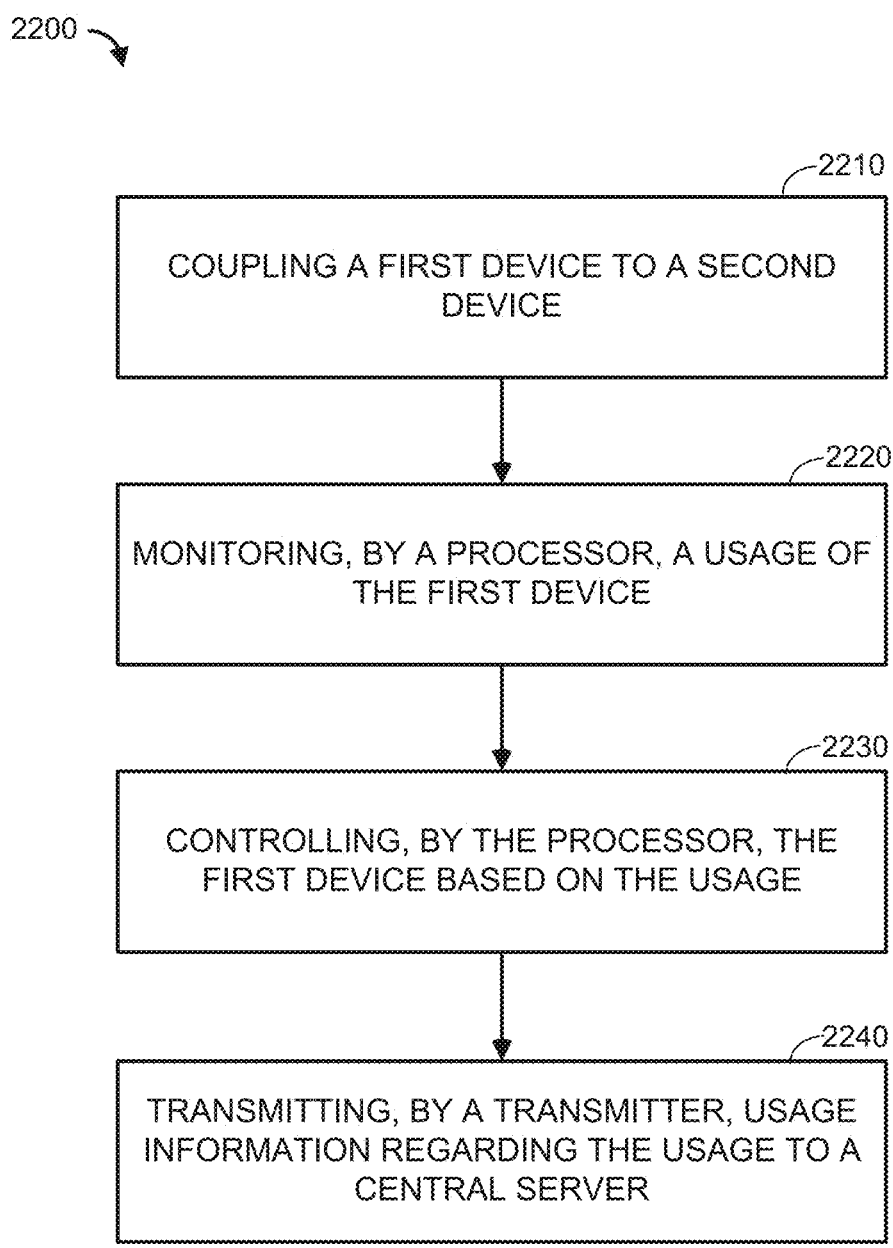

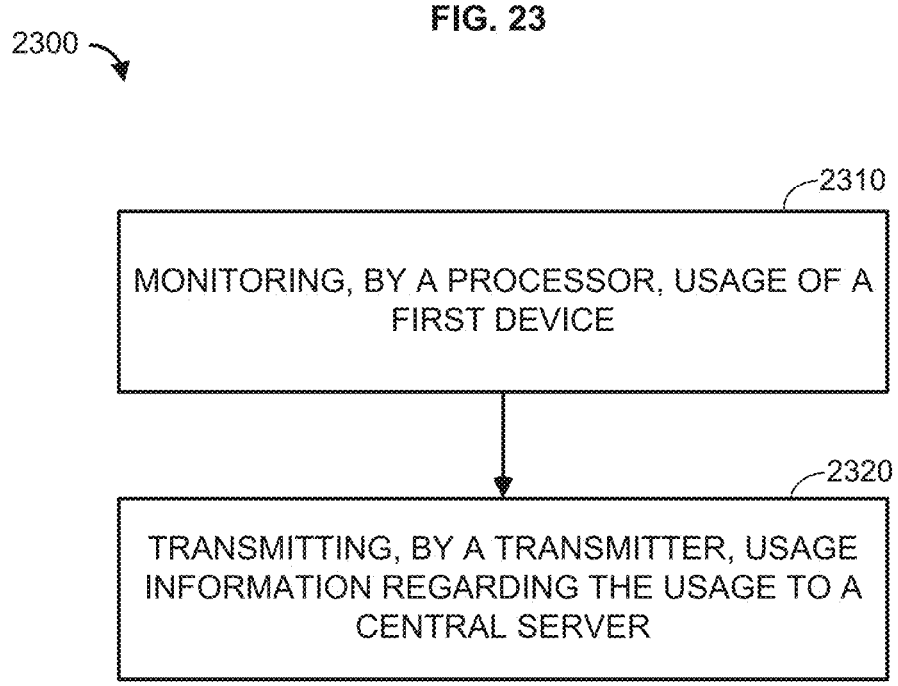

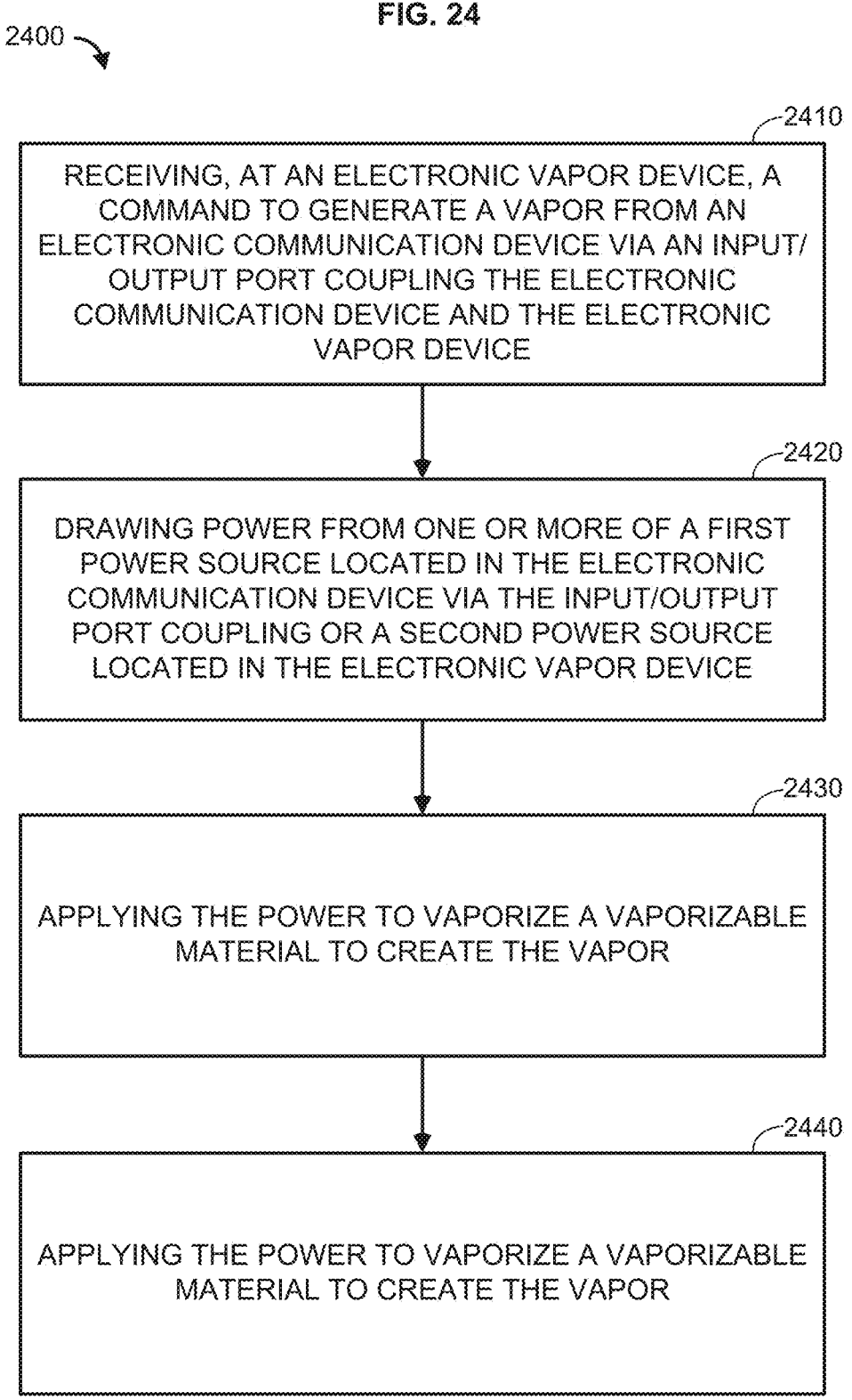

ELECTRONIC VAPOR DEVICE IN COOPERATION WITH WIRELESS COMMUNICATION DEVICE

CROSS REFERENCE TO RELATED PATENT APPLICATION

This application claims priority to U.S. Provisional Application No. 62/162,639 filed May 15, 2015, incorporated herein by reference in its entirety.

BACKGROUND

Various types of personal vaporizers, also called vapor or vaping devices for short, have been known in the art for many years. In general, such vaporizers are characterized by heating a solid to a smoldering point, vaporizing a liquid by heat, or nebulizing a liquid by heat and/or by expansion through a nozzle. Such devices are designed to release aromatic materials in the solid or liquid while avoiding high temperatures of combustion and associated formation of tars, carbon monoxide, or other harmful byproducts. Preferably, the device releases a very fine mist with a mouth feel similar to smoke, under suction. Thus, a vaporizing device may be made to mimic traditional smoking articles such as cigarettes, cigars, pipes and hookahs in certain aspects, while avoiding significant adverse health effects of traditional tobacco or other herbal consumption.

Personal vaporizers have risen in popularity, and nearly every person who uses one also owns and uses a smartphone, notepad computer, palm computer, or similar compact wireless communications device. However, users do not have opportunities to use their wireless communications devices to enhance operation of their personal vaporizers, or to use their personal vaporizers to enhance operation of their wireless communications devices.

It would be desirable, therefore, to develop new technologies for using a vaporizing device with a modern electronic communication device, that overcomes these and other limitations of the prior art, and enhances it by linking users together based upon common usage of vaporizing or nebulizing devices.

SUMMARY

It is to be understood that both the following general description and the following detailed description are exemplary and explanatory only and are not restrictive. An apparatus is disclosed comprising a vapor output, a container for storing a vaporizable material, a vaporizer component coupled to the container, configured for vaporizing the vaporizable material to create a vapor and expelling the vapor out the vapor output, a processor, coupled to the vaporizer component, configured to control the vaporizing of the vaporizable material, and an input/output connector, coupled to the processor, configured for coupling to an electronic communication device to exchange one or more of power and data.

A system is disclosed comprising an electronic vapor device comprising, a vapor output, a container for storing a vaporizable material, a vaporizer component coupled to the container, configured for vaporizing the vaporizable material to create a vapor and expelling the vapor out the vapor output, a first processor, coupled to the vaporizer component, configured for controlling one or more functions of the electronic vapor device, an input/output connector, coupled to the first processor, configured for coupling to an electronic communication device, and an electronic communication device, comprising, an input/output port, coupled to the input/output connector of the electronic vapor device, and a second processor, configured for controlling one or more functions of the electronic communication device, and a user input interface for controlling the one or more functions of the electronic vapor device.

A method is disclosed comprising receiving, at an electronic vapor device, a command to generate a vapor from an electronic communication device via an input/output port coupling the electronic communication device and the electronic vapor device, drawing power from one or more of a first power source located in the electronic communication device via the input/output port coupling or a second power source located in the electronic vapor device, applying the power to vaporize a vaporizable material to create the vapor, and expelling the vapor through an exhaust port of the electronic vapor device.

Additional advantages will be set forth in part in the description which follows or can be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The features, nature, and advantages of the present disclosure will become more apparent from the detailed description set forth below when taken in conjunction with the drawings, in which like reference characters are used to identify like elements correspondingly throughout the specification and drawings.

FIG. 14A illustrates an exemplary vaporizer apparatus;

FIG. 14B illustrates an exemplary vaporizer apparatus;

FIG. 14C illustrates an exemplary vaporizer apparatus;

FIG. 15A illustrates an example vaporizer apparatus;

FIG. 15B illustrates an example vaporizer apparatus;

FIG. 15C illustrates an example vaporizer apparatus;

FIG. 22 illustrates an example method;

FIG. 23 illustrates an example method; and

FIG. 24 illustrates an example method;

DETAILED DESCRIPTION

Figure 1:
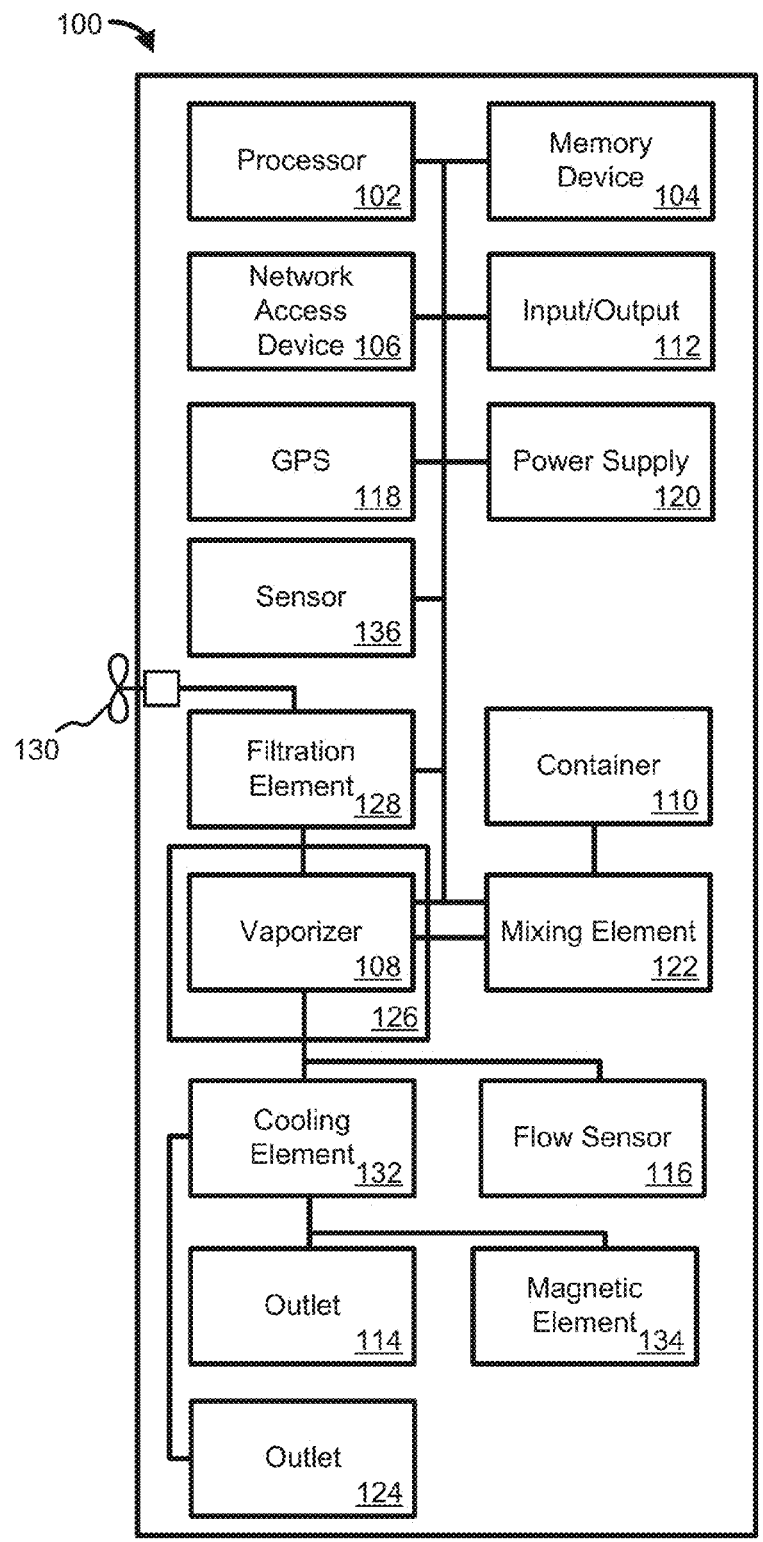
FIG. 1 illustrates a block diagram of an exemplary electronic vapor device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges can be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions can be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Various aspects are now described with reference to the drawings. In the following description, for purposes of explanation, numerous specific details are set forth in order to provide a thorough understanding of one or more aspects. It can be evident, however, that the various aspects can be practiced without these specific details. In other instances, well-known structures and devices are shown in block diagram form in order to facilitate describing these aspects.

While embodiments of the disclosure are directed to vaporizing devices, it should be appreciated that aspects of the technology can be adapted by one of ordinary skill to nebulizing devices designed to produce an inhalable mist or aerosol.

In an aspect of the disclosure, a vapor device is coupled to and may work cooperatively ("symbiotically") with an electronic (e.g., wireless) communication device. Coupling may be performed for a temporary duration, or permanently. The coupling may enable the convenient use of one or more vapor device via the electronic communication device, and enhance electronic and computing resources available to the vapor device(s). Such enhancement and shared resources may include but are not limited to electrical power, communications bandwidth, data, applications, processing bandwidth, memory, graphics processing, sensor capability, communications technology (e.g., access to Wi-Fi or other network), user interface display, light, camera, microphone, or other ancillary equipment. Conversely, the vapor device(s) via the coupling can enhance the resources available to the communication device, including but not limited to sensor capability, data, applications, sensory output modes, and communications technology. Other conveniences include the simultaneous use of both devices and the data gathering and dissemination ability of the electronic communication device to capture and share incoming and outgoing data and other resources between the electronic vaporization device and the vapor device. Sharing of application resources may include, for example, messaging and chat functions, access control functions, interface functions, and e-commerce functions, for example shopping, purchase and payment functions. Data sharing may include, for example, exchange of registrations, encryptions, user data, messaging third party communications, usage information, biographical information, recommendations, third party information, billing and verification, charging, system gauges and efficiency settings, alerts, visual information and functions, and audio information.

The vapor device(s) may operate independently of the communication device, with limited resource sharing such as data and power. In an alternative, or in addition, the vaping device(s) may be utilized in unison. For example, a vapor device may be configured to operate as a slave or terminal of the communication device, or vice versa. In an alternative, the vapor device and the communication device may be configured to operate as peer devices. In unison, the devices may exchange information and the data from one device may be utilized and synthesized from the other including not only data available on the instant devices but also data available from sources external to the instant devices via data ports or wireless communication systems to enable a robust set of communication and interface potentialities. In summary the disclosure describes systems, methods and devices for physically and/or communicatively linking an electronic vapor device with an electronic communication device, wherein the devices function symbiotically or cooperatively with each other.

Various automatic registration systems having monitoring modules may be adapted to communicate between the vapor device/communication device symbiotic pair and remote sites. Devices at one or more locations may interface with the monitoring modules. Advantageously, the vaping device or the symbiotic pair devices do not need to be registered. Instead, their participation with local or remote monitoring may be transient, without disabling use of monitoring data. For example, monitoring data may be used to generate recommendations during use, and after use may be automatically purged from the system to maintain device anonymity and protect the privacy of the user.

The vaping device(s) and the electronic communication system may be coupled wirelessly or using a wired connection, in either case with or without a physical coupling other than for communication in the case of a wired coupling. If a physical coupling is used, each vaping device devices may be may be coupled to the communication devices by at least one of a magnet, a clip, a physical weld, a screw in component a male/female connector, a zipper, Velcro, a third party agent, snap in lock, a key lock, a combination lock, a spiral brace, a spiral lock, a flexible screw or tier system which locks and unlocks at multiple tiers, an oscillating or telescopic click, twist, slide, grasp, pull push, fluid lock, pressure lock, temporary adhesive, permanent adhesive, brace, tooth locking mechanism. A locking mechanism may be controlled by at least one of voice profile module, password or passcode module, physical key, fingerprint scanner, iris identification scanner, third party device authorization, or other biometric data, for locking or unlocking. A physical coupling may be designed so that the look and feel of the symbiotic devices are one of continuous, integrated device, or non-continuous as separate, independent devices.

In other aspects, an electronic assembly (e.g., symbiotic pair) provides a material in an inhalable form while transmitting and receiving data between the assembly and other electronic devices. The assembly or pair may include a first device coupled to a second device, the first device adapted to vaporize or nebulize a substance, the second device providing power to the first device, and the second device adapted to monitor and control the first device.

In related aspects the second device may be adapted to transmit usage information regarding the first device to a central server. In addition, the second device may be adapted to receive instructions regarding the first device from the central server. For example, the instructions may be based on the usage information. The first device may be an electronic vaporizing device or an electronic nebulizing device, and the second device may be a smart phone, smart watch, or palm/notepad computer. The first device may be adapted to provide power to the second device, or vice-versa.

In an aspect, a method of transmitting and receiving data between an electronic assembly and other electronic devices may include monitoring, by a processor, usage of a first device; and transmitting, by a transmitter, usage information regarding the usage to a central server. The method may further include coupling the first device to a second device, and controlling, by the processor, the first device based on the usage of the first device. In related aspects the transmitter may receive instructions from the central server, which instructions may be based on the usage information and/or other data.

FIG. 1 is a block diagram of an exemplary electronic vapor device 100 as described herein. The electronic vapor device 100 can be, for example, an e-cigarette, an e-cigar, an electronic vapor device, a hybrid electronic communication handset coupled/integrated vapor device, a robotic vapor device, a modified vapor device "mod," a micro-sized electronic vapor device, a robotic vapor device, and the like. The vapor device 100 can comprise any suitable housing for enclosing and protecting the various components disclosed herein. The vapor device 100 can comprise a processor 102. The processor 102 can be, or can comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 102 can be coupled (e.g., communicatively, operatively, etc. . . . ) to auxiliary devices or modules of the vapor device 100 using a bus or other coupling. The vapor device 100 can comprise a power supply 110. The power supply 110 can comprise one or more batteries and/or other power storage device (e.g., capacitor) and/or a port for connecting to an external power supply. For example, an external power supply can supply power to the vapor device 100 and a battery can store at least a portion of the supplied power. The one or more batteries can be rechargeable. The one or more batteries can comprise a lithium-ion battery (including thin film lithium ion batteries), a lithium ion polymer battery, a nickel-cadmium battery, a nickel metal hydride battery, a lead-acid battery, combinations thereof, and the like. In an aspect, the power supply 110 can receive power via a power coupling to a case, wherein the vapor device 100 is stored in the case.

The vapor device 100 can comprise a memory device 104 coupled to the processor 102. The memory device 104 can comprise a random access memory (RAM) configured for storing program instructions and data for execution or processing by the processor 102 during control of the vapor device 100. When the vapor device 100 is powered off or in an inactive state, program instructions and data can be stored in a long-term memory, for example, a non-volatile magnetic optical, or electronic memory storage device (not shown). Either or both of the RAM or the long-term memory can comprise a non-transitory computer-readable medium storing program instructions that, when executed by the processor 102, cause the vapor device 100 to perform all or part of one or more methods and/or operations described herein. Program instructions can be written in any suitable high-level language, for example, C, C++, C# or the Java™, and compiled to produce machine-language code for execution by the processor 102.

In an aspect, the vapor device 100 can comprise a network access device 106 allowing the vapor device 100 to be coupled to one or more ancillary devices (not shown) such as via an access point (not shown) of a wireless telephone network, local area network, or other coupling to a wide area network, for example, the Internet. In that regard, the processor 102 can be configured to share data with the one or more ancillary devices via the network access device 106. The shared data can comprise, for example, usage data and/or operational data of the vapor device 100, a status of the vapor device 100, a status and/or operating condition of one or more the components of the vapor device 100, text to be used in a message, a product order, payment information, and/or any other data. Similarly, the processor 102 can be configured to receive control instructions from the one or more ancillary devices via the network access device 106. For example, a configuration of the vapor device 100, an operation of the vapor device 100, and/or other settings of the vapor device 100, can be controlled by the one or more ancillary devices via the network access device 106. For example, an ancillary device can comprise a server that can provide various services and another ancillary device can comprise a smartphone for controlling operation of the vapor device 100. In some aspects, the smartphone or another ancillary device can be used as a primary input/output of the vapor device 100 such that data is received by the vapor device 100 from the server, transmitted to the smartphone, and output on a display of the smartphone. In an aspect, data transmitted to the ancillary device can comprise a mixture of vaporizable material and/or instructions to release vapor. For example, the vapor device 100 can be configured to determine a need for the release of vapor into the atmosphere. The vapor device 100 can provide instructions via the network access device 106 to an ancillary device (e.g., another vapor device) to release vapor into the atmosphere.

In an aspect, data can be shared anonymously. The data can be shared over a transient data session with an ancillary device. The transient data session can comprise a session limit. The session limit can be based on one or more of a number of puffs, a time limit, and a total quantity of vaporizable material. The data can comprise usage data and/or a usage profile.

In an aspect, the vapor device 100 can also comprise an input/output device 112 coupled to one or more of the processor 102, the vaporizer 108, the network access device 106, and/or any other electronic component of the vapor device 100. Input can be received from a user or another device and/or output can be provided to a user or another device via the input/output device 112. The input/output device 112 can comprise any combinations of input and/or output devices such as buttons, knobs, keyboards, touchscreens, displays, light-emitting elements, a speaker, and/or the like. In an aspect, the input/output device 112 can comprise an interface port (not shown) such as a wired interface, for example a serial port, a Universal Serial Bus (USB) port, an Ethernet port, or other suitable wired connection. The input/output device 112 can comprise a wireless interface (not shown), for example a transceiver using any suitable wireless protocol, for example WiFi (IEEE 802.11), Bluetooth®, infrared, or other wireless standard. For example, the input/output device 112 can communicate with a smartphone via Bluetooth® such that the inputs and outputs of the smartphone can be used by the user to interface with the vapor device 100. In an aspect, the input/output device 112 can comprise a user interface. The user interface user interface can comprise at least one of lighted signal lights, gauges, boxes, forms, check marks, avatars, visual images, graphic designs, lists, active calibrations or calculations, 2D interactive fractal designs, 3D fractal designs, 2D and/or 3D representations of vapor devices and other interface system functions.

In an aspect, the input/output device 112 can be coupled to an adaptor device to receive power and/or send/receive data signals from an electronic device. For example, the input/output device 112 can be configured to receive power from the adaptor device and provide the power to the power supply 120 to recharge one or more batteries. The input/output device 112 can exchange data signals received from the adaptor device with the processor 102 to cause the processor to execute one or more functions.

In an aspect, the input/output device 112 can comprise a touchscreen interface and/or a biometric interface. For example, the input/output device 112 can include controls that allow the user to interact with and input information and commands to the vapor device 100. For example, with respect to the embodiments described herein, the input/output device 112 can comprise a touch screen display. The input/output device 112 can be configured to provide the content of the exemplary screen shots shown herein, which are presented to the user via the functionality of a display. User inputs to the touch screen display are processed by, for example, the input/output device 112 and/or the processor 102. The input/output device 112 can also be configured to process new content and communications to the system 100. The touch screen display can provide controls and menu selections, and process commands and requests. Application and content objects can be provided by the touch screen display. The input/output device 112 and/or the processor 102 can receive and interpret commands and other inputs, interface with the other components of the vapor device 100 as required. In an aspect, the touch screen display can enable a user to lock, unlock, or partially unlock or lock, the vapor device 100. The vapor device 100 can be transitioned from an idle and locked state into an open state by, for example, moving or dragging an icon on the screen of the vapor device 100, entering in a password/passcode, and the like. The input/output device 112 can thus display information to a user such as a puff count, an amount of vaporizable material remaining in a container 110, battery remaining, signal strength, combinations thereof and the like.

In an aspect, the input/output device 112 can comprise an audio user interface. A microphone can be configured to receive audio signals and relay the audio signals to the input/output device 112. The audio user interface can be any interface that is responsive to voice or other audio commands. The audio user interface can be configured to cause an action, activate a function, etc, by the vapor device 100 (or another device) based on a received voice (or other audio) command. The audio user interface can be deployed directly on the vapor device 100 and/or via other electronic devices (e.g., electronic communication devices such as a smartphone, a smart watch, a tablet, a laptop, a dedicated audio user interface device, and the like). The audio user interface can be used to control the functionality of the vapor device 100. Such functionality can comprise, but is not limited to, custom mixing of vaporizable material (e.g., eLiquids) and/or ordering custom made eLiquid combinations via an eCommerce service (e.g., specifications of a user's custom flavor mix can be transmitted to an eCommerce service, so that an eLiquid provider can mix a custom eLiquid cartridge for the user). The user can then reorder the custom flavor mix anytime or even send it to friends as a present, all via the audio user interface. The user can also send via voice command a mixing recipe to other users. The other users can utilize the mixing recipe (e.g., via an electronic vapor device having multiple chambers for eLiquid) to sample the same mix via an auto-order to the other users' devices to create the received mixing recipe. A custom mix can be given a title by a user and/or can be defined by parts (e.g., one part liquid A and two parts liquid B). The audio user interface can also be utilized to create and send a custom message to other users, to join eVapor clubs, to receive eVapor chart information, and to conduct a wide range of social networking, location services and eCommerce activities. The audio user interface can be secured via a password (e.g., audio password) which features at least one of tone recognition, other voice quality recognition and, in one aspect, can utilize at least one special cadence as part of the audio password.

The input/output device 112 can be configured to interface with other devices, for example, exercise equipment, computing equipment, communications devices and/or other vapor devices, for example, via a physical or wireless connection. The input/output device 112 can thus exchange data with the other equipment. A user may sync their vapor device 100 to other devices, via programming attributes such as mutual dynamic link library (DLL) 'hooks'. This enables a smooth exchange of data between devices, as can a web interface between devices. The input/output device 112 can be used to upload one or more profiles to the other devices. Using exercise equipment as an example, the one or more profiles can comprise data such as workout routine data (e.g., timing, distance, settings, heart rate, etc. . . . ) and vaping data (e.g., eLiquid mixture recipes, supplements, vaping timing, etc. . . . ). Data from usage of previous exercise sessions can be archived and shared with new electronic vapor devices and/or new exercise equipment so that history and preferences may remain continuous and provide for simplified device settings, default settings, and recommended settings based upon the synthesis of current and archival data.

In an aspect, the vapor device 100 can comprise a vaporizer 108. The vaporizer 108 can be coupled to one or more containers 110. Each of the one or more containers 110 can be configured to hold one or more vaporizable or non-vaporizable materials. The vaporizer 108 can receive the one or more vaporizable or non-vaporizable materials from the one or more containers 110 and heat the one or more vaporizable or non-vaporizable materials until the one or more vaporizable or non-vaporizable materials achieve a vapor state. In various embodiments, instead of heating the one or more vaporizable or non-vaporizable materials, the vaporizer 108 can nebulize or otherwise cause the one or more vaporizable or non-vaporizable materials in the one or more containers 110 to reduce in size into particulates. In various embodiments, the one or more containers 110 can comprise a compressed liquid that can be released to the vaporizer 108 via a valve or another mechanism. In various embodiments, the one or more containers 110 can comprise a wick (not shown) through which the one or more vaporizable or non-vaporizable materials is drawn to the vaporizer 108. The one or more containers 110 can be made of any suitable structural material, such as, an organic polymer, metal, ceramic, composite, or glass material. In an aspect, the vaporizable material can comprise one or more of, a Propylene Glycol (PG) based liquid, a Vegetable Glycerin (VG) based liquid, a water based liquid, combinations thereof, and the like. In an aspect, the vaporizable material can comprise Tetrahydrocannabinol (THC), Cannabidiol (CBD), cannabinol (CBN), combinations thereof, and the like. In a further aspect, the vaporizable material can comprise an extract from duboisia hopwoodii.

The one or more containers 110 can comprise a vaporized liquid under pressure. The vaporized liquid under pressure can comprise pressurized vapor resulting from vaporizing a vaporizable liquid via a heating component located externally to the vapor device 100 to create a vapor, and wherein the vapor is pressurized and stored in the one or more containers 110. The vapor device 100 can further comprising a depressurization chamber configured for controllably reducing pressure of the vaporized liquid under pressure to permit the vaporized liquid to expand.

In an aspect, the vapor device 100 can comprise a mixing element 122. The mixing element 122 can be coupled to the processor 102 to receive one or more control signals. The one or more control signals can instruct the mixing element 122 to withdraw specific amounts of fluid from the one or more containers 110. The mixing element can, in response to a control signal from the processor 102, withdraw select quantities of vaporizable material in order to create a customized mixture of different types of vaporizable material. The liquid withdrawn by the mixing element 122 can be provided to the vaporizer 108.

The vapor device 100 may include a plurality of valves, wherein a respective one of the valves is interposed between the vaporizer 108 and a corresponding one of outlet 114 and/or outlet 124 (e.g., one or more inlets of flexible tubes). Each of the valves may control a flow rate through a respective one of the flexible tubes. For example, each of the plurality of valves may include a lumen of adjustable effective diameter for controlling a rate of vapor flow there through. The assembly may include an actuator, for example a motor, configured to independently adjust respective ones of the valves under control of the processor. The actuator may include a handle or the like to permit manual valve adjustment by the user. The motor or actuator can be coupled to a uniform flange or rotating spindle coupled to the valves and configured for controlling the flow of vapor through each of the valves. Each of the valves can be adjusted so that each of the flexible tubes accommodate the same (equal) rate of vapor flow, or different rates of flow. The processor 102 can be configured to determine settings for the respective ones of the valves each based on at least one of: a selected user preference or an amount of suction applied to a corresponding one of the flexible tubes. A user preference can be determined by the processor 102 based on a user input, which can be electrical or mechanical. An electrical input can be provided, for example, by a touchscreen, keypad, switch, or potentiometer (e.g., the input/output 112). A mechanical input can be provided, for example, by applying suction to a mouthpiece of a tube, turning a valve handle, or moving a gate piece.

The vapor device 100 may further include at least one light-emitting element positioned on or near each of the outlet 114 and/or the outlet 124 (e.g., flexible tubes) and configured to illuminate in response to suction applied to the outlet 114 and/or the outlet 124. At least one of an intensity of illumination or a pattern of alternating between an illuminated state and a non-illuminated state can be adjusted based on an amount of suction. One or more of the at least one light-emitting element, or another light-emitting element, may illuminate based on an amount of vaporizable material available. For example, at least one of an intensity of illumination or a pattern of alternating between an illuminated state and a non-illuminated state can be adjusted based on an amount of the vaporizable material within the vapor device 100. In some aspects, the vapor device 100 may include at least two light-emitting elements positioned on each of the outlet 114 and/or the outlet 124. Each of the at least two light-emitting elements may include a first light-emitting element and an outer light-emitting element positioned nearer the end of the outlet 114 and/or the outlet 124 than the first light-emitting element. Illumination of the at least two light-emitting elements may indicate a direction of a flow of vapor.

In an aspect, input from the input/output device 112 can be used by the processor 102 to cause the vaporizer 108 to vaporize the one or more vaporizable or non-vaporizable materials. For example, a user can depress a button, causing the vaporizer 108 to start vaporizing the one or more vaporizable or non-vaporizable materials. A user can then draw on an outlet 114 to inhale the vapor. In various aspects, the processor 102 can control vapor production and flow to the outlet 114 based on data detected by a flow sensor 116. For example, as a user draws on the outlet 114, the flow sensor 116 can detect the resultant pressure and provide a signal to the processor 102. In response, the processor 102 can cause the vaporizer 108 to begin vaporizing the one or more vaporizable or non-vaporizable materials, terminate vaporizing the one or more vaporizable or non-vaporizable materials, and/or otherwise adjust a rate of vaporization of the one or more vaporizable or non-vaporizable materials. In another aspect, the vapor can exit the vapor device 100 through an outlet 124. The outlet 124 differs from the outlet 114 in that the outlet 124 can be configured to distribute the vapor into the local atmosphere, rather than being inhaled by a user. In an aspect, vapor exiting the outlet 124 can be at least one of aromatic, medicinal, recreational, and/or wellness related. In an aspect, the vapor device 100 can comprise any number of outlets. In an aspect, the outlet 114 and/or the outlet 124 can comprise at least one flexible tube. For example, a lumen of the at least one flexible tube can be in fluid communication with one or more components (e.g., a first container) of the vapor device 100 to provide vapor to a user. In more detailed aspects, the at least one flexible tube may include at least two flexible tubes. Accordingly, the vapor device 100 may further include a second container configured to receive a second vaporizable material such that a first flexible tube can receive vapor from the first vaporizable material and a second flexible tube receive vapor from the second vaporizable material, example, the at least two flexible tubes can be in fluid communication with the first container and with second container. The vapor device 100 may include an electrical or mechanical sensor configured to sense a pressure level, and therefore suction, in an interior of the flexible tube. Application of suction may activate the vapor device 100 and cause vapor to flow.

In another aspect, the vapor device 100 can comprise a piezoelectric dispersing element. In some aspects, the piezoelectric dispersing element can be charged by a battery, and can be driven by a processor on a circuit board. The circuit board can be produced using a polyimide such as Kapton, or other suitable material. The piezoelectric dispersing element can comprise a thin metal disc which causes dispersion of the fluid fed into the dispersing element via the wick or other soaked piece of organic material through vibration. Once in contact with the piezoelectric dispersing element, the vaporizable material (e.g., fluid) can be vaporized (e.g., turned into vapor or mist) and the vapor can be dispersed via a system pump and/or a sucking action of the user. In some aspects, the piezoelectric dispersing element can cause dispersion of the vaporizable material by producing ultrasonic vibrations. An electric field applied to a piezoelectric material within the piezoelectric element can cause ultrasonic expansion and contraction of the piezoelectric material, resulting in ultrasonic vibrations to the disc. The ultrasonic vibrations can cause the vaporizable material to disperse, thus forming a vapor or mist from the vaporizable material.

In some aspects, the connection between a power supply and the piezoelectric dispersing element can be facilitated using one or more conductive coils. The conductive coils can provide an ultrasonic power input to the piezoelectric dispersing element. For example, the signal carried by the coil can have a frequency of approximately 107.8 kHz. In some aspects, the piezoelectric dispersing element can comprise a piezoelectric dispersing element that can receive the ultrasonic signal transmitted from the power supply through the coils, and can cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid can be vibrated by the ultrasonic energy produced by the piezoelectric dispersing element, thus causing dispersal and/or atomization of the liquid. In an aspect, the vapor device 100 can be configured to permit a user to select between using a heating element of the vaporizer 108 or the piezoelectric dispersing element. In another aspect, the vapor device 100 can be configured to permit a user to utilize both a heating element of the vaporizer 108 and the piezoelectric dispersing element.

In an aspect, the vapor device 100 can comprise a heating casing 126. The heating casing 126 can enclose one or more of the container 110, the vaporizer 108, and/or the outlet 114. In a further aspect, the heating casing 126 can enclose one or more components that make up the container 110, the vaporizer 108, and/or the outlet 114. The heating casing 126 can be made of ceramic, metal, and/or porcelain. The heating casing 126 can have varying thickness. In an aspect, the heating casing 126 can be coupled to the power supply 120 to receive power to heat the heating casing 126. In another aspect, the heating casing 126 can be coupled to the vaporizer 108 to heat the heating casing 126. In another aspect, the heating casing 126 can serve an insulation role.

In an aspect, the vapor device 100 can comprise a filtration element 128. The filtration element 128 can be configured to remove (e.g., filter, purify, etc) contaminants from air entering the vapor device 100. The filtration element 128 can optionally comprise a fan 130 to assist in delivering air to the filtration element 128. The vapor device 100 can be configured to intake air into the filtration element 128, filter the air, and pass the filtered air to the vaporizer 108 for use in vaporizing the one or more vaporizable or non-vaporizable materials. In another aspect, the vapor device 100 can be configured to intake air into the filtration element 128, filter the air, and bypass the vaporizer 108 by passing the filtered air directly to the outlet 114 for inhalation by a user.

In an aspect, the filtration element 128 can comprise cotton, polymer, wool, satin, meta materials and the like. The filtration element 128 can comprise a filter material that at least one airborne particle and/or undesired gas by a mechanical mechanism, an electrical mechanism, and/or a chemical mechanism. The filter material can comprise one or more pieces of a filter fabric that can filter out one or more airborne particles and/or gasses. The filter fabric can be a woven and/or non-woven material. The filter fabric can be made from natural fibers (e.g., cotton, wool, etc.) and/or from synthetic fibers (e.g., polyester, nylon, polypropylene, etc.). The thickness of the filter fabric can be varied depending on the desired filter efficiencies and/or the region of the apparel where the filter fabric is to be used. The filter fabric can be designed to filter airborne particles and/or gasses by mechanical mechanisms (e.g., weave density), by electrical mechanisms charged fibers, charged metals, etc.), and/or by chemical mechanisms (e.g., absorptive charcoal particles, adsorptive materials, etc.). In as aspect, the filter material can comprise electrically charged fibers such as, but not limited to, FILTRETE by 3M. In another aspect, the filter material can comprise a high density material similar to material used for medical masks which are used by medical personnel in doctors' offices, hospitals, and the like. In an aspect, the filter material can be treated with an anti-bacterial solution and/or otherwise made from anti-bacterial materials. In another aspect, the filtration element 128 can comprise electrostatic plates, ultraviolet light, a HEPA filter, combinations thereof, and the like.

In an aspect, the vapor device 100 can comprise a cooling element 132. The cooling element 132 can be configured to cool vapor exiting the vaporizer 108 prior to passing through the outlet 114. The cooling element 132 can cool vapor by utilizing air or space within the vapor device 100. The air used by the cooling element 132 can be either static (existing in the vapor device 100) or drawn into an intake and through the cooling element 132 and the vapor device 100. The intake can comprise various pumping, pressure, fan, or other intake systems for drawing air into the cooling element 132. In an aspect, the cooling element 132 can reside separately or can be integrated the vaporizer 108. The cooling element 132 can be a single cooled electronic element within a tube or space and/or the cooling element 132 can be configured as a series of coils or as a grid like structure. The materials for the cooling element 132 can be metal, liquid, polymer, natural substance, synthetic substance, air, or any combination thereof. The cooling element 132 can be powered by the power supply 120, by a separate battery (not shown), or other power source (not shown) including the use of excess heat energy created by the vaporizer 108 being converted to energy used for cooling by virtue of a small turbine or pressure system to convert the energy. Heat differentials between the vaporizer 108 and the cooling element 132 can also be converted to energy utilizing commonly known geothermal energy principles.

In an aspect, the vapor device 100 can comprise a magnetic element 134. For example, the magnetic element 134 can comprise an electromagnet, a ceramic magnet, a ferrite magnet, and/or the like. The magnetic element 134 can be configured to apply a magnetic field to air as it is brought into the vapor device 100, in the vaporizer 108, and/or as vapor exits the outlet 114.

The input/output device 112 can be used to select whether vapor exiting the outlet 114 should be cooled or not cooled and/or heated or not heated and/or magnetized or not magnetized. For example, a user can use the input/output device 112 to selectively cool vapor at times and not cool vapor at other times. The user can use the input/output device 112 to selectively heat vapor at times and not heat vapor at other times. The user can use the input/output device 112 to selectively magnetize vapor at times and not magnetize vapor at other times. The user can further use the input/output device 112 to select a desired smoothness, temperature, and/or range of temperatures. The user can adjust the temperature of the vapor by selecting or clicking on a clickable setting on a part of the vapor device 100. The user can use, for example, a graphical user interface (GUI) or a mechanical input enabled by virtue of clicking a rotational mechanism at either end of the vapor device 100.

In an aspect, cooling control can be set within the vapor device 100 settings via the processor 102 and system software (e.g., dynamic linked libraries). The memory 104 can store settings. Suggestions and remote settings can be communicated to and/or from the vapor device 100 via the input/output device 112 and/or the network access device 106. Cooling of the vapor can be set and calibrated between heating and cooling mechanisms to what is deemed an ideal temperature by the manufacturer of the vapor device 100 for the vaporizable material. For example, a temperature can be set such that resultant vapor delivers the coolest feeling to the average user but does not present any health risk to the user by virtue of the vapor being too cold, including the potential for rapid expansion of cooled vapor within the lungs and the damaging of tissue by vapor which has been cooled to a temperature which may cause frostbite like symptoms.

In an aspect, the vapor device 100 can be configured to receive air, smoke, vapor or other material and analyze the contents of the air, smoke, vapor or other material using one or more sensors 136 in order to at least one of analyze, classify, compare, validate, refute, and/or catalogue the same. A result of the analysis can be, for example, an identification of at least one of medical, recreational, homeopathic, olfactory elements, spices, other cooking ingredients, ingredients analysis from food products, fuel analysis, pharmaceutical analysis, genetic modification testing analysis, dating, fossil and/or relic analysis and the like. The vapor device 100 can pass utilize, for example, mass spectrometry, PH testing, genetic testing, particle and/or cellular testing, sensor based testing and other diagnostic and wellness testing either via locally available components or by transmitting data to a remote system for analysis.

In an aspect, a user can create a custom scent by using the vapor device 100 to intake air elements, where the vapor device 100 (or third-party networked device) analyzes the olfactory elements and/or biological elements within the sample and then formulates a replica scent within the vapor device 100 (or third-party networked device) that can be accessed by the user instantly, at a later date, with the ability to purchase this custom scent from a networked ecommerce portal.

In another aspect, the one or more sensors 136 can be configured to sense environmental conditions (e.g., negative environmental conditions) (e.g., adverse weather, smoke, fire, chemicals (e.g., such as $CO_2$ or formaldehyde), adverse pollution, odorous smells, and/or disease outbreaks, and the like). The one or more sensors 136 can comprise one or more of, a biochemical/chemical sensor, a thermal sensor, a radiation sensor, a mechanical sensor, an optical sensor, a mechanical sensor, a magnetic sensor, an electrical sensor, combinations thereof and the like. The biochemical/chemical sensor can be configured to detect one or more biochemical/chemicals causing a negative environmental condition such as, but not limited to, smoke, a vapor, a gas, a liquid, a solid, an odor, combinations thereof, and/or the like. The biochemical/chemical sensor can comprise one or more of a mass spectrometer, a conducting/nonconducting regions sensor, a SAW sensor, a quartz microbalance sensor, a conductive composite sensor, a chemiresitor, a metal oxide gas sensor, an organic gas sensor, a MOSFET, a piezoelectric device, an infrared sensor, a sintered metal oxide sensor, a Pd-gate MOSFET, a metal FET structure, a electrochemical cell, a conducting polymer sensor, a catalytic gas sensor, an organic semiconducting gas sensor, a solid electrolyte gas sensors, a piezoelectric quartz crystal sensor, and/or combinations thereof.

The thermal sensor can be configured to detect temperature, heat, heat flow, entropy, heat capacity, combinations thereof, and the like. Exemplary thermal sensors include, but are not limited to, thermocouples, such as a semiconducting thermocouples, noise thermometry, thermoswitches, thermistors, metal thermoresistors, semiconducting thermoresistors, thermodiodes, thermotransistors, calorimeters, thermometers, indicators, and fiber optics.

The radiation sensor can be configured to detect gamma rays, X-rays, ultra-violet rays, visible, infrared, microwaves and radio waves. Exemplary radiation sensors include, but are not limited to, nuclear radiation microsensors, such as scintillation counters and solid state detectors, ultra-violet, visible and near infrared radiation microsensors, such as photoconductive cells, photodiodes, phototransistors, infrared radiation microsensors, such as photoconductive IR sensors and pyroelectric sensors.

The optical sensor can be configured to detect visible, near infrared, and infrared waves. The mechanical sensor can be configured to detect displacement, velocity, acceleration, force, torque, pressure, mass, flow, acoustic wavelength, and amplitude. Exemplary mechanical sensors include, but are not limited to, displacement microsensors, capacitive and inductive displacement sensors, optical displacement sensors, ultrasonic displacement sensors, pyroelectric, velocity and flow microsensors, transistor flow microsensors, acceleration microsensors, piezoresistive microaccelerometers, force, pressure and strain microsensors, and piezoelectric crystal sensors. The magnetic sensor can be configured to detect magnetic field, flux, magnetic moment, magnetization, and magnetic permeability. The electrical sensor can be configured to detect charge, current, voltage, resistance, conductance, capacitance, inductance, dielectric permittivity, polarization and frequency.

Upon sensing a negative environmental condition, the one or more sensors 122 can provide data to the processor 102 to determine the nature of the negative environmental condition and to generate/transmit one or more alerts based on the negative environmental condition. The one or more alerts can be deployed to the vapor device 100 user's wireless device and/or synced accounts. For example, the network device access device 106 can be used to transmit the one or more alerts directly (e.g., via Bluetooth®) to a user's smartphone to provide information to the user. In another aspect, the network access device 106 can be used to transmit sensed information and/or the one or more alerts to a remote server for use in syncing one or more other devices used by the user (e.g., other vapor devices, other electronic devices (smartphones, tablets, laptops, etc. . . . ). In another aspect, the one or more alerts can be provided to the user of the vapor device 100 via vibrations, audio, colors, and the like deployed from the mask, for example through the input/output device 112. For example, the input/output device 112 can comprise a small vibrating motor to alert the user to one or more sensed conditions via tactile sensation. In another example, the input/output device 112 can comprise one or more LED's of various colors to provide visual information to the user. In another example, the input/output device 112 can comprise one or more speakers that can provide audio information to the user. For example, various patterns of beeps, sounds, and/or voice recordings can be utilized to provide the audio information to the user. In another example, the input/output device 112 can comprise an LCD screen/touchscreen that provides a summary and/or detailed information regarding the negative environmental condition and/or the one or more alerts.

In another aspect, upon sensing a negative environmental condition, the one or more sensors 136 can provide data to the processor 102 to determine the nature of the negative environmental condition and to provide a recommendation for mitigating and/or to actively mitigate the negative environmental condition. Mitigating the negative environmental conditions can comprise, for example, applying a filtration system, a fan, a fire suppression system, engaging a HVAC system, and/or one or more vaporizable and/or non-vaporizable materials. The processor 102 can access a database stored in the memory device 104 to make such a determination or the network device 106 can be used to request information from a server to verify the sensor findings. In an aspect, the server can provide an analysis service to the vapor device 100. For example, the server can analyze data sent by the vapor device 100 based on a reading from the one or more sensors 136. The server can determine and transmit one or more recommendations to the vapor device 100 to mitigate the sensed negative environmental condition. The vapor device 100 can use the one or more recommendations to activate a filtration system, a fan, a fire suppression system engaging a HVAC system, and/or to vaporize one or more vaporizable or non-vaporizable materials to assist in countering effects from the negative environmental condition.

In an aspect, the vapor device 100 can comprise a global positioning system (GPS) unit 118. The GPS 118 can detect a current location of the device 100. In some aspects, a user can request access to one or more services that rely on a current location of the user. For example, the processor 102 can receive location data from the GPS 118, convert it to usable data, and transmit the usable data to the one or more services via the network access device 106. GPS unit 118 can receive position information from a constellation of satellites operated by the U.S. Department of Defense. Alternately, the GPS unit 118 can be a GLONASS receiver operated by the Russian Federation Ministry of Defense, or any other positioning device capable of providing accurate location information (for example, LORAN, inertial navigation, and the like). The GPS unit 118 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range.

Figure 2:
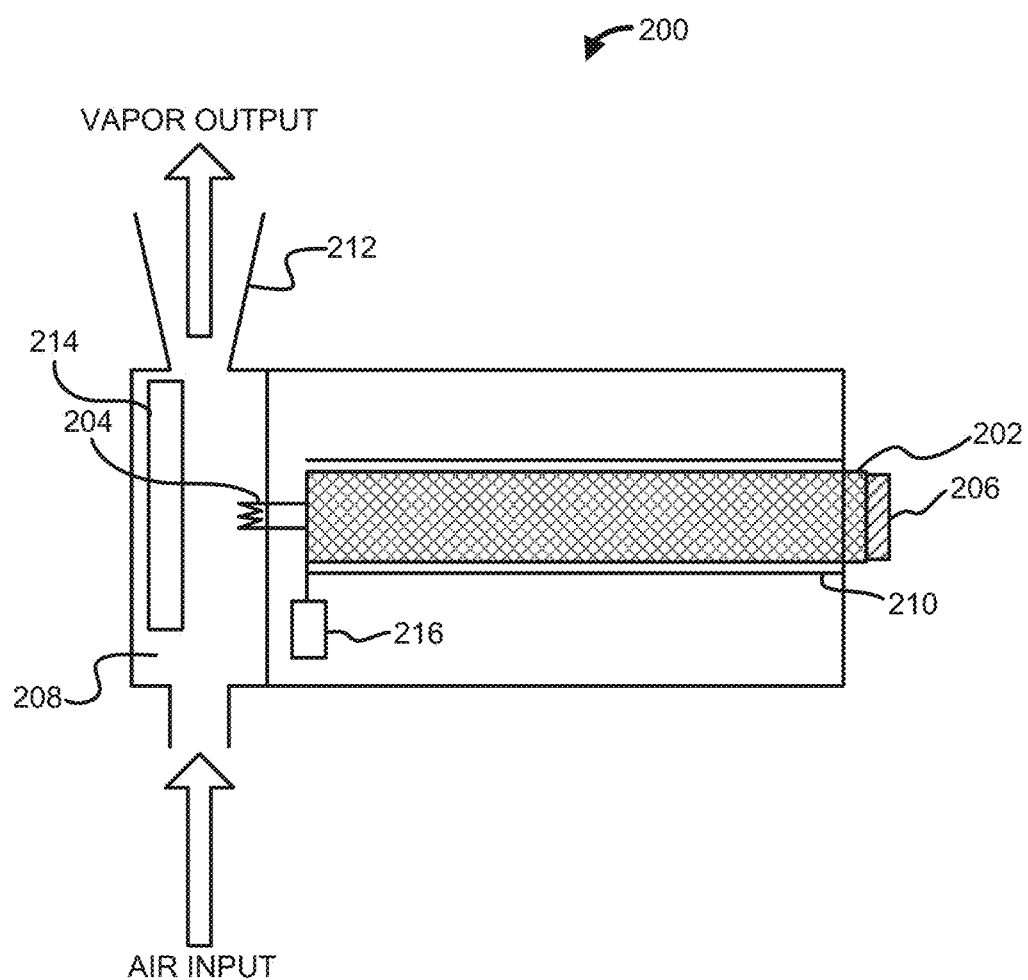
FIG. 2 illustrates an exemplary vaporizer.

FIG. 2 illustrates an exemplary vaporizer 200. The vaporizer 200 can be, for example, an e-cigarette, an e-cigar, an electronic vapor device, a hybrid electronic communication handset coupled/integrated vapor device, a robotic vapor device, a modified vapor device "mod," a micro-sized electronic vapor device, a robotic vapor device, and the like. The vaporizer 200 can be used internally of the vapor device 100 or can be a separate device. For example, the vaporizer 200 can be used in place of the vaporizer 108.

The vaporizer 200 can comprise or be coupled to one or more containers 202 containing a vaporizable material, for example a fluid. For example, coupling between the vaporizer 200 and the one or more containers 202 can be via a wick 204, via a valve, or by some other structure. Coupling can operate independently of gravity, such as by capillary action or pressure drop through a valve. The vaporizer 200 can be configured to vaporize the vaporizable material from the one or more containers 202 at controlled rates in response to mechanical input from a component of the vapor device 100, and/or in response to control signals from the processor 102 or another component. Vaporizable material (e.g., fluid) can be supplied by one or more replaceable cartridges 206. In an aspect the vaporizable material can comprise aromatic elements. In an aspect, the aromatic elements can be medicinal, recreational, and/or wellness related. The aromatic element can include, but is not limited to, at least one of lavender or other floral aromatic eLiquids, mint, menthol, herbal soil or geologic, plant based, name brand perfumes, custom mixed perfume formulated inside the vapor device 100 and aromas constructed to replicate the smell of different geographic places, conditions, and/or occurrences. For example, the smell of places may include specific or general sports venues, well-known travel destinations, the mix of one's own personal space or home. The smell of conditions may include, for example, the smell of a pet, a baby, a season, a general environment (e.g., a forest), a new car, a sexual nature (e.g., musk, pheromones, etc. . . . ). The one or more replaceable cartridges 206 can contain the vaporizable material. If the vaporizable material is liquid, the cartridge can comprise the wick 204 to aid in transporting the liquid to a mixing chamber 208. In the alternative, some other transport mode can be used. Each of the one or more replaceable cartridges 206 can be configured to fit inside and engage removably with a receptacle (such as the container 202 and/or a secondary container) of the vapor device 100. In an alternative, or in addition, one or more fluid containers 210 can be fixed in the vapor device 100 and configured to be refillable. In an aspect, one or more materials can be vaporized at a single time by the vaporizer 200. For example, some material can be vaporized and drawn through an exhaust port 212 and/or some material can be vaporized and exhausted via a smoke simulator outlet (not shown).

The mixing chamber 208 can also receive an amount of one or more compounds (e.g., vaporizable material) to be vaporized. For example, the processor 102 can determine a first amount of a first compound and determine a second amount of a second compound. The processor 102 can cause the withdrawal of the first amount of the first compound from a first container into the mixing chamber and the second amount of the second compound from a second container into the mixing chamber. The processor 102 can also determine a target dose of the first compound, determine a vaporization ratio of the first compound and the second compound based on the target dose, determine the first amount of the first compound based on the vaporization ratio, determine the second amount of the second compound based on the vaporization ratio, and cause the withdrawal of the first amount of the first compound into the mixing chamber, and the withdrawal of the second amount of the second compound into the mixing chamber.

The processor 102 can also determine a target dose of the first compound, determine a vaporization ratio of the first compound and the second compound based on the target dose, determine the first amount of the first compound based on the vaporization ratio, and determine the second amount of the second compound based on the vaporization ratio. After expelling the vapor through an exhaust port for inhalation by a user, the processor 102 can determine that a cumulative dose is approaching the target dose and reduce the vaporization ratio. In an aspect, one or more of the vaporization ratio, the target dose, and/or the cumulative dose can be determined remotely and transmitted to the vapor device 100 for use.

In operation, a heating element 214 can vaporize or nebulize the vaporizable material in the mixing chamber 208, producing an inhalable vapor/mist that can be expelled via the exhaust port 211 in an aspect, the heating element 214 can comprise a heater coupled to the wick (or a heated wick) 204 operatively coupled to (for example, in fluid communication with) the mixing chamber 210. The heating element 214 can comprise a nickel-chromium wire or the like, with a temperature sensor (not shown) such as a thermistor or thermocouple. Within definable limits, by controlling power to the wick 204, a rate of vaporization can be independently controlled. A multiplexer 216 can receive power from any suitable source and exchange data signals with a processor, for example, the processor 102 of the vapor device 100, for control of the vaporizer 200. At a minimum, control can be provided between no power (off state) and one or more powered states. Other control mechanisms can also be suitable.

In another aspect, the vaporizer 200 can comprise a piezoelectric dispersing element. In some aspects, the piezoelectric dispersing element can be charged by a battery, and can be driven by a processor on a circuit board. The circuit board can be produced using a polyimide such as Kapton, or other suitable material. The piezoelectric dispersing element can comprise a thin metal disc which causes dispersion of the fluid fed into the dispersing element via the wick or other soaked piece of organic material through vibration. Once in contact with the piezoelectric dispersing element, the vaporizable material (e.g., fluid) can be vaporized (e.g., turned into vapor or mist) and the vapor can be dispersed via a system pump and/or a sucking action of the user. In some aspects, the piezoelectric dispersing element can cause dispersion of the vaporizable material by producing ultrasonic vibrations. An electric field applied to a piezoelectric material within the piezoelectric element can cause ultrasonic expansion and contraction of the piezoelectric material, resulting in ultrasonic vibrations to the disc. The ultrasonic vibrations can cause the vaporizable material to disperse, thus forming a vapor or mist from the vaporizable material.

In an aspect, the vaporizer 200 can be configured to permit a user to select between using the heating element 214 or the piezoelectric dispersing element. In another aspect, the vaporizer 200 can be configured to permit a user to utilize both the heating element 214 and the piezoelectric dispersing element.

In some aspects, the connection between a power supply and the piezoelectric dispersing element can be facilitated using one or more conductive coils. The conductive coils can provide an ultrasonic power input to the piezoelectric dispersing element. For example, the signal carried by the coil can have a frequency of approximately 107.8 kHz. In some aspects, the piezoelectric dispersing element can comprise a piezoelectric dispersing element that can receive the ultrasonic signal transmitted from the power supply through the coils, and can cause vaporization of the vaporizable liquid by producing ultrasonic vibrations. An ultrasonic electric field applied to a piezoelectric material within the piezoelectric element causes ultrasonic expansion and contraction of the piezoelectric material, resulting in ultrasonic vibrations according to the frequency of the signal. The vaporizable liquid can be vibrated by the ultrasonic energy produced by the piezoelectric dispersing element, thus causing dispersal and/or atomization of the liquid.

Figure 3:
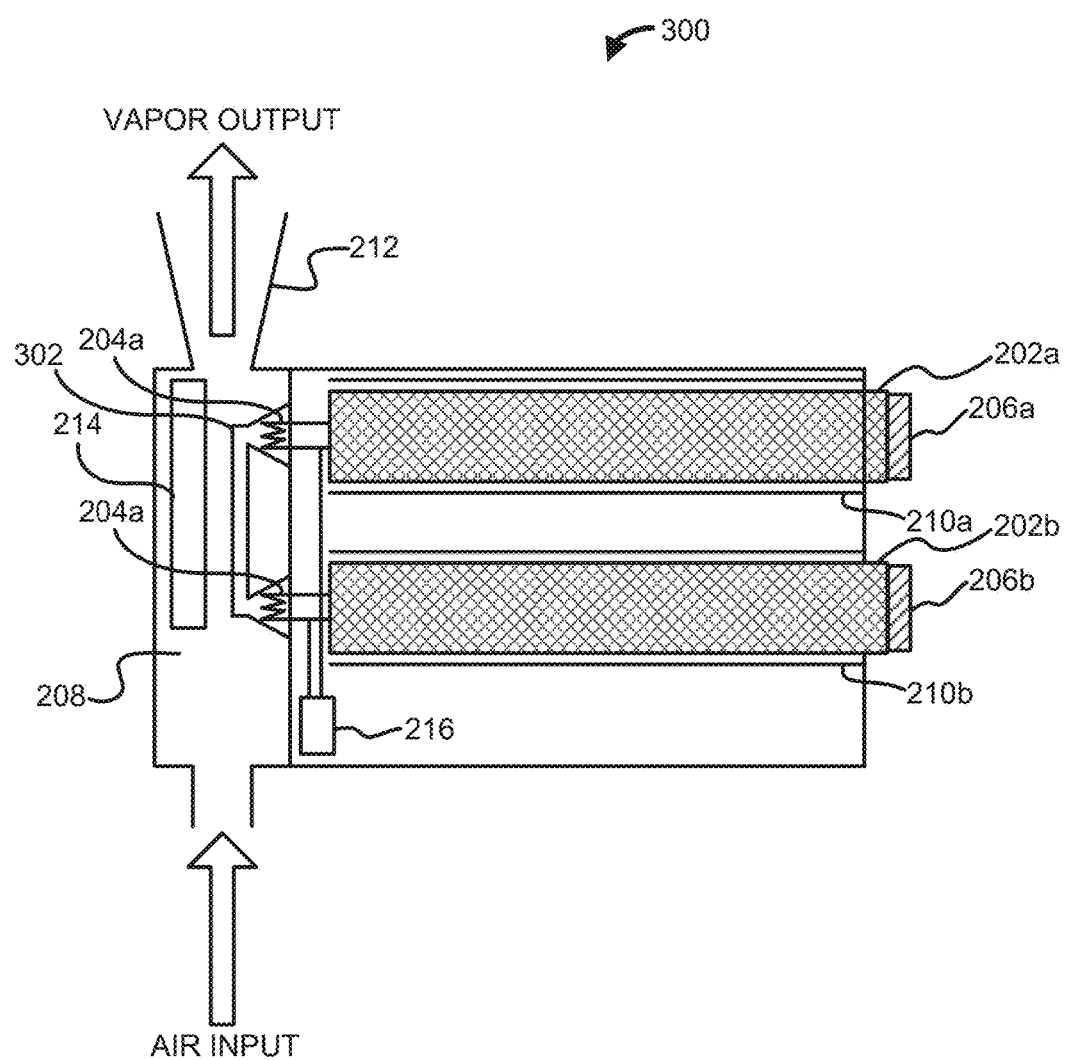
FIG. 3 illustrates an exemplary vaporizer configured for vaporizing a mixture of vaporizable material.

FIG. 3 illustrates a vaporizer 300 that comprises the elements of the vaporizer 200 with two containers 202a and 202b containing a vaporizable material, for example a fluid or a solid. In an aspect, the fluid can be the same fluid in both containers or the fluid can be different in each container. In an aspect the fluid can comprise aromatic elements. The aromatic element can include, but is not limited to, at least one of lavender or other floral aromatic eLiquids, mint, menthol, herbal soil or geologic, plant based, name brand perfumes, custom mixed perfume formulated inside the vapor device 100 and aromas constructed to replicate the smell of different geographic places, conditions, and/or occurrences. For example, the smell of places may include specific or general sports venues, well known travel destinations, the mix of one's own personal space or home. The smell of conditions may include, for example, the smell of a pet, a baby, a season, a general environment (e.g., a forest), a new car, a sexual nature (e.g., musk, pheromones, etc. . . . ). Coupling between the vaporizer 200 and the container 202a and the container 202b can be via a wick 204a and a wick 204b, respectively, via a valve, or by some other structure. Coupling can operate independently of gravity, such as by capillary action or pressure drop through a valve. The vaporizer 300 can be configured to mix in varying proportions the fluids contained in the container 202a and the container 202b and vaporize the mixture at controlled rates in response to mechanical input from a component of the vapor device 100, and/or in response to control signals from the processor 102 or another component. For example, based on a vaporization ratio. In an aspect, a mixing element 302 can be coupled to the container 202a and the container 202b. The mixing element can, in response to a control signal from the processor 102, withdraw select quantities of vaporizable material in order to create a customized mixture of different types of vaporizable material. Vaporizable material (e.g., fluid) can be supplied by one or more replaceable cartridges 206a and 206b. The one or more replaceable cartridges 206a and 206b can contain a vaporizable material. If the vaporizable material is liquid, the cartridge can comprise the wick 204a or 204b to aid in transporting the liquid to a mixing chamber 208. In the alternative, some other transport mode can be used. Each of the one or more replaceable cartridges 206a and 206b can be configured to fit inside and engage removably with a receptacle (such as the container 202a or the container 202b and/or a secondary container) of the vapor device 100. In an alternative, or in addition, one or more fluid containers 210a and 210b can be fixed in the vapor device 100 and configured to be refillable. In an aspect, one or more materials can be vaporized at a single time by the vaporizer 300. For example, some material can be vaporized and drawn through an exhaust port 212 and/or some material can be vaporized and exhausted via a smoke simulator outlet (not shown).

Figure 4:
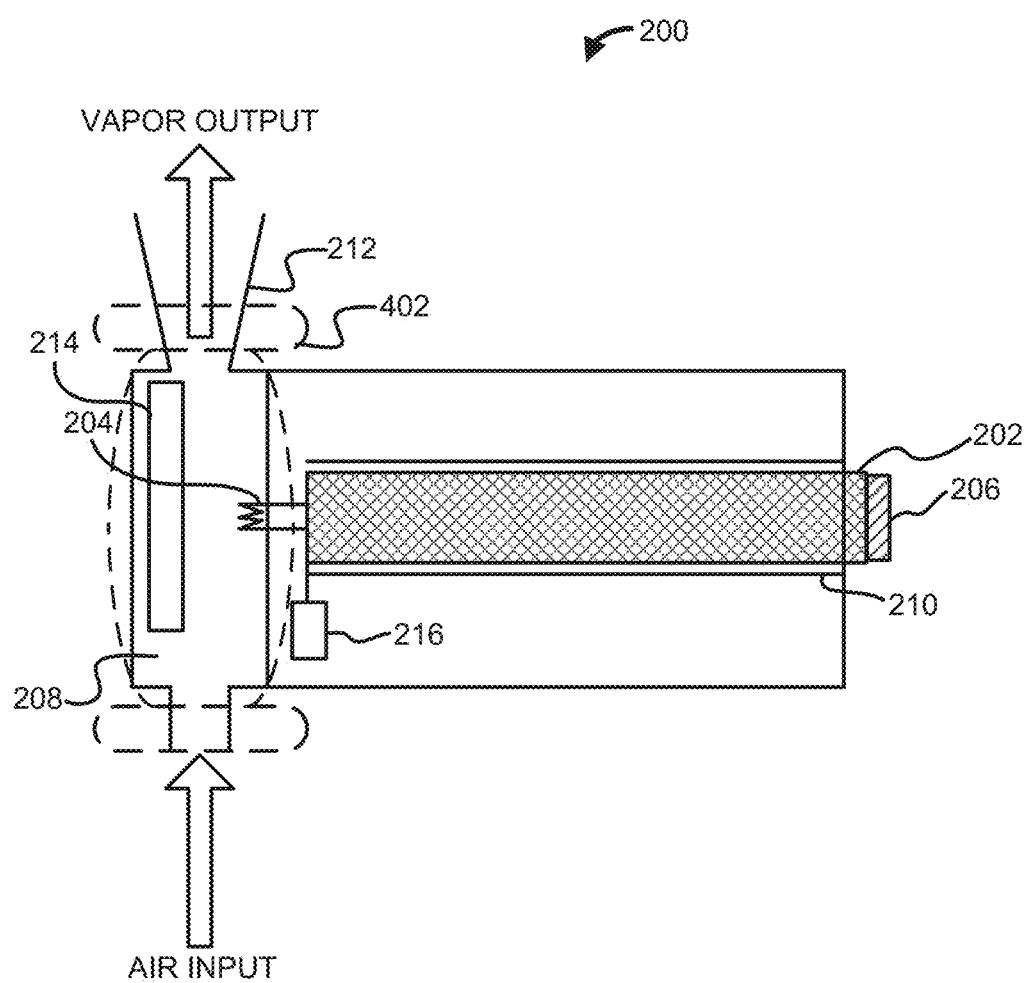
FIG. 4 illustrates an exemplary vaporizer device configured for smooth vapor delivery.

FIG. 4 illustrates a vaporizer 200 that comprises the elements of the vaporizer 200 with a heating casing 402. The heating casing 402 can enclose the heating element 214 or can be adjacent to the heating element 214. The heating casing 402 is illustrated with dashed lines, indicating components contained therein. The heating casing 402 can be made of ceramic, metal, and/or porcelain. The heating casing 402 can have varying thickness. In an aspect, the heating casing 402 can be coupled to the multiplexer 216 to receive power to heat the heating casing 402. In another aspect, the heating casing 402 can be coupled to the heating element 214 to heat the heating casing 402. In another aspect, the heating casing 402 can serve an insulation role.

Figure 5:
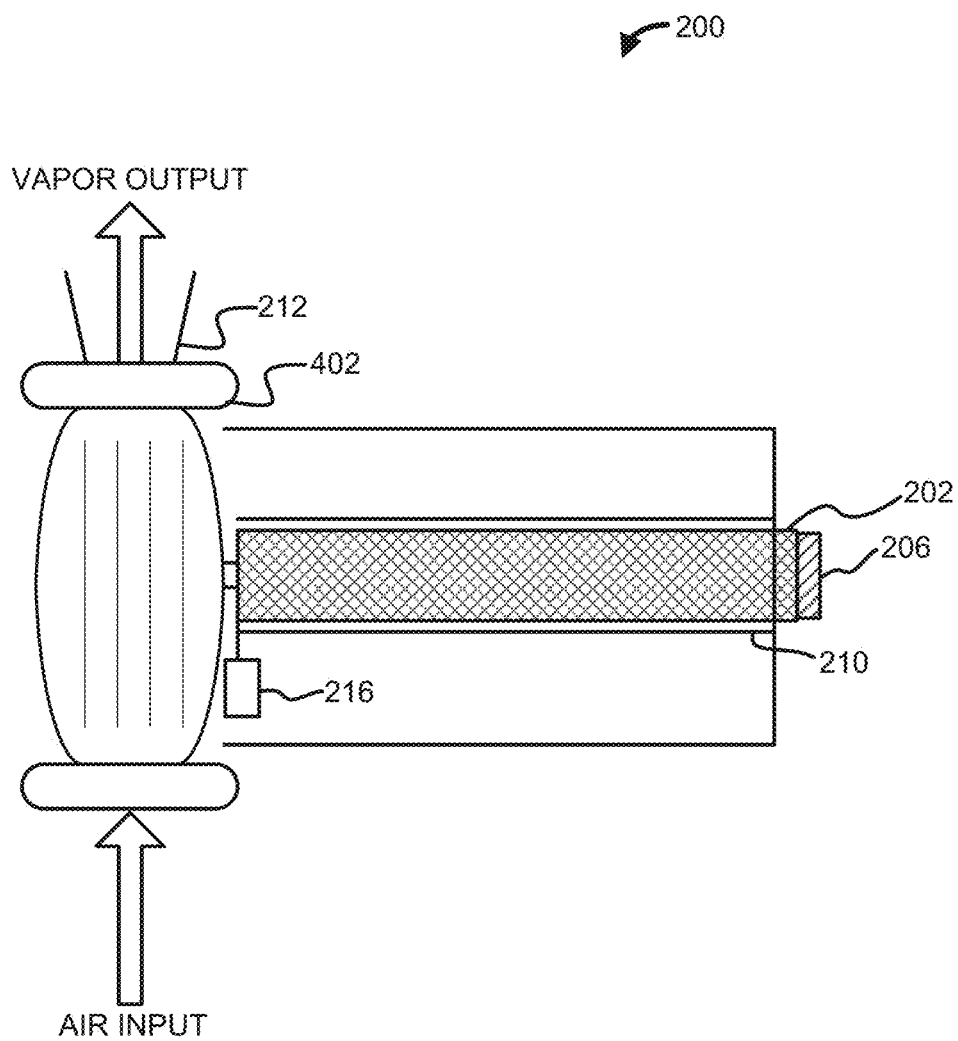
FIG. 5 illustrates another exemplary vaporizer configured for smooth vapor delivery.

FIG. 5 illustrates the vaporizer 200 of FIG. 2 and FIG. 4, but illustrates the heating casing 402 with solid lines, indicating components contained therein. Other placements of the heating casing 402 are contemplated. For example, the heating casing 402 can be placed after the heating element 214 and/or the mixing chamber 208.

Figure 6:
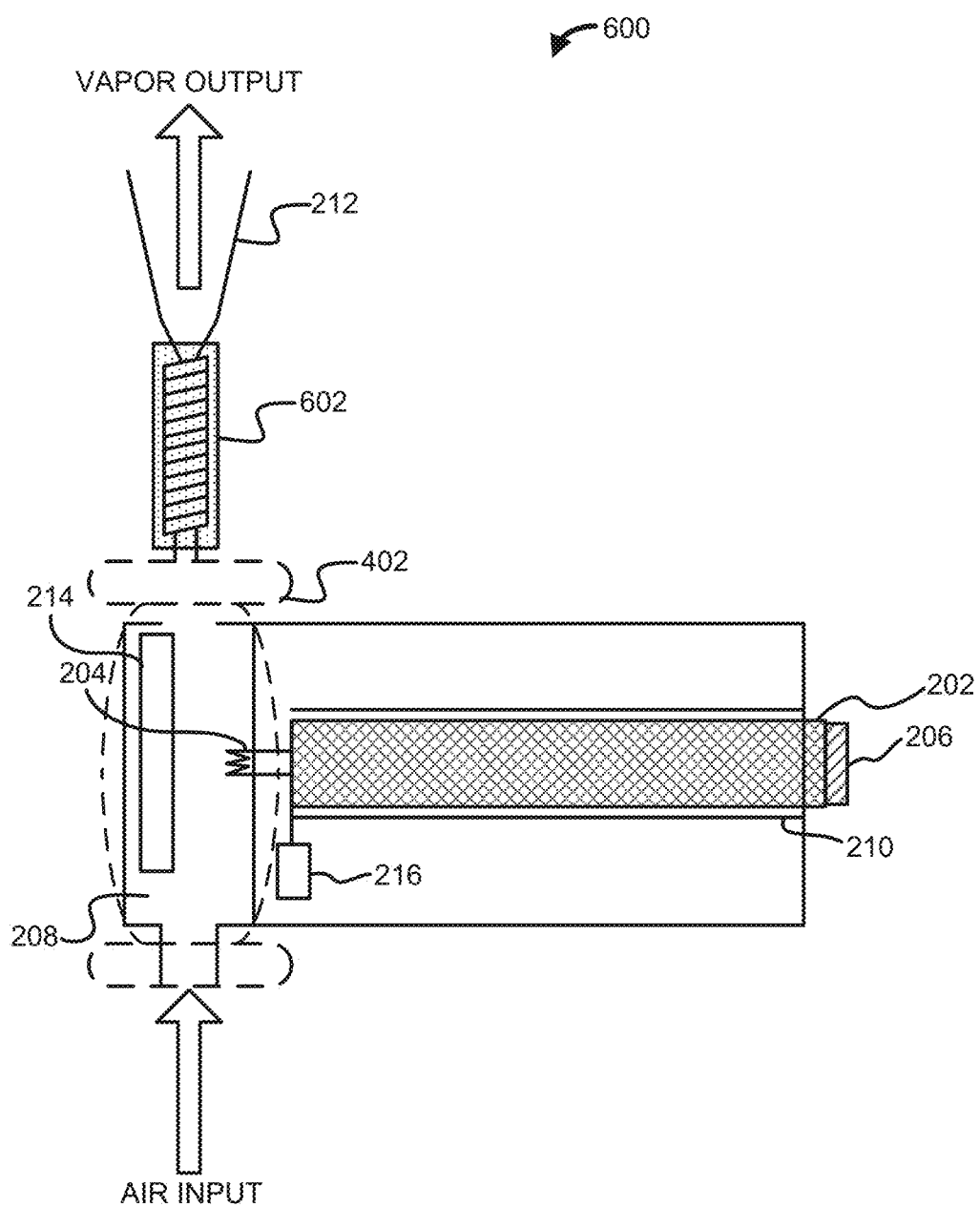
FIG. 6 illustrates another exemplary vaporizer configured for smooth vapor delivery.

FIG. 6 illustrates a vaporizer 600 that comprises the elements of the vaporizer 200 of FIG. 2 and FIG. 4, with the addition of a cooling element 602. The vaporizer 600 can optionally comprise the heating casing 402. The cooling element 602 can comprise one or more of a powered cooling element, a cooling air system, and/or or a cooling fluid system. The cooling element 602 can be self-powered, co-powered, or directly powered by a battery and/or charging system within the vapor device 100 (e.g., the power supply 120). In an aspect, the cooling element 602 can comprise an electrically connected conductive coil, grating, and/or other design to efficiently distribute cooling to the at least one of the vaporized and/or non-vaporized air. For example, the cooling element 602 can be configured to cool air as it is brought into the vaporizer 600/mixing chamber 208 and/or to cool vapor after it exits the mixing chamber 208. The cooling element 602 can be deployed such that the cooling element 602 is surrounded by the heated casing 402 and/or the heating element 214. In another aspect, the heated casing 402 and/or the heating element 214 can be surrounded by the cooling element 602. The cooling element 602 can utilize at least one of cooled air, cooled liquid, and/or cooled matter.

In an aspect, the cooling element 602 can be a coil of any suitable length and can reside proximate to the inhalation point of the vapor (e.g., the exhaust port 212). The temperature of the air is reduced as it travels through the cooling element 602. In an aspect, the cooling element 602 can comprise any structure that accomplishes a cooling effect. For example, the cooling element 602 can be replaced with a screen with a mesh or grid-like structure, a conical structure, and/or a series of cooling airlocks, either stationary or opening, in a periscopic/telescopic manner. The cooling element 602 can be any shape and/or can take multiple forms capable of cooling heated air, which passes through its space.

In an aspect, the cooling element 602 can be any suitable cooling system for use in a vapor device. For example, a fan, a heat sink, a liquid cooling system, a chemical cooling system, combinations thereof, and the like. In an aspect, the cooling element 602 can comprise a liquid cooling system whereby a fluid (e.g., water) passes through pipes in the vaporizer 600. As this fluid passes around the cooling element 602, the fluid absorbs heat, cooling air in the cooling element 602. After the fluid absorbs the heat, the fluid can pass through a heat exchanger which transfers the heat from the fluid to air blowing through the heat exchanger. By way of further example, the cooling element 602 can comprise a chemical cooling system that utilizes an endothermic reaction. An example of an endothermic reaction is dissolving ammonium nitrate in water. Such endothermic process is used in instant cold packs. These cold packs have a strong outer plastic layer that holds a bag of water and a chemical, or mixture of chemicals, that result in an endothermic reaction when dissolved in water. When the cold pack is squeezed, the inner bag of water breaks and the water mixes with the chemicals. The cold pack starts to cool as soon as the inner bag is broken, and stays cold for over an hour. Many instant cold packs contain ammonium nitrate. When ammonium nitrate is dissolved in water, it splits into positive ammonium ions and negative nitrate ions. In the process of dissolving, the water molecules contribute energy, and as a result, the water cools down. Thus, the vaporizer 600 can comprise a chamber for receiving the cooling element 602 in the form of a "cold pack." The cold pack can be activated prior to insertion into the vaporizer 600 or can be activated after insertion through use of a button/switch and the like to mechanically activate the cold pack inside the vaporizer 400.

In an aspect, the cooling element 602 can be selectively moved within the vaporizer 600 to control the temperature of the air mixing with vapor. For example, the cooling element 602 can be moved closer to the exhaust port 212 or further from the exhaust port 212 to regulate temperature. In another aspect, insulation can be incorporated as needed to maintain the integrity of heating and cooling, as well as absorbing any unwanted condensation due to internal or external conditions, or a combination thereof. The insulation can also be selectively moved within the vaporizer 600 to control the temperature of the air mixing with vapor. For example, the insulation can be moved to cover a portion, none, or all of the cooling element 602 to regulate temperature.

Figure 7:
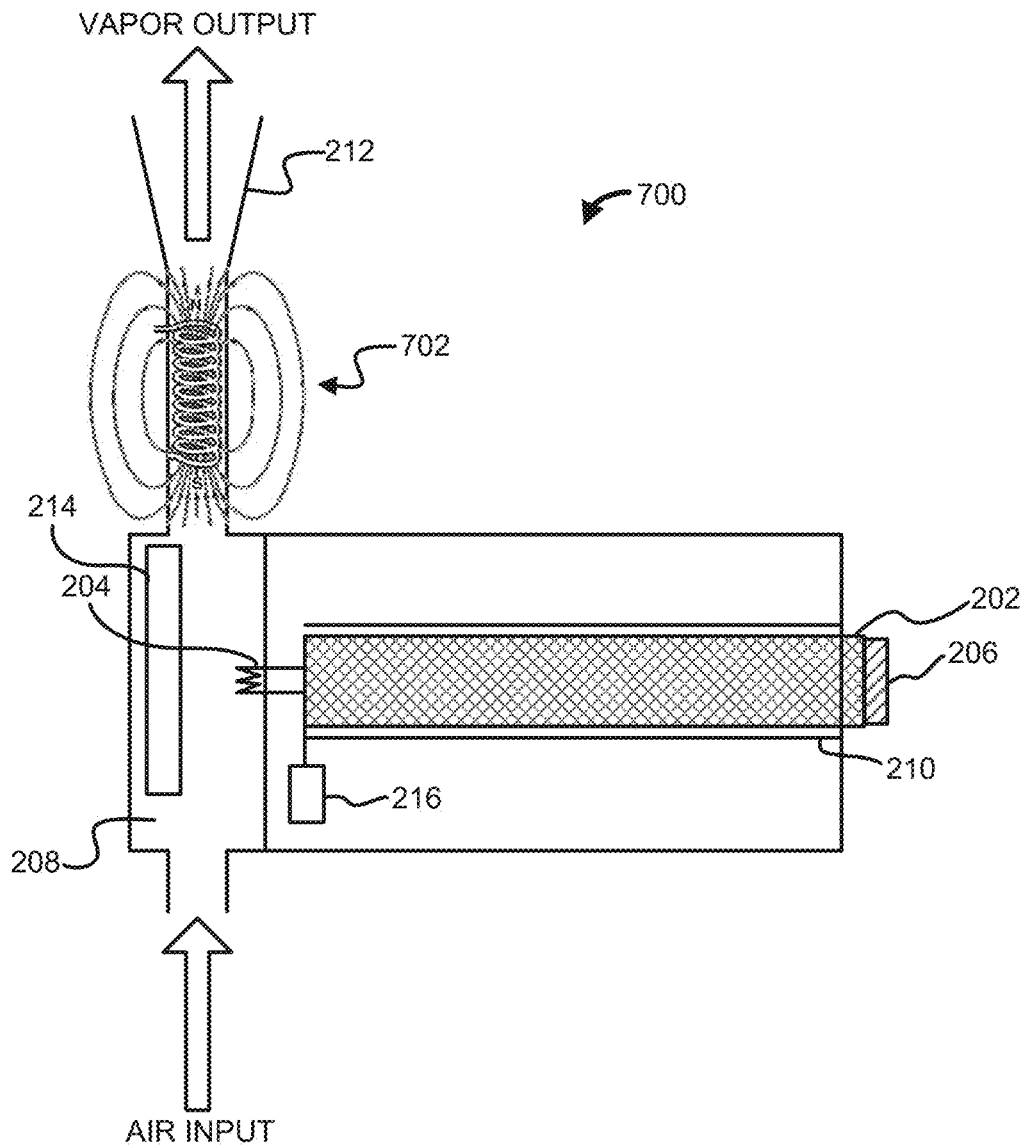
FIG. 7 illustrates another exemplary vaporizer configured for smooth vapor delivery.

FIG. 7 illustrates a vaporizer 700 that comprises elements in common with the vaporizer 200. The vaporizer 700 can optionally comprise the heating casing 402 (not shown) and/or the cooling element 602 (not shown). The vaporizer 700 can comprise a magnetic element 702. The magnetic element 702 can apply a magnetic field to vapor after exiting the mixing chamber 208. The magnetic field can cause positively and negatively charged particles in the vapor to curve in opposite directions, according to the Lorentz force law with two particles of opposite charge. The magnetic field can be created by at least one of an electric current generating a charge or a pre-charged magnetic material deployed within the vapor device 100. In an aspect, the magnetic element 702 can be built into the mixing chamber 208, the cooling element 602, the heating casing 402, or can be a separate magnetic element 702.

Figure 8:
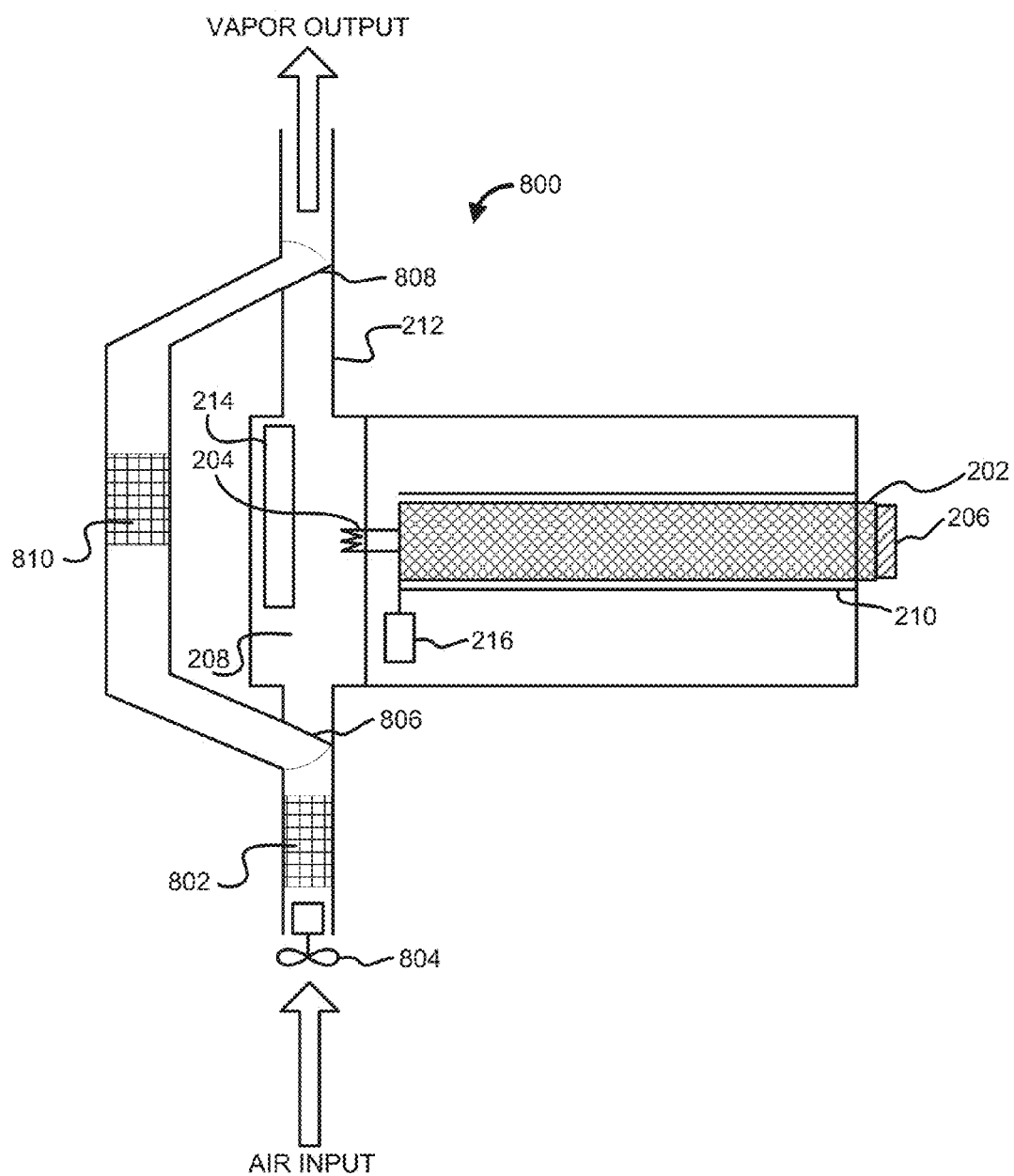
FIG. 8 illustrates an exemplary vaporizer configured for filtering air.

FIG. 8 illustrates a vaporizer 800 that comprises elements in common with the vaporizer 200. In an aspect, the vaporizer 800 can comprise a filtration element 802. The filtration element 802 can be configured to remove (e.g., filter, purify, etc) contaminants from air entering the vaporizer 800. The filtration element 802 can optionally comprise a fan 804 to assist in delivering air to the filtration element 802. The vaporizer 800 can be configured to intake air into the filtration element 802, filter the air, and pass the filtered air to the mixing chamber 208 for use in vaporizing the one or more vaporizable or non-vaporizable materials. In another aspect, the vaporizer 800 can be configured to intake air into the filtration element 802, filter the air, and bypass the mixing chamber 208 by engaging a door 806 and a door 808 to pass the filtered air directly to the exhaust port 212 for inhalation by a user. In an aspect, filtered air that bypasses the mixing chamber 208 by engaging the door 806 and the door 808 can pass through a second filtration element 810 to further remove (e.g., filter, purify, etc) contaminants from air entering the vaporizer 800. In an aspect, the vaporizer 800 can be configured to deploy and/or mix a proper/safe amount of oxygen which can be delivered either via the one or more replaceable cartridges 206 or via air pumped into a mask from external air and filtered through the filtration element 802 and/or the filtration element 810.

In an aspect, the filtration element 802 and/or the filtration element 810 can comprise cotton, polymer, wool, satin, meta materials and the like. The filtration element 802 and/or the filtration element 810 can comprise a filter material that at least one airborne particle and/or undesired gas by a mechanical mechanism, an electrical mechanism, and/or a chemical mechanism. The filter material can comprise one or more pieces of, a filter fabric that can filter out one or more airborne particles and/or gasses. The filter fabric can be a woven and/or non-woven material. The filter fabric can be made from natural fibers (e.g., cotton, wool, etc.) and/or from synthetic fibers (e.g., polyester, nylon, polypropylene, etc.). The thickness of the filter fabric can be varied depending on the desired filter efficiencies and/or the region of the apparel where the filter fabric is to be used. The filter fabric can be designed to filter airborne particles and/or gasses by mechanical mechanisms (e.g., weave density), by electrical mechanisms (e.g., charged fibers, charged metals, etc.), and/or by chemical mechanisms (e.g., absorptive charcoal particles, adsorptive materials, etc.). In as aspect, the filter material can comprise electrically charged fibers such as, but not limited to, FILTRETE by 3M. In another aspect, the filter material can comprise a high density material similar to material used for medical masks which are used by medical personnel in doctors' offices, hospitals, and the like. In an aspect, the filter material can be treated with an anti-bacterial solution and/or otherwise made from anti-bacterial materials. In another aspect, the filtration element 802 and/or the filtration element 810 can comprise electrostatic plates, ultraviolet light, a HEPA filter, combinations thereof, and the like.

Figure 9:
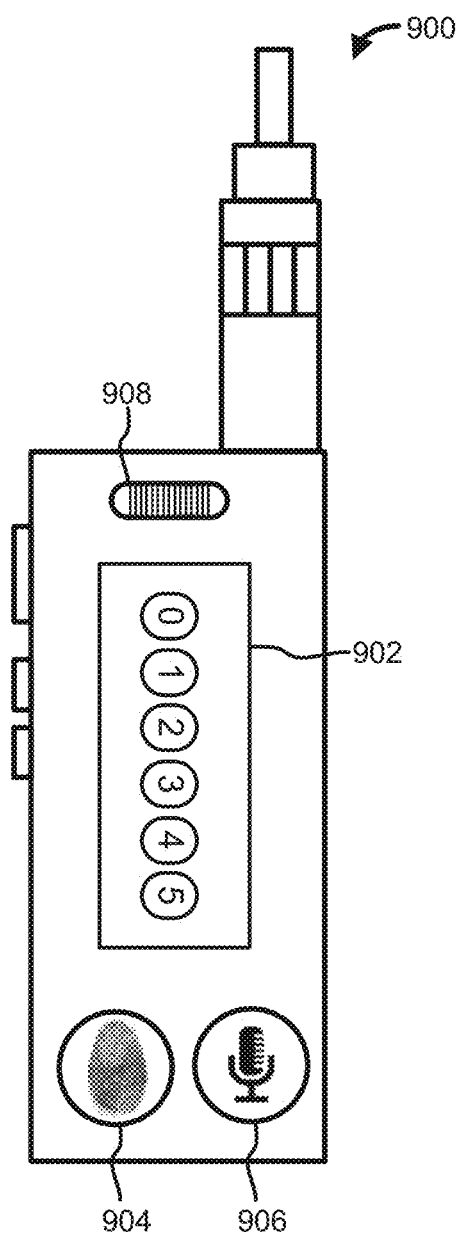
FIG. 9 illustrates an interface of an exemplary electronic vapor device.

FIG. 9 illustrates an exemplary vapor device 900. The exemplary vapor device 900 can comprise the vapor device 100 and/or any of the vaporizers disclosed herein. The exemplary vapor device 900 illustrates a display 902. The display 902 can be a touchscreen. The display 902 can be configured to enable a user to control any and/or all functionality of the exemplary vapor device 900. For example, a user can utilize the display 902 to enter a pass code to lock and/or unlock the exemplary vapor device 900. The exemplary vapor device 900 can comprise a biometric interface 904. For example, the biometric interface 904 can comprise a fingerprint scanner, an eye scanner, a facial scanner, and the like. The biometric interface 904 can be configured to enable a user to control any and/or all functionality of the exemplary vapor device 900. The exemplary vapor device 900 can comprise an audio interface 906. The audio interface 906 can comprise a button that, when engaged, enables a microphone 908. The microphone 908 can receive audio signals and provide the audio signals to a processor for interpretation into one or more commands to control one or more functions of the exemplary vapor device 900.

Figure 10:
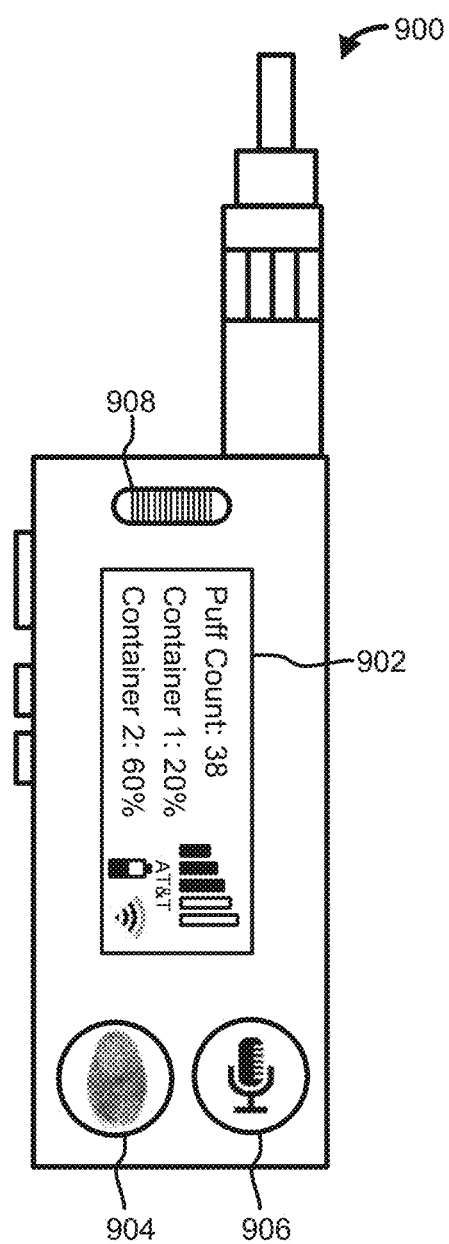
FIG. 10 illustrates another interface of an exemplary electronic vapor device.

FIG. 10 illustrates exemplary information that can be provided to a user via the display 902 of the exemplary vapor device 900. The display 902 can provide information to a user such as a puff count, an amount of vaporizable material remaining in one or more containers, battery remaining, signal strength, combinations thereof, and the like.

Figure 11:
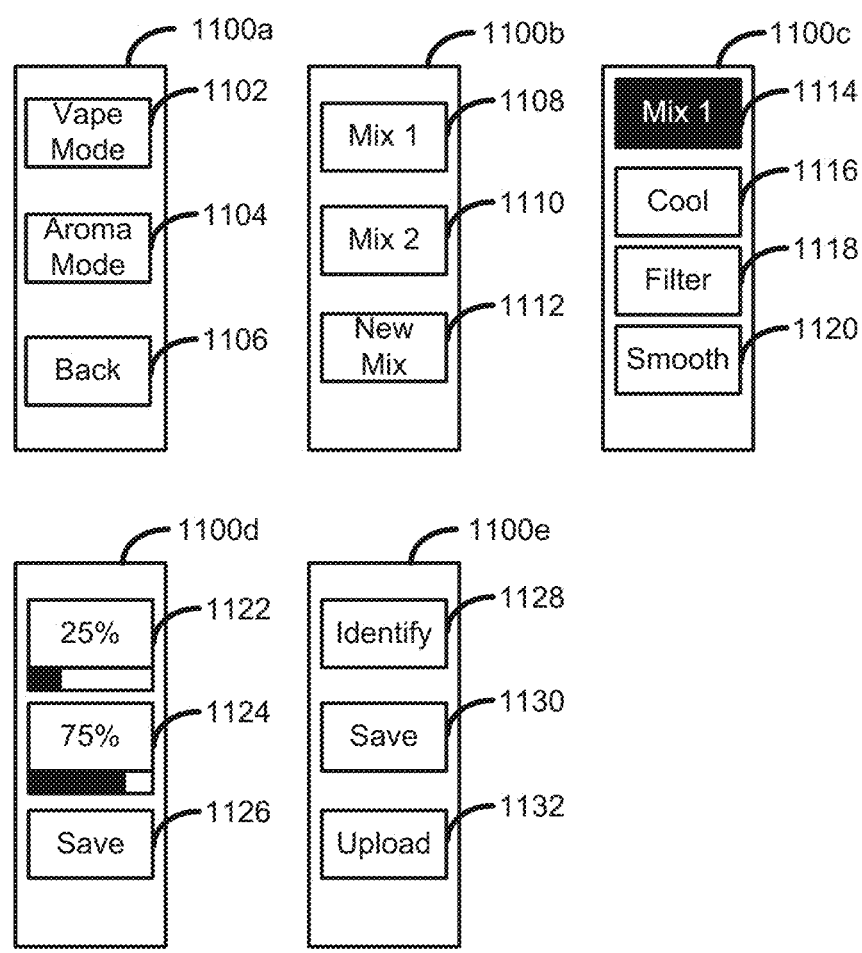
FIG. 11 illustrates several interfaces of an exemplary electronic vapor device.

FIG. 11 illustrates a series of user interfaces that can be provided via the display 902 of the exemplary vapor device 900. In an aspect, the exemplary vapor device 900 can be configured for one or more of multi-mode vapor usage. For example, the exemplary vapor device 900 can be configured to enable a user to inhale vapor (vape mode) or to release vapor into the atmosphere (aroma mode). User interface 1100a provides a user with interface elements to select which mode the user wishes to engage, a Vape Mode 1102, an Aroma Mode 1104, or an option to go back 1106 and return to the previous screen. The interface element Vape Mode 1102 enables a user to engage a vaporizer to generate a vapor for inhalation. The interface element Aroma Mode 1104 enables a user to engage the vaporizer to generate a vapor for release into the atmosphere.

In the event a user selects the Vape Mode 1102, the exemplary vapor device 900 will be configured to vaporize material and provide the resulting vapor to the user for inhalation. The user can be presented with user interface 1100b which provides the user an option to select interface elements that will determine which vaporizable material to vaporize. For example, an option of Mix 1 1108, Mix 2 1110, or a New Mix 1112. The interface element Mix 1 1108 enables a user to engage one or more containers that contain vaporizable material in a predefined amount and/or ratio. In an aspect, a selection of Mix 1 1108 can result in the exemplary vapor device 900 engaging a single container containing a single type of vaporizable material or engaging a plurality of containers containing a different types of vaporizable material in varying amounts. The interface element Mix 2 1110 enables a user to engage one or more containers that contain vaporizable material in a predefined amount and/or ratio. In an aspect, a selection of Mix 2 1110 can result in the exemplary vapor device 900 engaging a single container containing a single type of vaporizable material or engaging a plurality of containers containing a different types of vaporizable material in varying amounts. In an aspect, a selection of New Mix 1112 can result in the exemplary vapor device 900 receiving a new mixture, formula, recipe, etc. . . . of vaporizable materials and/or engage one or more containers that contain vaporizable material in the new mixture.

Upon selecting, for example, the Mix 1 1108, the user can be presented with user interface 1100c. User interface 1100c indicates to the user that Mix 1 has been selected via an indicator 1114. The user can be presented with options that control how the user wishes to experience the selected vapor. The user can be presented with interface elements Cool 1116, Filter 1118, and Smooth 1120. The interface element Cool 1116 enables a user to engage one or more cooling elements to reduce the temperature of the vapor. The interface element Filter 1118 enables a user to engage one or more filter elements to filter the air used in the vaporization process. The interface element Smooth 1120 enables a user to engage one or more heating casings, cooling elements, filter elements, and/or magnetic elements to provide the user with a smoother vaping experience.

Upon selecting New Mix 1112, the user can be presented with user interface 1100d. User interface 1100d provides the user with a container one ratio interface element 1122, a container two ratio interface element 1124, and Save 1126. The container one ratio interface element 1122 and the container two ratio interface element 1124 provide a user the ability to select an amount of each type of vaporizable material contained in container one and/or container two to utilize as a new mix. The container one ratio interface element 1122 and the container two ratio interface element 1124 can provide a user with a slider that adjusts the percentages of each type of vaporizable material based on the user dragging the slider. In an aspect, a mix can comprise 100% on one type of vaporizable material or any percent combination (e.g., 50/50, 75/25, 85/15, 95/5, etc. . . . ). Once the user is satisfied with the new mix, the user can select Save 1126 to save the new mix for later use.

In the event a user selects the Aroma Mode 1104, the exemplary vapor device 900 will be configured to vaporize material and release the resulting vapor into the atmosphere. The user can be presented with user interface 1100b, 1100c, and/or 1100d as described above, but the resulting vapor will be released to the atmosphere.

In an aspect, the user can be presented with user interface 1100e. The user interface 1100e can provide the user with interface elements Identify 1128, Save 1130, and Upload 1132. The interface element Identify 1128 enables a user to engage one or more sensors in the exemplary vapor device 900 to analyze the surrounding environment. For example, activating the interface element Identify 1128 can engage a sensor to determine the presence of a negative environmental condition such as smoke, a bad smell, chemicals, etc. Activating the interface element Identify 1128 can engage a sensor to determine the presence of a positive environmental condition, for example, an aroma. The interface element Save 1130 enables a user to save data related to the analyzed negative and/or positive environmental condition in memory local to the exemplary vapor device 900. The interface element Upload 1132 enables a user to engage a network access device to transmit data related to the analyzed negative and/or positive environmental condition to a remote server for storage and/or analysis.

Figure 12:
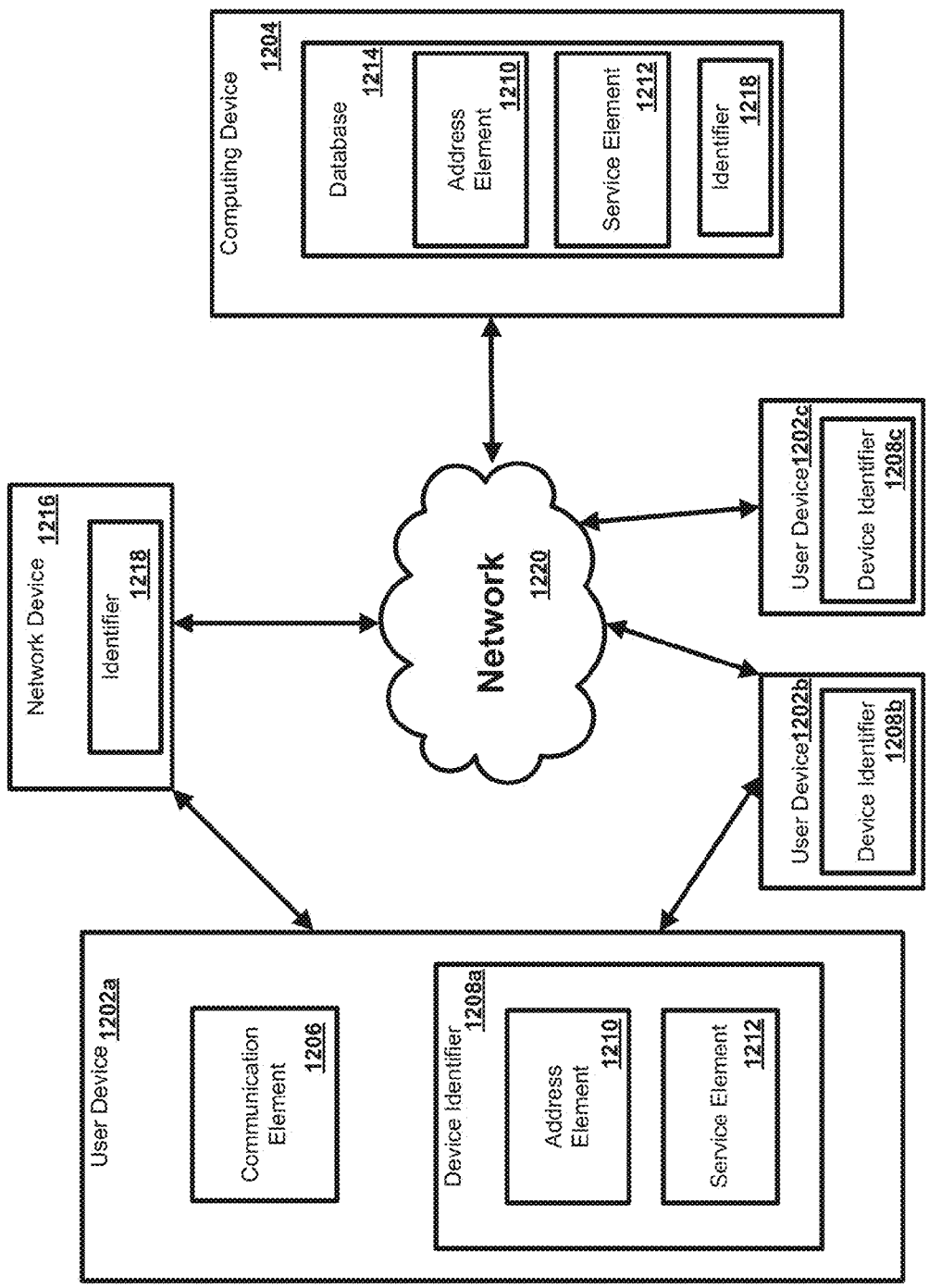
FIG. 12 illustrates an exemplary operating environment.

In one aspect of the disclosure, a system can be configured to provide services such as network-related services to a user device. FIG. 12 illustrates various aspects of an exemplary environment in which the present methods and systems can operate. The present disclosure is relevant to systems and methods for providing services to a user device, for example, electronic vapor devices which can include, but are not limited to, a vape-bot, micro-vapor device, vapor pipe, e-cigarette, hybrid handset and vapor device, and the like. Other user devices that can be used in the systems and methods include, but are not limited to, a smart watch (and any other form of "smart" wearable technology), a smartphone, a tablet, a laptop, a desktop, and the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods can be used in various types of networks and systems that employ both digital and analog equipment. One skilled in the art will appreciate that provided herein is a functional description and that the respective functions can be performed by software, hardware, or a combination of software and hardware.

The network and system can comprise a user device 1202a, 1202b, and/or 1202c in communication with a computing device 1204 such as a server, for example. The computing device 1204 can be disposed locally or remotely relative to the user device 1202a, 1202b, and/or 1202c. As an example, the user device 1202a, 1202b, and/or 1202c and the computing device 1204 can be in communication via a private and/or public network 1220 such as the Internet or a local area network. Other forms of communications can be used such as wired and wireless telecommunication channels, for example. In another aspect, the user device 1202a, 1202b, and/or 1202c can communicate directly without the use of the network 1220 (for example, via Bluetooth®, infrared, and the like).

In an aspect, the user device 1202a, 1202b, and/or 1202c can be an electronic device such as an electronic vapor device (e.g., vape-bot, micro-vapor device, vapor pipe, e-cigarette, hybrid handset and vapor device), a smartphone, a smart watch, a computer, a smartphone, a laptop, a tablet, a set top box, a display device, or other device capable of communicating with the computing device 1204. As an example, the user device 1202a, 1202b, and/or 1202c can comprise a communication element 1206 for providing an interface to a user to interact with the user device 1202a, 1202b, and/or 1202c and/or the computing device 1204. The communication element 1206 can be any interface for presenting and/or receiving information to/from the user, such as user feedback. An example interface can be communication interface such as a web browser (e.g., Internet Explorer, Mozilla Firefox, Google Chrome, Safari, or the like). Other software, hardware, and/or interfaces can be used to provide communication between the user and one or more of the user device 1202a, 1202b, and/or 1202c and the computing device 1204. In an aspect, the user device 1202a, 1202b, and/or 1202c can have at least one similar interface quality such as a symbol, a voice activation protocol, a graphical coherence, a startup sequence continuity element of sound, light, vibration or symbol. In an aspect, the interface can comprise at least one of lighted signal lights, gauges, boxes, forms, words, video, audio scrolling, user selection systems, vibrations, check marks, avatars, matrix', visual images, graphic designs, lists, active calibrations or calculations, 2D interactive fractal designs, 3D fractal designs, 2D and/or 3D representations of vapor devices and other interface system functions.

As an example, the communication element 1206 can request or query various files from a local source and/or a remote source. As a further example, the communication element 1206 can transmit data to a local or remote device such as the computing device 1204. In an aspect, data can be shared anonymously with the computing device 1204. The data can be shared over a transient data session with the computing device 1204. The transient data session can comprise a session limit. The session limit can be based on one or more of a number of puffs, a time limit, and a total quantity of vaporizable material. The data can comprise usage data and/or a usage profile. The computing device 1204 can destroy the data once the session limit is reached.

In an aspect, the user device 1202a, 1202b, and/or 1202c can be associated with a user identifier or device identifier 1208a, 1208b, and/or 1208c. As an example, the device identifier 1208a, 1208b, and/or 1208c can be any identifier, token, character, string, or the like, for differentiating one user or user device (e.g., user device 1202a, 1202b, and/or 1202c) from another user or user device. In a further aspect, the device identifier 1208a, 1208b, and/or 1208c can identify a user or user device as belonging to a particular class of users or user devices. As a further example, the device identifier 1208a, 1208b, and/or 1208c can comprise information relating to the user device such as a manufacturer, a model or type of device, a service provider associated with the user device 1202a, 1202b, and/or 1202c, a state of the user device 1202a, 1202b, and/or 1202c, a locator, and/or a label or classifier. Other information can be represented by the device identifier 1208a, 1208b, and/or 1208c.

In an aspect, the device identifier 1208a, 1208b, and/or 1208c can comprise an address element 1210 and a service element 1212. In an aspect, the address element 1210 can comprise or provide an internet protocol address, a network address, a media access control (MAC) address, an Internet address, or the like. As an example, the address element 1210 can be relied upon to establish a communication session between the user device 1202a, 1202b, and/or 1202c and the computing device 1204 or other devices and/or networks. As a further example, the address element 1210 can be used as an identifier or locator of the user device 1202a, 1202b, and/or 1202c. In an aspect, the address element 1210 can be persistent for a particular network.

In an aspect, the service element 1212 can comprise an identification of a service provider associated with the user device 1202a, 1202b, and/or 1202c and/or with the class of user device 1202a, 1202b, and/or 1202c. The class of the user device 1202a, 1202b, and/or 1202c can be related to a type of device, capability of device, type of service being provided, and/or a level of service. As an example, the service element 1212 can comprise information relating to or provided by a communication service provider (e.g., Internet service provider) that is providing or enabling data flow such as communication services to and/or between the user device 1202a, 1202b, and/or 1202c. As a further example, the service element 1212 can comprise information relating to a preferred service provider for one or more particular services relating to the user device 1202a, 1202b, and/or 1202c. In an aspect, the address element 1210 can be used to identify or retrieve data from the service element 1212, or vice versa. As a further example, one or more of the address element 1210 and the service element 1212 can be stored remotely from the user device 1202a, 1202b, and/or 1202c and retrieved by one or more devices such as the user device 1202a, 1202b, and/or 1202c and the computing device 1204. Other information can be represented by the service element 1212.

In an aspect, the computing device 1204 can be a server for communicating with the user device 1202a, 1202b, and/or 1202c. As an example, the computing device 1204 can communicate with the user device 1202a, 1202b, and/or 1202c for providing data and/or services. As an example, the computing device 1204 can provide services such as data sharing, data syncing, network (e.g., Internet) connectivity, network printing, media management (e.g., media server), content services, streaming services, broadband services, or other network-related services. In an aspect, the computing device 1204 can allow the user device 1202a, 1202b, and/or 1202c to interact with remote resources such as data, devices, and files. As an example, the computing device can be configured as (or disposed at) a central location, which can receive content (e.g., data) from multiple sources, for example, user devices 1202a, 1202b, and/or 1202c. The computing device 1204 can combine the content from the multiple sources and can distribute the content to user (e.g., subscriber) locations via a distribution system.

In an aspect, one or more network devices 1216 can be in communication with a network such as network 1220. As an example, one or more of the network devices 1216 can facilitate the connection of a device, such as user device 1202a, 1202b, and/or 1202c, to the network 1220. As a further example, one or more of the network devices 1216 can be configured as a wireless access point (WAP). In an aspect, one or more network devices 1216 can be configured to allow one or more wireless devices to connect to a wired and/or wireless network using Wi-Fi, Bluetooth or any desired method or standard.

In an aspect, the network devices 1216 can be configured as a local area network (LAN). As an example, one or more network devices 1216 can comprise a dual band wireless access point. As an example, the network devices 1216 can be configured with a first service set identifier (SSID) (e.g., associated with a user network or private network) to function as a local network for a particular user or users. As a further example, the network devices 1216 can be configured with a second service set identifier (SSID) (e.g., associated with a public/community network or a hidden network) to function as a secondary network or redundant network for connected communication devices.

In an aspect, one or more network devices 1216 can comprise an identifier 1218. As an example, one or more identifiers can be or relate to an Internet Protocol (IP) Address IPV4/IPV6 or a media access control address (MAC address) or the like. As a further example, one or more identifiers 1218 can be a unique identifier for facilitating communications on the physical network segment. In an aspect, each of the network devices 1216 can comprise a distinct identifier 1218. As an example, the identifiers 1218 can be associated with a physical location of the network devices 1216.

In an aspect, the computing device 1204 can manage the communication between the user device 1202a, 1202b, and/or 1202c and a database 1214 for sending and receiving data therebetween. As an example, the database 1214 can store a plurality of files (e.g., web pages), user identifiers or records, or other information. In one aspect, the database 1214 can store user device 1202a, 1202b, and/or 1202c usage information (including chronological usage), type of vaporizable and/or non-vaporizable material used, frequency of usage, location of usage, recommendations, communications (e.g., text messages, advertisements, photo messages), simultaneous use of multiple devices, and the like). The database 1214 can collect and store data to support cohesive use, wherein cohesive use is indicative of the use of a first electronic vapor devices and then a second electronic vapor device is synced chronologically and logically to provide the proper specific properties and amount of vapor based upon a designed usage cycle. As a further example, the user device 1202a, 1202b, and/or 1202c can request and/or retrieve a file from the database 1214. The user device 1202a, 1202b, and/or 1202c can thus sync locally stored data with more current data available from the database 1214. Such syncing can be set to occur automatically on a set time schedule, on demand, and/or in real-time. The computing device 1204 can be configured to control syncing functionality. For example, a user can select one or more of the user device 1202a, 1202b, and/or 1202c to never by synced, to be the master data source for syncing, and the like. Such functionality can be configured to be controlled by a master user and any other user authorized by the master user or agreement.

In an aspect, data can be derived by system and/or device analysis. Such analysis can comprise at least by one of instant analysis performed by the user device 1202a, 1202b, and/or 1202c or archival data transmitted to a third party for analysis and returned to the user device 1202a, 1202b, and/or 1202c and/or computing device 1204. The result of either data analysis can be communicated to a user of the user device 1202a, 1202b, and/or 1202c to, for example, inform the user of their eVapor use and/or lifestyle options. In an aspect, a result can be transmitted back to at least one authorized user interface.

In an aspect, the database 1214 can store information relating to the user device 1202a, 1202b, and/or 1202c such as the address element 1210 and/or the service element 1212. As an example, the computing device 1204 can obtain the device identifier 1208a, 1208b, and/or 1208c from the user device 1202a, 1202b, and/or 1202c and retrieve information from the database 1214 such as the address element 1210 and/or the service elements 1212. As a further example, the computing device 1204 can obtain the address element 1210 from the user device 1202a, 1202b, and/or 1202c and can retrieve the service element 1212 from the database 1214, or vice versa. Any information can be stored in and retrieved from the database 1214. The database 1214 can be disposed remotely from the computing device 1204 and accessed via direct or indirect connection. The database 1214 can be integrated with the computing device 1204 or some other device or system. Data stored in the database 1214 can be stored anonymously and can be destroyed based on a transient data session reaching a session limit.

Figure 13:
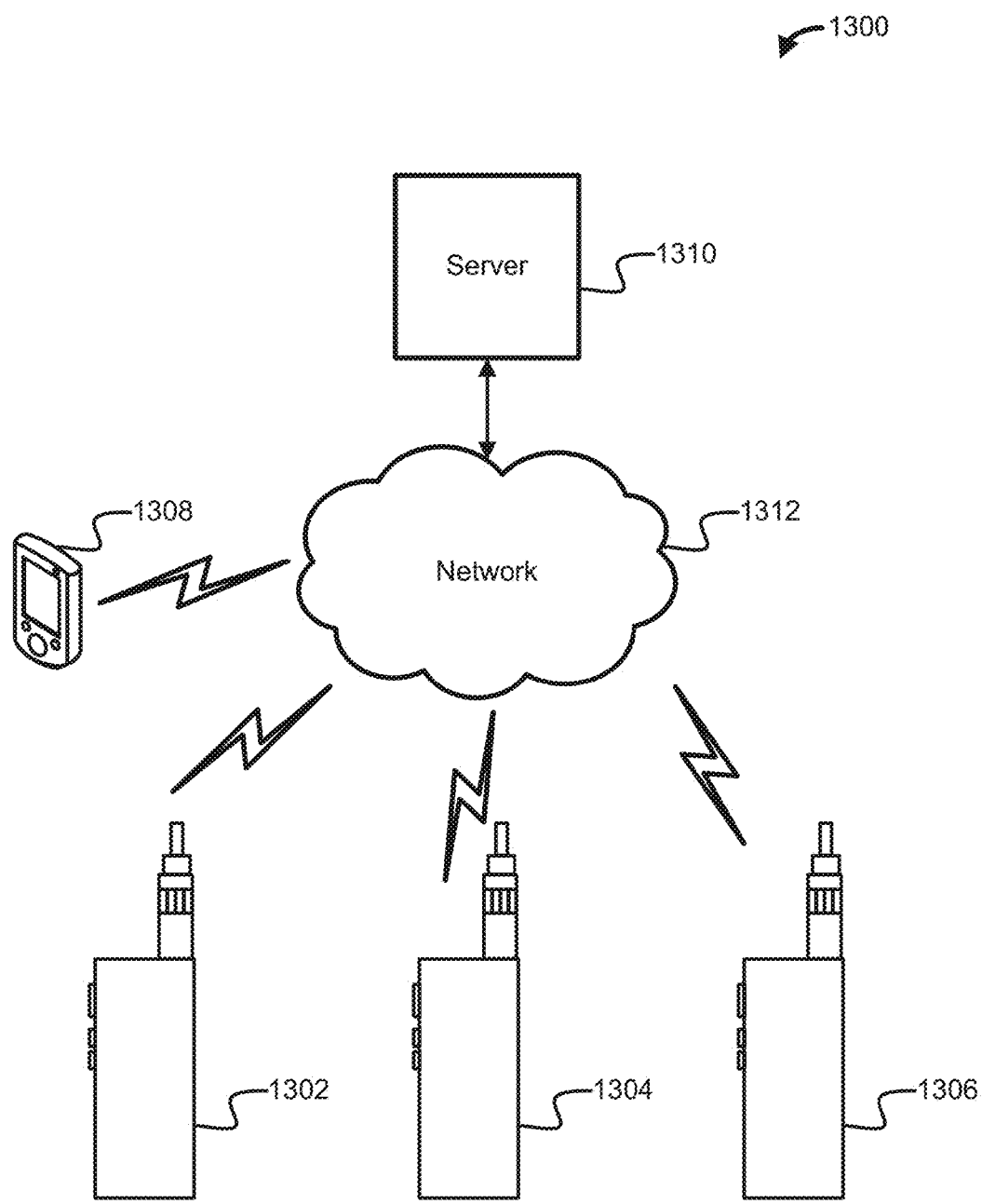
FIG. 13 illustrates another exemplary operating environment.

FIG. 13 illustrates an ecosystem 1300 configured for sharing and/or syncing data such as usage information (including chronological usage), type of vaporizable and/or non-vaporizable material used, frequency of usage, location of usage, recommendations, communications (e.g., text messages, advertisements, photo messages), simultaneous use of multiple devices, and the like) between one or more devices such as a vapor device 1302, a vapor device 1304, a vapor device 1306, and an electronic communication device 1308. In an aspect, the vapor device 1302, the vapor device 1304, the vapor device 1306 can be one or more of an e-cigarette, an e-cigar, an electronic vapor modified device, a hybrid electronic communication handset coupled/integrated vapor device, a micro-sized electronic vapor device, or a robotic vapor device. In an aspect, the electronic communication device 1308 can comprise one or more of a smartphone, a smart watch, a tablet, a laptop, and the like.

In an aspect data generated, gathered, created, etc., by one or more of the vapor device 1302, the vapor device 1304, the vapor device 1306, and/or the electronic communication device 1308 can be uploaded to and/or downloaded from a central server 1310 via a network 1312, such as the Internet. Such uploading and/or downloading can be performed via any form of communication including wired and/or wireless. In an aspect, the vapor device 1302, the vapor device 1304, the vapor device 1306, and/or the electronic communication device 1308 can be configured to communicate via cellular communication, WiFi communication, Bluetooth® communication, satellite communication, and the like. The central server 1310 can store uploaded data and associate the uploaded data with a user and/or device that uploaded the data. The central server 1310 can access unified account and tracking information to determine devices that are associated with each other, for example devices that are owned/used by the same user. The central server 1310 can utilize the unified account and tracking information to determine which of the vapor device 1302, the vapor device 1304, the vapor device 1306, and/or the electronic communication device 1308, if any, should receive data uploaded to the central server 1310.

In an aspect, the uploading and downloading can be performed anonymously. The data can be shared over a transient data session with the central server 1310. The transient data session can comprise a session limit. The session limit can be based on one or more of a number of puffs, a time limit, and a total quantity of vaporizable material. The data can comprise usage data and/or a usage profile. The central server 1310 can destroy the data once the session limit is reached. While the transient data session is active, the central server 1310 can provide a usage profile to one of the vapor device 1302, the vapor device 1304, the vapor device 1306 to control the functionality for the duration of the transient data session.

For example, the vapor device 1302 can be configured to upload usage information related to vaporizable material consumed and the electronic communication device 1308 can be configured to upload location information related to location of the vapor device 1302. The central server 1310 can receive both the usage information and the location information, access the unified account and tracking information to determine that both the vapor device 1302 and the electronic communication device 1308 are associated with the same user. The central server 1310 can thus correlate the user's location along with the type, amount, and/or timing of usage of the vaporizable material. The central server 1310 can further determine which of the other devices are permitted to receive such information and transmit the information based on the determined permissions. In an aspect, the central server 1310 can transmit the correlated information to the electronic communication device 1308 which can then subsequently use the correlated information to recommend a specific type of vaporizable material to the user when the user is located in the same geographic position indicated by the location information.

In another aspect, the central server 1310 can provide one or more social networking services for users of the vapor device 1302, the vapor device 1304, the vapor device 1306, and/or the electronic communication device 1308. Such social networking services include, but are not limited to, messaging (e.g., text, image, and/or video), mixture sharing, product recommendations, location sharing, product ordering, and the like.

In an aspect, illustrated in FIG. 14A, FIG. 14B, and FIG. 14C, provided is an example vapor device 1400. As shown in FIG. 14A, the vapor device 1400 can comprise a smartphone 1402 and a detachable vaporizer 1404. The smartphone 1402 and the detachable vaporizer 1404 can connect via an input/output port 1406 on the smartphone 1402 and an input/output port 1408 on the detachable vaporizer 1404. The input/output port 1406 and the input/output port 1408 can adhere to any proprietary standard. In another aspect, the input/output port 1406 and the input/output port 1408 can comprise one or more of, a USB connection, a dock connector (e.g., 20-24-30 pin connectors, lightning port connection, etc), Portable Digital Media Interface, and the like. The input/output port 1406 and the input/output port 1408 can be used to pass power and/or data between the smartphone 1402 and the detachable vaporizer 1404.

The detachable vaporizer 1404 can comprise a vaporize button 1410 that can be configured to initiate a process of vaporizing a vaporizable material contained within the detachable vaporizer 1404, resulting in vapor exiting an exhaust port 1412 for inhalation by a user. The exhaust port 1412 can be hingedly attached to the detachable vaporizer 1404 to enable the exhaust port 1412 to be stored within a housing of the detachable vaporizer 1404. The detachable vaporizer 1404 can comprise an exhaust port release button 1414 to disengage the exhaust port 1412 when stored and locked within the housing of the detachable vaporizer 1404. FIG. 14B illustrates the vapor device 1400 after the smartphone 1402 and the detachable vaporizer 1404 have been coupled via the input/output port 1406 and the input/output port 1408. The detachable vaporizer 1404 can comprise a locking mechanism 1416. The locking mechanism 1416 can be configured to secure the detachable vaporizer 1404 to the smartphone 1402.

FIG. 14C illustrates the detachable vaporizer 1404. In an aspect, the detachable vaporizer 1404 can comprise any vaporizer disclosed herein. The detachable vaporizer 1404 can receive air through an input/output port 1418. The received air can pass into a mixing chamber 1420. The detachable vaporizer 1404 can comprise or be coupled to one or more containers 1422 containing a vaporizable material, for example a fluid. A wick 1424, or a valve, can couple the one or more containers 1422 to the mixing chamber 1420. Coupling can operate independently of gravity, such as by capillary action or pressure drop through a valve. The detachable vaporizer 1404 can be configured to vaporize the vaporizable material from the one or more containers 1422 at controlled rates in response to mechanical input from the vaporize button 1410 and/or in response to control signals from the smartphone 1402 or another component. Vaporizable material (e.g., fluid) can be supplied by one or more replaceable cartridges. The one or more replaceable cartridges can contain a vaporizable material. If the vaporizable material is liquid, the cartridge can comprise the wick 1424 to aid in transporting the liquid to a mixing chamber 1420. In the alternative, some other transport mode can be used. In an aspect, one or more materials can be vaporized at a single time by the detachable vaporizer 1404.

In operation, a heating element 1426 can vaporize or nebulize the vaporizable material in the mixing chamber 1420, producing an inhalable vapor/mist that can be expelled via the exhaust port 1412. In an aspect, the heating element 1426 can be coupled to the wick (or a heated wick) 1424 and operatively coupled to (for example, in fluid communication with) the mixing chamber 1420. The heating element 1426 can comprise a nickel-chromium wire or the like, with a temperature sensor (not shown) such as a thermistor or thermocouple. Within definable limits, by controlling power to the wick 1424, a rate of vaporization can be independently controlled. The heating element 1426 can receive power through the input/output port 1406 and the input/output port 1408. For example, the heating element 1426 can receive power from a power supply built into the smartphone 1402. The heating element 1426 can vaporize or nebulize the vaporizable material in the mixing chamber 1420. The detachable vaporizer 1404 can exchange data signals with a processor of the smartphone 1402 through the input/output port 1406 and the input/output port 1408 for control of the detachable vaporizer 1404.

Figure 14D:
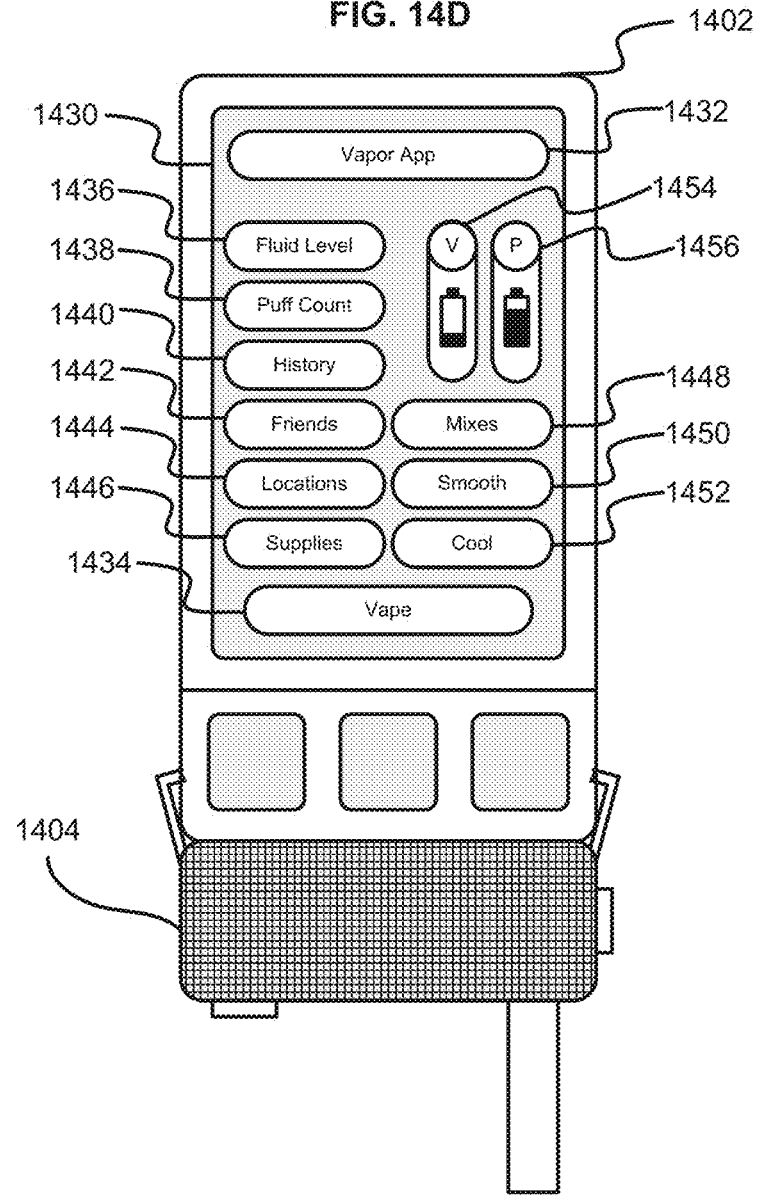
FIG. 14D illustrates an exemplary vaporizer apparatus and user interface.

FIG. 14D illustrates a user interface 1430 that can be provided via a display of the smartphone 1402. User interface 1430 can comprise a header "Vapor App" 1432, identifying to a user the application that is running on the smartphone 1402 is a vaping application. The user interface 1430 can provide a user with an interface element Vape 1434 enables a user to engage the vaporizer 1404 to generate a vapor for inhalation.

The user interface 1430 can provide a user with an interface element Fluid Level 1436 that enables a user to receive information related to the amount of vaporizable material remaining in one or more containers of the vaporizer 1404. The user interface 1430 can provide a user with an interface element Puff Count 1438 that enables a user to receive information related to an estimated number of inhalations remaining given current fluid levels in one or more containers of the vaporizer 1404.

The user interface 1430 can provide a user with an interface element History 1440 that enables a user to receive historical information related to the user's vaping behavior. For example, when, where, what type of vaporizable material, what friends were in proximity, what music was playing on the smartphone 1402, combinations thereof and the like. The user interface 1430 can provide a user with an interface element Friends 1442 that enables a user to engage a social networking module to access a friend list, determine locations of friends on the friend list, determine vaping history of friends on the friend list, message friends on the friend list, combinations thereof and the like.

The user interface 1430 can provide a user with an interface element Locations 1444 that enables a user to identify one or more locations providing vaping services, locations that are vaping friendly, and the like. The user interface 1430 can provide a user with an interface element Supplies 1446 that enables a user to engage an e-commerce module to order vaping supplies, custom mixes, and the like.

The user interface 1430 can provides the user an option to select interface elements that will determine which vaporizable material to vaporize. The user interface 1430 can provide a user with an interface element Mixes 1448 that enables a user to engage one or more containers that contain vaporizable material in a predefined amount and/or ratio. For example, selection of the interface element Mixes 1448 can result in engaging a single container containing a single type of vaporizable material or engaging a plurality of containers containing different types of vaporizable material in varying amounts. In an aspect, selection of the interface element Mixes 1448 can result in display of one or more additional interfaces.

The one or more additional interfaces can provide a user the ability to select an amount of each type of vaporizable material contained in a first container and/or second container. Any number of containers is contemplated. The user can be presented with a slider that adjusts the percentages of each type of vaporizable material based on dragging the slider. In an aspect, a mix can comprise 100% on one type of vaporizable material or any percent combination (e.g., 50/50, 75/25, 85/15, 95/5, etc. . . . ).

The user interface 1430 can provide a user with an interface element Smooth 1450 that enables a user to engage one or more heating casings, cooling elements, filter elements, and/or magnetic elements to provide the user with a smoother vaping experience. The user interface 1430 can provide a user with an interface element Cool 1452 that enables a user to engage one or more cooling elements of the vaporizer 1404 to reduce the temperature of the vapor.

The user interface 1430 can provide a user with an interface element representing vaporizer 1404 battery power remaining 1454 and an interface element representing smartphone 1402 battery power remaining 1456. In an aspect, a user can selectively engage/disengage power to the vaporizer 1404 by sliding the interface element 1454 and/or the interface element 1456 to cover (disengage) or uncover (engage) power from a battery located in the vaporizer 1404 and a battery located in the smartphone 1402. In this manner, the user can choose to power the vaporizer 1404 from either the vaporizer battery or the smartphone battery, or both. The user can choose to cut all power to the vaporizer 1404 as well.

In an aspect, illustrated in FIG. 15A, FIG. 15B, and FIG. 15C, provided is an example vapor device 1500. As shown in FIG. 15A, the vapor device 1500 can comprise a smartphone 1402 and a detachable vaporizer 1502. The detachable vaporizer 1502 can comprise a vaporize button 1504 that can be configured to initiate a process of vaporizing a vaporizable material contained within the detachable vaporizer 1502, resulting in vapor exiting an exhaust port 1506 for inhalation by a user. The exhaust port 1506 can be hingedly attached to the detachable vaporizer 1502 to enable the exhaust port 1506 to be stored within a housing of the detachable vaporizer 1502. The detachable vaporizer 1502 can comprise an exhaust port release button 1508 to disengage the exhaust port 1506 when stored and locked within the housing of the detachable vaporizer 1502.

FIG. 15B illustrates the detachable vaporizer 1502 without being coupled to the smartphone 1402. The detachable vaporizer 1502 can comprise an input/output port 1510. The input/output port 1510 can couple to the input/output port (not shown) of the smartphone 1402. The input/output port of the smartphone and the input/output port 1510 can adhere to any proprietary standard. In another aspect, the input/output port of the smartphone and the input/output port 1510 can comprise one or more of a USB connection, a dock connector (e.g., 20-24-30 pin connectors, lightning port connection, etc), Portable Digital Media Interface, and the like. The input/output port of the smartphone and the input/output port 1510 can be used to pass power and/or data between the smartphone 1402 and the detachable vaporizer 1502.

FIG. 15C illustrates the detachable vaporizer 1502. In an aspect, the detachable vaporizer 1502 can comprise any vaporizer disclosed herein. The detachable vaporizer 1502 can receive air through an input/output port 1512. The received air can pass into a mixing chamber 1514. The detachable vaporizer 1502 can comprise or be coupled to one or more containers 1516 containing a vaporizable material, for example a fluid. A wick 1518, or a valve, can couple the one or more containers 1516 to the mixing chamber 1514. Coupling can operate independently of gravity, such as by capillary action or pressure drop through a valve. The detachable vaporizer 1502 can be configured to vaporize the vaporizable material from the one or more containers 1516 at controlled rates in response to mechanical input from the vaporize button 1508 and/or in response to control signals from the smartphone 1402 or another component. Vaporizable material (e.g., fluid) can be supplied by one or more replaceable cartridges. The one or more replaceable cartridges can contain a vaporizable material. If the vaporizable material is liquid, the cartridge can comprise the wick 1518 to aid in transporting the liquid to a mixing chamber 1514. In the alternative, some other transport mode can be used. In an aspect, one or more materials can be vaporized at a single time by the detachable vaporizer 1502.

In operation, a heating element 1520 can vaporize or nebulize the vaporizable material in the mixing chamber 1514, producing an inhalable vapor/mist that can be expelled via the exhaust port 1506. In an aspect, the heating element 1520 can be coupled to the wick (or a heated wick)

1518 and operatively coupled to (for example, in fluid communication with) the mixing chamber 1514. The heating element 1520 can comprise a nickel-chromium wire or the like, with a temperature sensor (not shown) such as a thermistor or thermocouple. Within definable limits, by controlling power to the wick 1518, a rate of vaporization can be independently controlled. In an aspect, the heating element 1520 can receive power through the input/output port 1510. For example, the heating element 1520 can receive power from a power supply built into the smartphone 1402. In another aspect, the heating element 1520 can receive power through one or more batteries 1522. The one or more batteries can be rechargeable. The one or more batteries can comprise a lithium-ion battery (including thin film lithium ion batteries), a lithium ion polymer battery, a nickel-cadmium battery, a nickel metal hydride battery, a lead-acid battery, combinations thereof and the like. In an aspect, the one or more batteries 1522 can exclusively provide power to the detachable vaporizer 1502 and/or can be configured to provide power to both the detachable vaporizer 1502 and the smartphone 1402. In an aspect, the one or more batteries 1522 can provide backup power for the smartphone 1402. In another aspect, the one or more batteries 1522 can charge one or more batteries internal to the smartphone 1402. In another aspect, the one or more batteries 1522 can directly power the smartphone 1402. The heating element 1520 can vaporize or nebulize the vaporizable material in the mixing chamber 1514. The detachable vaporizer 1502 can exchange data signals with a processor of the smartphone 1402 through the input/output port 1510 for control of the detachable vaporizer 1502.

Figure 16:
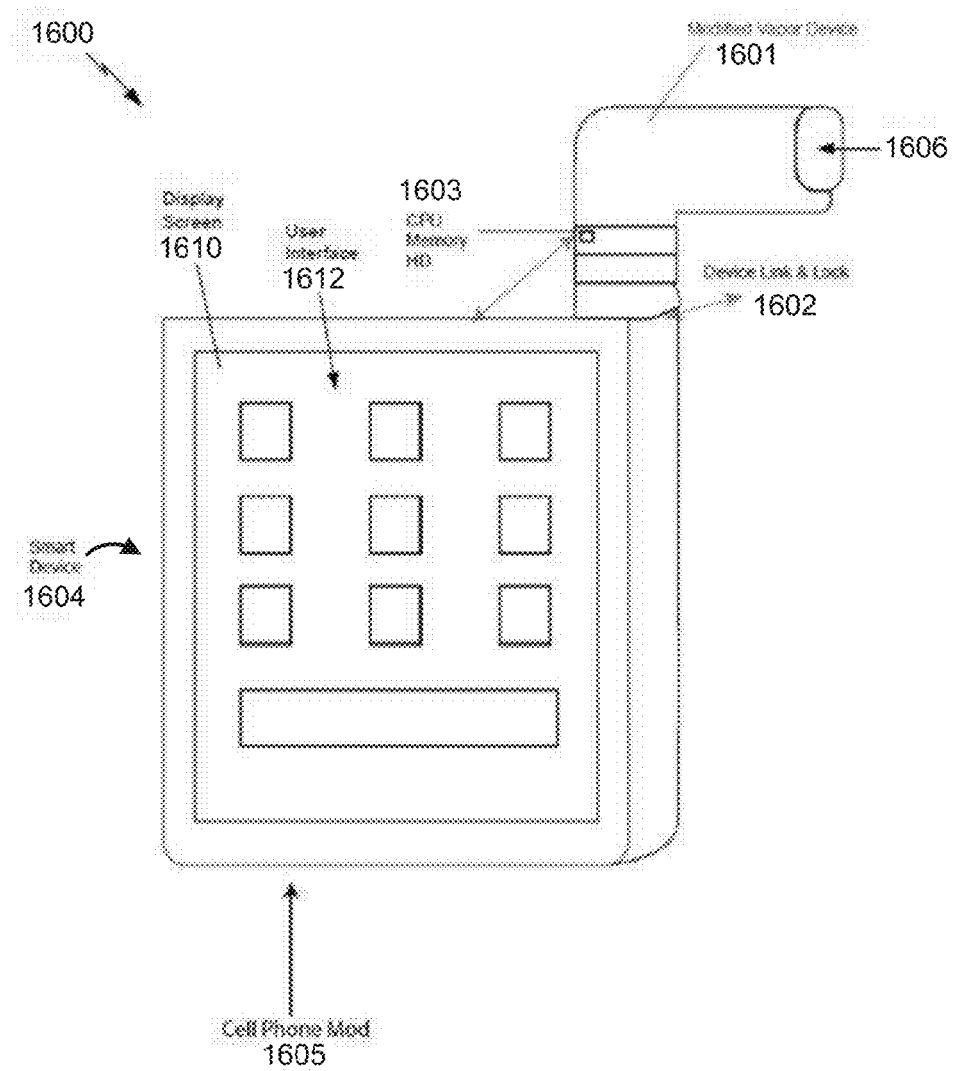
FIG. 16 illustrates an example vaporizer apparatus.

Referring to FIG. 16, aspects of a system 1600 comprising a first device 1601 coupled to a second device 1604 is illustrated. A system 1600 may include, for example, first (vaporizer) device 1601, lock 1602, processing components 1603, second (communication) device 1604, modules 1605, and aperture 1606 in a mouthpiece from which vapor may be drawn or expelled.

First device 1601 may be any vaporizing or nebulizing device known in the art. First device 1601 may comprise components standard to vaporizing and nebulizing devices in the art, including, but not limited to, aperture 1606 and processing components 1603. Processing components 1603 may include CPU, memory, and hard drive, not inclusive. Aperture 1606 may be used to inhale, or otherwise dispense, vapor from first device 1601.

In an aspect, the first device and the second device may be enclosed in a shared exterior housing that is continuous between the first and second devices. An arrangement of lights may be provided on the shared exterior housing, wherein the arrangement is configured to display a light pattern that is continuous between the first and second devices when viewed from an exterior of the shared exterior housing.

First device 1601 may be coupled to second device 1604 using means well-known in the art at lock 1602. Lock 1602 may also comprise a link to facilitate coupling. For example, the devices may be linked by at least one of a magnet, a clip, a physical weld, a screw in component a male/female connector, a zipper, Velcro, a third party agent, snap in lock, a key lock, a combination lock, a spiral brace, a spiral lock, a flexible screw or tier system which locks and unlocks at multiple tiers, an oscillating or telescopic click, twist, slide, grasp, pull push, fluid lock, pressure lock, temporary adhesive, permanent adhesive, brace, tooth locking mechanism, voice triggered lock, password triggered lock, key, fingerprint, iris identification, third party device authorization, or other biometric data, for locking or unlocking purposes. The first device 1601 may be integrated into and permanently attached to the second device 1604. For example, the first device may share the same exterior housing as the second device. It should further be appreciated that the mouthpiece of the vapor device 1601 may be of any suitable shape, and need not protrude from the housing of the communication device 1604 at all. I.e., the mouthpiece may be flush with the exterior surface of the device 1604 so that the device 1604 resembles an ordinary smart phone. In the alternative, the mouthpiece may have a different size or shape than shown.

Second device 1604 may be any smart device known in the art, including, but not limited to, wireless devices, smart phones, cellular phones, tablet computers, etc. Second device 1604 may include modules 1605 such as smart phone applications, programs, etc. as commonly known in the art. Modules 1605 may be used to interface with first device 1601 in a variety of manners for a variety of purposes. The second device 1604 may include a display screen 1610, which may be a touchscreen configured for receiving user touch input. The display screen may be used to display and operate a user interface 1612 for controlling operation of the first device 1601 or data sharing of vaporization data (e.g., use data, vapor recipes, favorites, purchases, trades, supply transactions, etc.). Modules 1605 may be used to monitor and control first device 1601 or second device 1604 and/or the user interface 1612. Modules 1605 may be pre-installed on second device 1604 or downloaded later from a central server or the like, according to means well-known in the art.

In some aspects, one or more vapor devices may be affixed to and work symbiotically with a wireless communication device. Attaching the one or more vapor devices to the wireless communication device enables the convenient use of the one or more vapor devices via the electronic nature of the wireless communication device to power the vapor device(s), or vice versa. Other conveniences include the simultaneous use of both devices and the data gathering and dissemination ability of the electronic communication device to capture and share incoming and outgoing data between the electronic vaporization devices and a central server or other vaporizing devices. One device may enable the independent operation of both devices or the devices may be joined and utilized in unison. In unison, the devices may exchange information and the data from one device many be utilized and synthesized from the other including not only data available on the instant devices but also data available from sources external to the instant devices via data ports or wireless communication systems to enable a robust set of communication and interface potentialities.

In related aspects, the first device (e.g., electronic vapor device) 1601 and the second device (e.g., electronic communication device) 1604 may exchange at least one of data, power, messaging functions, control of access, interface functions and billing data and processes. This may be accomplished through use of modules 1605.

The first device 1601 and second device 1604 may function at least one of dependently, independently, occasionally independent, or occasionally dependent, based upon system settings and device specifications. The look and feel of the first device 1601 and the second device 1604 may be continuous or non-continuous.

The first device 1601 and second device 1604 may adapted to include at least one of the exchange of registrations, encryptions, user data, messaging third party communications, usage information, biographical information, recommendations, third party information, billing and verification, charging, system gauges and efficiency settings, alerts, visual information & functions, audio information, light generation, charging functions, memory, storage, CPU, WiFi, or other remote network, password, keyboard data and functions between the devices.

Various electronic personal vaporizing devices are known in the art, and are frequently being improved on. For example, details of a recent "Vapor Delivery Device" are disclosed by the inventor hereof in U.S. Patent Publication No. 2015/0047661. While the referenced publication provides a pertinent example of a personal vaporizer, it should be appreciated that various different designs for personal vaporizing devices are known in the art and may be adapted for use with the technology disclosed herein by one of ordinary skill. In addition, similar portable and personal devices for nebulizing liquids to create a mist for inhalation should be considered as generally encompassed within the meaning of "personal vaporizer" as used herein.

As used herein, a nebulizing device uses oxygen, compressed air or ultrasonic power to break up medical solutions and suspensions into small aerosol droplets that may be directly inhaled from a mouthpiece of the device. It may be electronic and battery powered as well known in the art. The definition of an "aerosol" as used herein is a "mixture of gas and liquid particles," and the best example of a naturally occurring aerosol is mist, formed when small vaporized water particles mixed with hot ambient air are cooled down and condense into a fine cloud of visible airborne water droplets.

Figure 17:
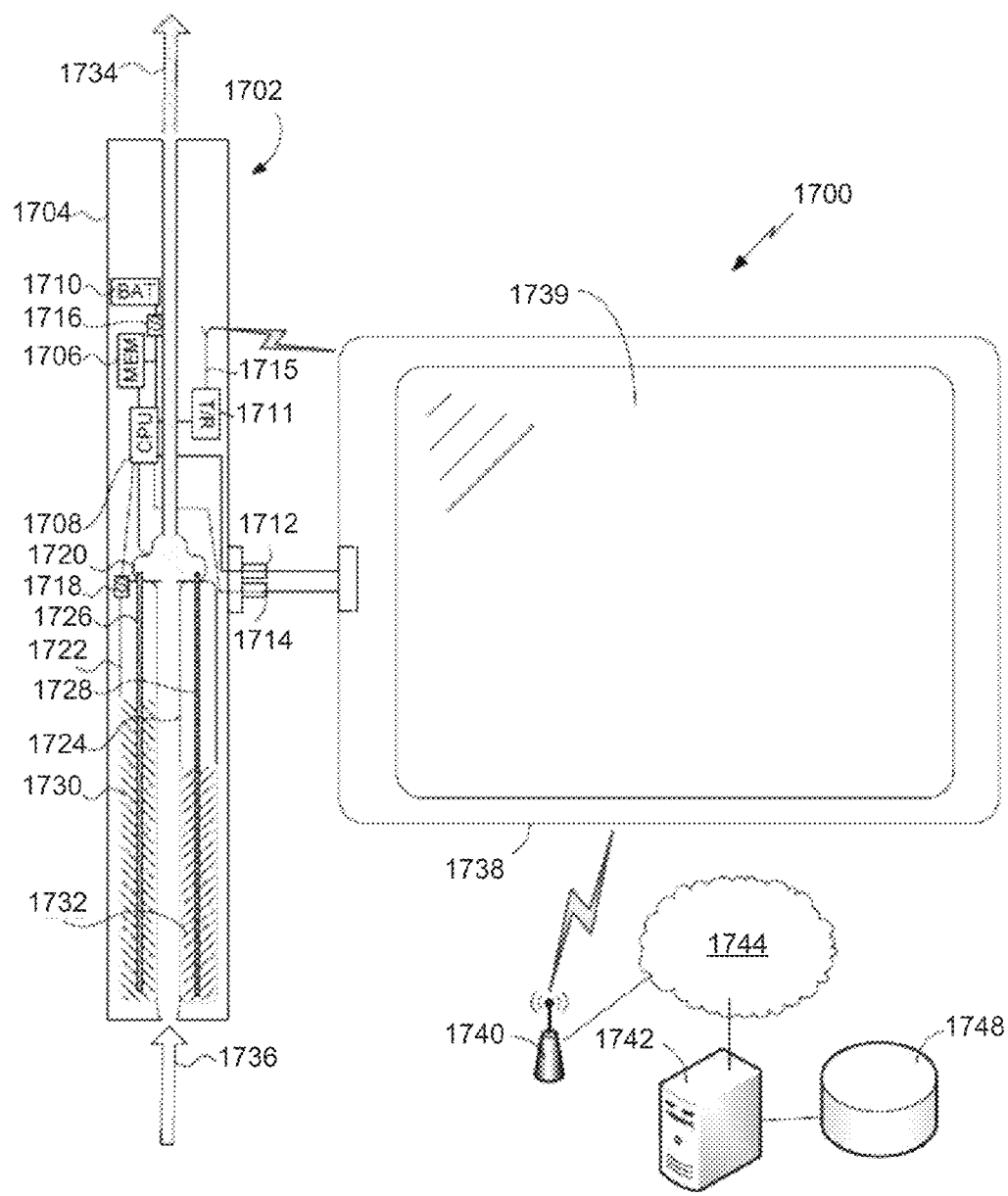
FIG. 17 illustrates an example vaporizer apparatus.

Referring to FIG. 17, alternative aspects of a system 1700 for coupling a personal vapor device and an electronic communication device are illustrated. The system 1700 may include an assembly (personal vapor device) 1702 for vaporizing a vaporizing fluid at a controlled rate, optionally for combining vaporization of two or more different fluids in a controlled manner. In alternative embodiments, the assembly may instead include non-vaporizable materials or combinations of vaporizable and non-vaporizable materials. To the extent the assembly includes non-vaporizable materials, components described for vaporizable materials may be used for non-vaporizable material, except for the vaporizing component 1720. Instead of, or in addition to, the vaporizing component 1720, the assembly 1702 may include a dispensing component for a non-vaporizable material, configured for receiving a non-vaporizable material and converting it to an inhalable or ingestible form that can be discharged via an outlet of the assembly 1702. For example, the dispensing component may be, or may include, a nebulizer as described herein above. For further example, the dispensing component may be, or may include a pump-and-nozzle assembly, a pump, a valve, a screw feeder for solid matter or a blower. Non-vaporizable materials may include, for example, gases, liquids, gels, solid particulate matter, or solid non-particulate matter.

The assembly 1702 may include at least one container 1722 holding a vaporizable material 1730, sometimes referred to herein as a "first" container 1722 and "first" vaporizable material. In an aspect, the vaporizable material may be a fluid, such as a compressed gas, compressed liquid (e.g., a liquefied gas), or uncompressed liquid. Various suitable fluids are known in the art, for example, solutions of nicotine in glycerin, with or without flavor-enhancing agents, are known. In the alternative, or in addition, the first vaporizable material may be, or may include, a solid or gel material. For embodiments using uncompressed liquids, the container 1722 may include a wick 1726 that carries the liquid to the vaporizing component 1720. Although the wick 1726 is shown only in the center of the container 1722 for illustrative clarity, it should be appreciated that the wick may substantially fill the container 1722. The container 1722 may be made of any suitable structural material, for example, an organic polymer, metal, ceramic, composite or glass material. Structural plastics may be preferred for disposable embodiments. Optionally, the apparatus 1702 may include one or more additional or "second" containers 1724 (one of potentially many shown), each configured similarly with a wick 1728 if suitable for the particular second vaporizable material 1732 being contained.

A vaporizer 1720 may be coupled to the first container 1722 and to any additional containers, e.g., second container 1724. For example, coupling may be via wicks 1726, 1724, via a valve, or by some other structure. The coupling mechanism may operate independently of gravity, such as by capillary action or pressure drop through a valve. The vaporizer 1720 is configured to vaporize the vaporizable material from the first container 1722 and any additional containers 1724 at controlled rates; in operation, the vaporizer vaporizes or nebulizes the material, producing an inhalable mist. In embodiments, the vaporizer may include a heater coupled to a wick, or a heated wick. A heating circuit may include a nickel-chromium wire or the like, with a temperature sensor (not shown) such as a thermistor or thermocouple. Within definable limits, by controlling suction-activated power to the heating element, a rate of vaporization may be controlled. At minimum, control may be provided between no power (off state) and one or more powered states. Other control mechanisms may also be suitable.

A processor 1708 is coupled to the vaporizer via an electrical circuit, configured to control a rate at which the vaporizer 1720 vaporizes the vaporizable material. Likewise, for a dispensing component for non-vaporizable materials, the processor 1708 is coupled to the dispensing component via an electrical circuit, configured to control a rate at which the component dispense non-vaporizable materials. In operation, the processor supplies a control signal to the vaporizer 1720 (and/or to a dispenser for non-vaporizable materials) that controls the rate of vaporization or other dispensing.

A receiver port 1712 may be coupled to the processor, and the processor may receive data determining the rate from the receiver port. Thus, the vaporization rate is remotely controllable, by providing the data. The receiver 1712 port may comprise, or may be connected to, a pin or socket of a physical connector configured for connecting to the electronic communication device 1738. For example, the physical connector may be configured as a serial port connector, or example a universal serial port (USB) connector, a micro-USB connector, a 10-pin serial bus connector, a 20-pin connector, a 24-pin-connector or any other suitable connector. In the alternative, or in addition, the receiver port may comprise a transceiver component 1711, coupled to an antenna 1715 for wireless coupling, and to the processor 1708. The transceiver 1711 and processor 1708 may be configured for using one or more wireless/communication protocols, for example, at least one of a Wifi (IEEE 802.11), Bluetooth, infrared, TCP/IP, Ethernet, UDP, WAP, Bluetooth, Near Field Communication (NFC), Z-wave, LPWAP, Telnet, HTTP, HTTPs, GSM, CDMA, LTE or other communication protocol, for wirelessly coupling to the communication device 1738, for both transmitting and receiving.

The processor 1708 may be, or may include, any suitable microprocessor or microcontroller, for example, a low-power application-specific controller (ASIC) designed for the task of controlling a vaporizer as described herein, or (less preferably) a general-purpose central processing unit, for example, one based on 80×86 architecture as designed by Intel™ or AMD™, or a system-on-a-chip as designed by ARM™, Qualcomm™, or other chip designer. The processor 1708 may be communicatively coupled to auxiliary devices or modules of the vaporizing apparatus 1702, using a bus or other coupling. Optionally, the processor 1708 and some or all of its coupled auxiliary devices or modules may be housed within or coupled to a housing 1704, substantially enclosing the containers 1724, 1724, the vaporizer 1720, the processor 1708, the receiver port 1712, and other illustrated components. The assembly 1702 and housing 1704 may be configured together in a form factor of an electronic cigarette, an electronic cigar, an electronic hookah, a hand-held personal vaporizer, or other desired form.

In related aspects, the assembly 1702 includes a memory device 1706 coupled to the processor 1708. The memory device 1706 may include a random access memory (RAM) holding program instructions and data for rapid execution or processing by the processor during control of the vaporizer 1702. When the vaporizer 1702 is powered off or in an inactive state, program instructions and data may be stored in a long-term memory, for example, a non-volatile magnetic, optical, or electronic memory storage device, which is not separately shown. Either or both of the RAM or the storage device may comprise a non-transitory computer-readable medium holding program instructions, that when executed by the processor 1708, cause the apparatus 1702 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

In a related aspect, the processor 1708 receives a user identifier and stores the user identifier in the memory device 1706. A user identifier may include or be associated with user biometric data, that may be collected by a biometric sensor or camera included in the assembly 1702 or in a connected or communicatively coupled ancillary device 1738, such as, for example, a smart phone executing a vaporizer interface application. The processor 1708 may generate data indicating a quantity of the vaporizable material 1730, 1732 consumed by the vaporizer 1720 in a defined period of time, and save the data in the memory device 1706. The processor 1708 and other electronic components may be powered by a suitable battery 1710, as known in the art, or other power source.

The assembly 1702 may include a sensor 1716, or multiple sensors 1716, 1718, to provide measurement feedback to the processor. For example, a sensor 1716 may be positioned downstream of the vaporizer, and the processor may derive the data used for controlling vaporization rate at least in part by interpreting a signal from the sensor correlated to a quantity of vapor emitted by the vaporizer. For further example, a sensor 1718 positioned upstream of the vaporizer, and the processor may derive the data at least in part by interpreting a signal from the sensor correlated to an amount of the vaporizable material remaining in the container, or to an amount of the vaporizable material passed from the container to the vaporizer, or both. "Downstream" and "upstream" relate to the direction of air flow or air/vapor mixture flow through the apparatus 1702, as illustrated by discharge arrow 1734 and inlet 1736. Suction applied at a tip draws inlet air 1736 through the vaporizer 1720, discharging a vapor/air mixture 1735 at the tip. Sensors 1716, 1718 may include, for example, optical sensors, temperature sensors, motion sensors, flow speed sensors, microphones or other sensing devices.

In related aspects, the assembly may include a transmitter port 1714 coupled to the processor. The memory 1706 may hold a designated network address, and the processor 1708 may provide data indicating the quantity of the vaporizable material consumed by the vaporizer to the designated network address in association with the user identifier, via the transmitter port 1714. The transmitter port 1714 may comprise, or may be connected to, a pin or socket of a physical connector configured for connecting to the electronic communication device 1738, as described above for the receiver port 1714. In the alternative, or in addition, the transmitter port 1714 may comprise a transceiver component 1711, coupled to an antenna 1715 for wireless coupling, and to the processor 1708, as described above for the receiver port 1714.

An ancillary device, such as a smartphone 1738, tablet computer, or similar device, may be coupled to the transmitter port 1714 via a wired or wireless coupling. For example, the apparatus 1702 may include a serial port, for example a USB port, coupled to receiver and transmitter inputs to the processor 1708. In the alternative, or in addition, a wireless port (not shown) using Wifi (IEEE 802.11), Bluetooth, infrared, TCP/IP, Ethernet, UDP, WAP, Bluetooth, Near Field Communication (NFC), Z-wave, LPWAP, Telnet, HTTP, HTTPs, GSM, CDMA, LTE or other communication protocol may be coupled to the processor 1708. In alternative embodiments, the assembly 1702 may be permanently fastened to or integrated with a housing of the smartphone 1738 or other communication device, and hard wired or connected to an internal serial bus of the device 1738, or the like. In an aspect, a removable vaporizing device 1702 may be configured to perform another function associated with operation of a normal smart phone or notepad computer, and/or to resemble an ancillary device for performing that function. For example, the assembly 1702 may be shaped to resemble a stylus for a touchscreen, and/or to perform a stylus function. For further example, the assembly 1702 may be shaped to resemble a hand-held microphone, and/or to perform a microphone function.

The ancillary device 1738 may be coupled to the processor 1708 for providing user control input to vaporizer control process operated executing on the processor 1708. User control input may include, for example, selections from a graphical user interface or other input (e.g., textual or directional commands) generated via a touch screen, keyboard, pointing device, microphone, motion sensor, camera, or some combination of these or other input devices, which may be incorporated in the ancillary device 1738.

A display 1739 of the ancillary device 1738 may be coupled to the processor 1708, for example via a graphics processing unit (not shown) integrated in the ancillary device 1738. The display 1739 may include, for example, a flat screen color liquid crystal (LCD) display illuminated by light-emitting diodes (LEDs) or other lamps, a projector driven by an LED display or by a digital light processing (DLP) unit, or other digital display device. User interface output driven by the processor 1708 may be provided to the display device 1739 and output as a graphical display to the user. Similarly, an amplifier/speaker or other audio output transducer of the ancillary device 1738 may be coupled to the processor 1708 via an audio processing system. Audio output correlated to the graphical output and generated by the processor 1708 in conjunction with the ancillary device 1738 may be provided to the audio transducer and output as audible sound to the user. The communication device 1738 may include various sensors and ancillary components such as, for example, a camera, microphone, Global Positioning System (GPS) receiver/locater, one or more motion sensors, a touchscreen sensor, and a temperature sensor.

The ancillary device 1738 may be communicatively coupled via an access point 1740 of a wireless telephone network, local area network (LAN) or other coupling to a wide area network (WAN) 1744, for example, the Internet. A server 1742 may be coupled to the WAN 1744 and to a database 1748 or other data store, and communicate with the apparatus 1702 via the WAN and couple device 1739. In alternative embodiments, functions of the ancillary device 1739 may be built directly into the apparatus 1702, if desired.

In related aspects, the processor 1708 may receive a request for replenishing the vaporizable material 1730 in the container 1722 via at least one of the receiver 1712 or a user input port coupled to the processor 1708. For example, the assembly 1702 may include a user input device coupled to the receiver port 1712. The processor 1708 may be configured to send the request to a designated network address stored in the memory device 1706 in association with the user identifier, via the transmitter port 1714. For example, the processor 1708 may send the request to a commerce server 1742, or to a server hosted by a medical or other service provider. Accordingly, the processor 1708 may facilitate a commercial transaction for replenishing the vaporizable material 1730, at least in part by sending a payment authorization associated with the replenishment request via the transmitter port 1714, by receiving a proof-of-payment certificate via the receiver port 1712, or by some combination of these or other operations.

In another aspect, an inlet port may be coupled to the container 1722 configured to admit the vaporizable material 1730 into the container 1722. Accordingly, the processor may be configured to provide one of the payment authorization or the proof-of-payment certificate to a device that dispenses the vaporizable material via such port.

The described technology may enable users to remotely access and authorize activation of a vaporization device, for example, an electronic cigarette or the like, in one or more transactions with a supplier or medical provider. The transactions may be based at least in part on measurements of vaporizable material consumed at a vaporization device identified with a specific user. The transactions may enable a user to replenish supply of a vaporizable material or unlock permission to vaporize the material at a vaporizing device. This may be useful for ordinary commercial transaction, enforcing medically-based dose regimens, or other applications. Potency of the vaporized material may be controlled by selectively vaporizing contents of two or more containers 1722, 1724 to avoid accidental over consumption of an active substance such as nicotine, caffeine, vitamin B, cannabinoids, or any other non-inert substance. Meanwhile, the user may continue to enjoy use of the vaporizer 1702 for as long as desired, without experiencing any risk or unpleasant side effects of consuming an excess of active substances.

The vapor device 1702 may be coupled to and may work cooperatively ("symbiotically") with the electronic (e.g., wireless) communication device 1738. Coupling may be performed for a temporary duration, or permanently. The coupling may enable the convenient use of one or more vapor device via the electronic communication device, and enhance electronic and computing resources available to the vapor device(s). Such enhancement and shared resources may include but are not limited to electrical power, communications bandwidth, data, applications, processing bandwidth, memory, graphics processing, sensor capability, communications technology (e.g., access to Wi-Fi or other network), user interface display, light, camera, microphone, or other ancillary equipment. Conversely, the vapor device(s) 1702 via the coupling can enhance the resources available to the communication device 1738, including but not limited to sensor capability, data, applications, sensory output modes, and communications technology. Other conveniences include the simultaneous use of both devices and the data gathering and dissemination ability of the electronic communication device to capture and share incoming and outgoing data and other resources between the electronic vaporization device and the vapor device. Sharing of application resources may include, for example, messaging and chat functions, access control functions, interface functions, and e-commerce functions, for example shopping, purchase and payment functions. Data sharing may include, for example, exchange of registrations, encryptions, user data, messaging third party communications, usage information, biographical information, recommendations, third party information, billing and verification, charging, system gauges and efficiency settings, alerts, visual information & functions, audio information.

The vapor device(s) 1702 may operate independently of the communication device 1738, with limited resource sharing such as data and power. In an alternative, or in addition, the vaping device(s) 1702 may be utilized in unison with the device 1738. For example, a vapor device 1702 may be configured to operate as a slave or terminal of the communication device 1738, or vice versa. In an alternative, the vapor device 1702 and the communication device 1738 may be configured to operate as peer devices. In unison, the devices 1702, 1738 may exchange information and the data from one device may be utilized and synthesized from the other including not only data available on the instant devices but also data available from sources external to the instant devices via data ports or wireless communication systems to enable a robust set of communication and interface potentialities. In summary the disclosure describes systems, methods and devices for physically and/or communicatively linking an electronic vapor device with an electronic communication device, wherein the devices function symbiotically or cooperatively with each other.

Various automatic registration systems having monitoring modules may be adapted to communicate between the vapor device/communication device symbiotic pair and remote sites. Devices at one or more locations may interface with the monitoring modules. Advantageously, the vaping device 1702 or the symbiotic pair devices 1700 do not need to be registered. Instead, their participation with local or remote monitoring may be transient, without disabling use of monitoring data. For example, monitoring data may be used to generate recommendations during use, and after use may be automatically purged from the system to maintain device anonymity and protect the privacy of the user.

The vaping device(s) 1702 and the electronic communication device 1738 may be coupled wirelessly or using a wired connection, in either case with or without a physical coupling other than for communication in the case of a wired coupling. If a physical coupling is used, each vaping device devices may be may be coupled to the communication devices by at least one of a magnet, a clip, a physical weld, a screw in component a male/female connector, a zipper, Velcro, a third party agent, snap in lock, a key lock, a combination lock, a spiral brace, a spiral lock, a flexible screw or tier system which locks and unlocks at multiple tiers, an oscillating or telescopic click, twist, slide, grasp, pull push, fluid lock, pressure lock, temporary adhesive, permanent adhesive, brace, tooth locking mechanism. A locking mechanism may be controlled by at least one of voice profile module, password or passcode module, physical key, fingerprint scanner, iris identification scanner, third party device authorization, or other biometric data, for locking or unlocking. A physical coupling may be designed so that the look and feel of the symbiotic devices are one of continuous, integrated device, or non-continuous as separate, independent devices. In either case, the physical coupling may be configured for permanence, or to facilitate uncoupling and recoupling as frequently as desired. In an aspect, the electronic assembly 1700 (e.g., symbiotic pair) may provide a material in an inhalable or ingestible form while transmitting and receiving data between the assembly and other electronic devices.

Figure 18:
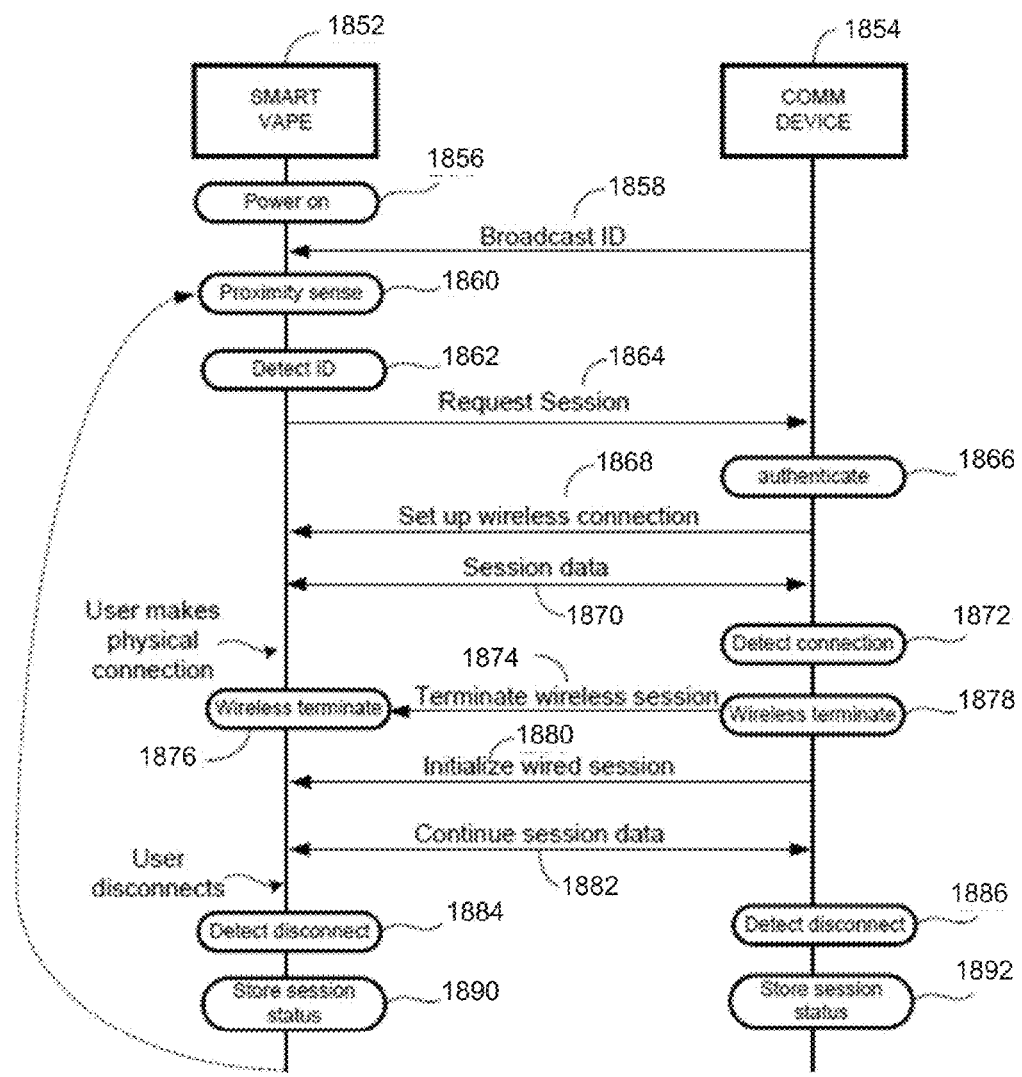
FIG. 18 illustrates a sequence diagram illustrating aspects of coupling and decoupling a vaporizer apparatus and an electronic communication device.

Referring to FIG. 18, a sequence or use case 1850 illustrating coupling modes of a vapor device 1852 and communication device 1854 is illustrated. The vapor device 1852 and communication device 1854 may have components and aspects as described herein. However, the illustrated use case is primarily relevant to embodiments in which the vapor device and communication device are not permanently coupled.

Upon power on at 1856 in a disconnected, unattached state, the vapor device 1852 may scan 1860 for a periodic beacon broadcast 1856 form the communication device 1854. Upon detecting an identifier 1862 for a companion device 1854, the vapor device may send a connection or session request 1864. The communication device 1866 may authenticate 1866 the request and requesting device 1852 and send instructions 1868 for setting up a wireless session. Subsequently, the devices 1852, 1854 may exchange data and control signals in a wireless session 1870. The wireless session may be terminated at any time by either device. In one use case, the user may make a physical connection during the wireless session, which is detected 1872 by the communication device and/or vapor device 1852. Each device may then terminate 1876, 1878 the wireless session 1874, which may include saving a current session status in a memory of one or both devices. The communication device 1854 may then initialize a wired session 1889, after which the data/control session 1882 may continue.

If the user then physically disconnects the devices from each other, both devices may detect 1884, 1886 the disconnection and store the current session status 1890, 1892, unless the session is completed, in which case both devices may store or delete all session data, per user preferences. The vapor device 1852 may then resume proximity sensing 1860 if desired, or the user may set it to work in a stand-alone mode or power it off.

Figure 19:
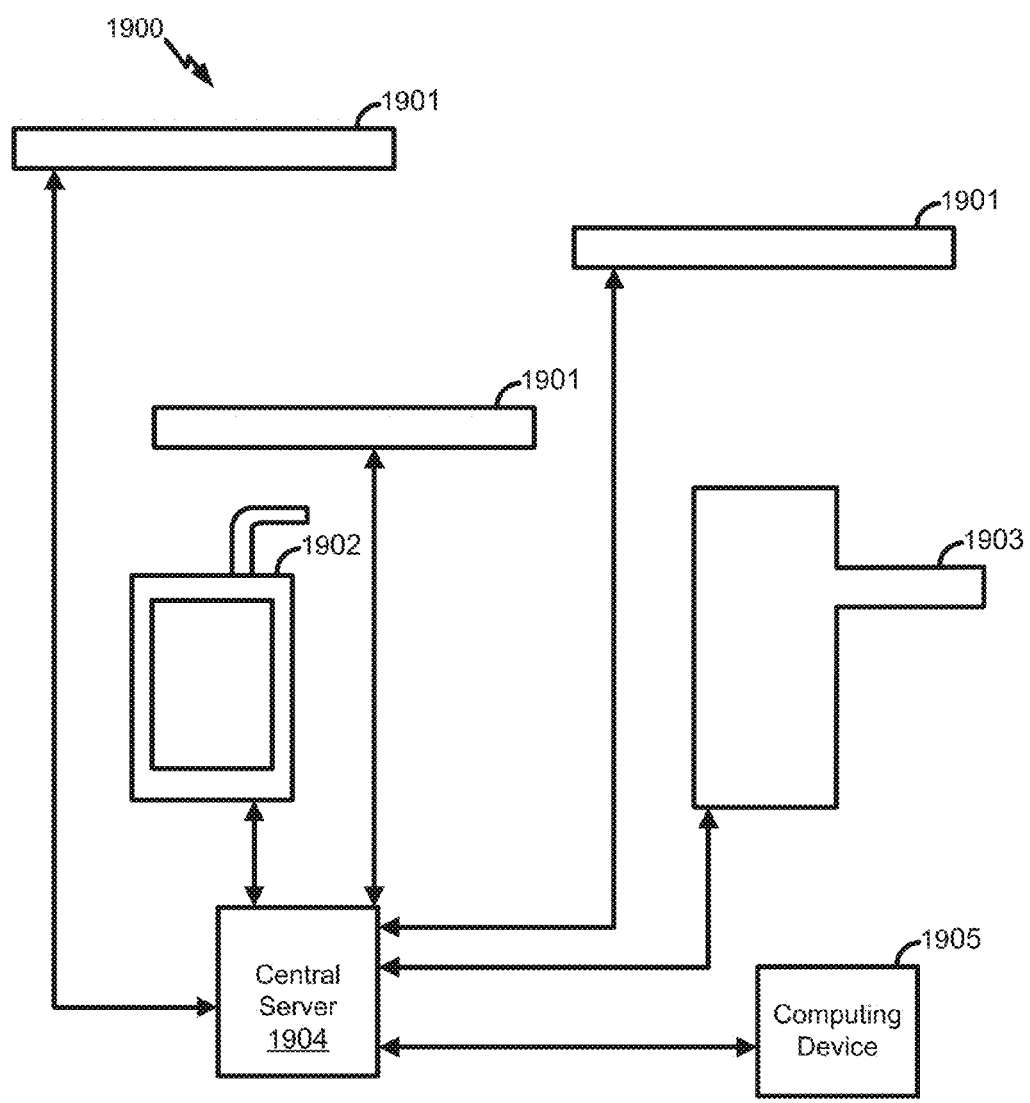
FIG. 19 illustrates an exemplary network of vaporizer apparatuses.

Referring to FIG. 19, aspects of a system 1900 for a social network of vaporizing device users is illustrated. A system 1900 may include, for example, a plurality of vaporizing devices (e.g., electronic cigarettes (E-cigs), nebulizing devices, etc.) 1901, at least one hybrid device (e.g., smartphone, tablet computer, etc.) 1902, at least one audio device (e.g., speaker) 1903, central server (e.g., network server, etc.) 1904, and at least one computing device (e.g., desktop computer, laptop computer, etc.) 1905.

The plurality of vaporizing devices 1901, hybrid device 1902, audio device 1903, and computing device 1905 may each be coupled to central server 1904 via means well-known in the art, including, but not limited to, wired and wireless means. The vaporizing devices 1901 may each be adapted to monitor and sense each user's use habits and relay data regarding each user's use habits to central server 1904. The central server 1904 may be adapted to store information regarding use habits, such as: how deep each puff is, duration and frequency of use, vapor, mix, location of user, location of use, and inhalation techniques for each user of each vaporizing device 1901. The central server 1904 may be administered by an administrator or system owner.

The users may befriend each other or strangers to create a social network of vaporizing device users according to means well-known in the art regarding social networking systems and methods. Through the social network, the users may send messages to each other, chat, post updates, post comments, and exchange information with each other regarding favorites and recommendations. For example, favorites may be denoted by upvoting, and downvoting by means well-known in the art in regards to social networking systems and methods. Alternative rating systems may also be used (e.g., rating on a scale from 0 to 100, star rating system of 0 to 5 stars, percentage of approval/disapproval, etc.). Recommendations may be posted to a forum or other means for communicating with other users according to means well-known in the art in regards to social networking systems and methods. In some versions, a map may be created showing locations of the users and locations of most frequent use of vaporizing device 101. In some versions, non-users of vaporizing devices may also be included in the social network.

In some aspects the social network may consist of users who share a common purpose for using vaporizing devices. For example, the users may be people who have a medical condition, such as, including, but not limited to, seizures, obesity, diabetes, asthma, depression, etc. The medical conditions may be conditions that are treatable through the use of vaporizing devices, such as, for example, using maynabidiol (CBD) and other similar substances with medicinal properties. The medical conditions may be physical or mental. The users may be from various age groups, such as, including, but not limited to, minors, teenagers, legal voting age, legal drinking age, elderly, etc. The users may also be from a common situation in life, including, but not limited to, being on a weight loss program, special dietary program, medicinal regimen, recently divorced, grieving, etc. Additionally, the users may be using the vaporizing devices for any known purpose in the art, including, but not limited to, air design, CBD, flavored smoke, electronic cigarettes, or vapameal (e.g., using vapor to deliver flavors of a meal, to treat, for example, obesity). Medical, neurologic, or recreational uses are contemplated herein. Any combination of the above-listed factors may be a basis for forming a social network as described herein. For example, a group may comprise minors with seizures, or users of any age group in a weight loss program, etc.

The system 1900 may further comprise components well-known in the art to include and implement a verification process, a registration process, a billing process, an encryption process, a EULA process, a data gathering system, a recommendation system, a messaging system, a data exchange system, a privacy system, a GPS system, a biographical information system, a password system, or a locking system in addition to the aspects as disclosed herein.

The users may create a user account through hybrid device 1902 or computing device 1905 in order to gain access to the social networking features described above. The users may associate one or more of their vaporizing devices with their account so that they may exchange data regarding their use habits with other users through central server 1904. In some versions, vaporizing device 1901, hybrid device 1902, or computing device 1905 may be used to perform the above-described social media functions. Hybrid device 1902 and computing device 1905 may also be used to follow other users. Audio device 1903 may be used to play an audio alert (e.g., beep, music, sound, etc.) to notify user of an incoming message or data. Audio device 1903 may be implemented in vaporizing device 1900, hybrid device 1902, or computing device 1905.

The plurality of vaporizing devices 1901 do not have to be registered in order to track and share data. Their use may be transient and the data may still be used to generate recommendations while maintaining anonymity and protecting the privacy of the user by purging personal information from the system and only using data regarding use habits. In the alternative, one or more of the vaporizing devices 1901 may be associated with a specific user or users.

Figure 20:
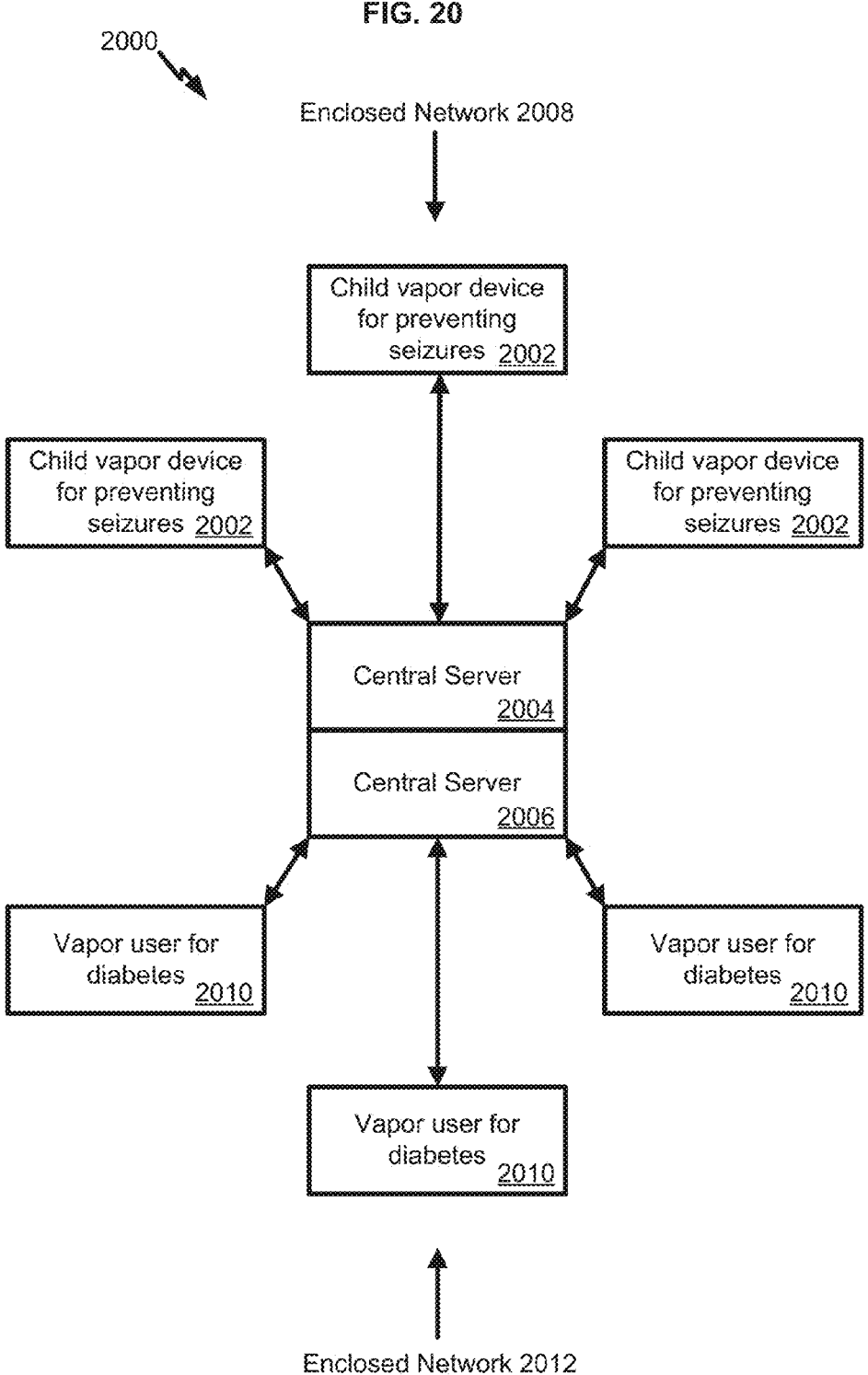
FIG. 20 illustrates an exemplary social network.

Referring to FIG. 20, aspects of a system 2000 for a social network of vaporizing device users is illustrated. A system 2000 may include, for example, a first group of electronic vaporizing device users based upon a first common specific usage 2002, the first group 2002 forming a first enclosed network 2008 on a first central server 2004, a second group of electronic vaporizing device users based upon a second common specific usage 2010, the second group 2010 forming a second enclosed network 2012, on a second central server 2006.

In some aspects, the first group 2002 may comprise child vapor device users for preventing seizures. The second group 2010 may comprise vapor users for diabetes. The first group 2002 may form a social network of users that share a first common usage of electronic vaporizing devices. The second group 2012 may form a social network of users that share a second common usage of electronic vaporizing devices. The first enclosed network 2008 may be linked to the second enclosed network 2012 to form a social network of groups of users. The first central server 2004 may be linked to the second central server 2006 to form the social network. The servers may be one or more servers serving one or more enclosed, separated networks.

The first group 2002 and the second group 2010 may comprise users of various backgrounds, age groups, ethnicities, medical conditions, etc., as described above and herein.

Figure 21:
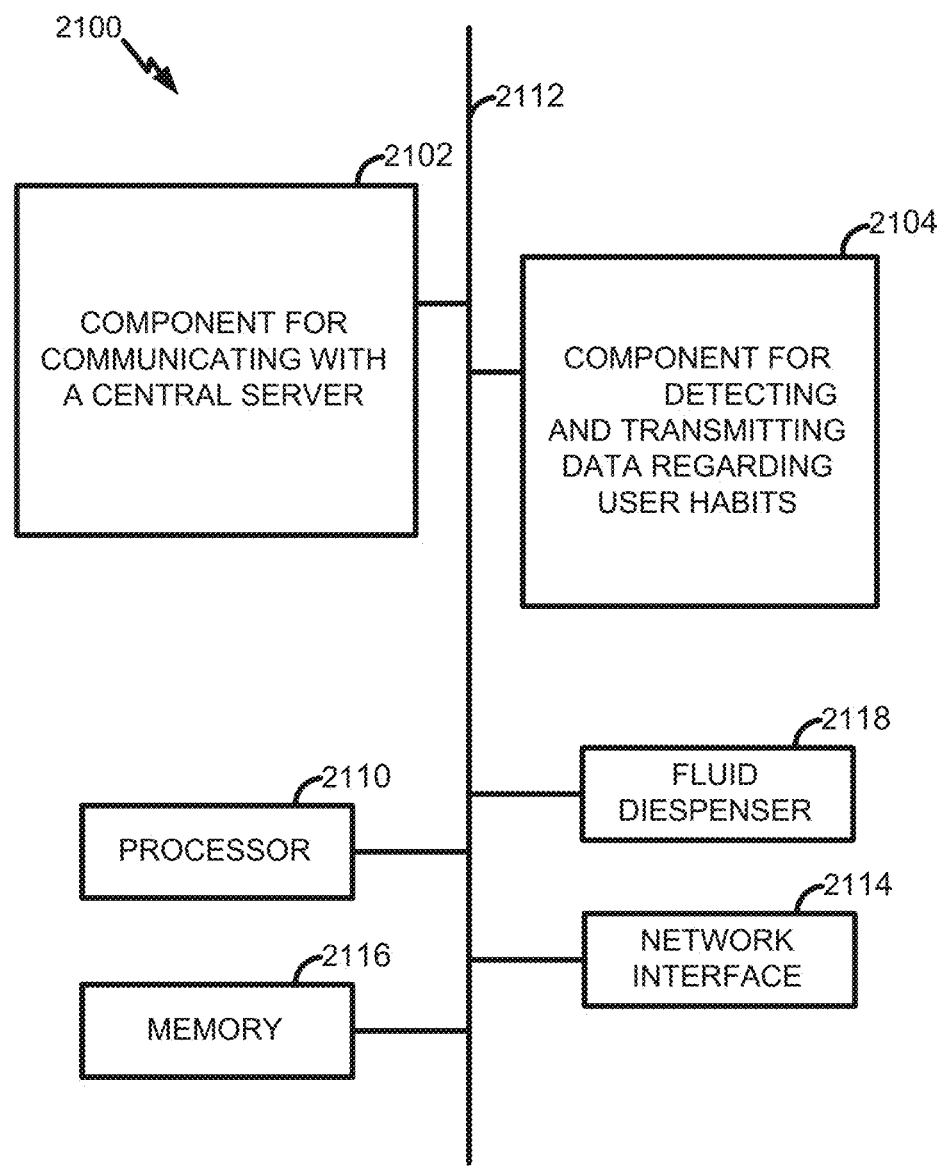
FIG. 21 illustrates an example vaporizer apparatus.

FIG. 21 is a block diagram illustrating components of an apparatus or system 2100 for creating a social network of vaporizing device users. The apparatus or system 2100 may include additional or more detailed components as described herein. For example, the processor 2110 and memory 2116 may contain an instantiation of a controller for a vaporizer or nebulizer as described herein. As depicted, the apparatus or system 2100 may include functional blocks that may represent functions implemented by a processor, software, or combination thereof (e.g., firmware).

As illustrated in FIG. 21, the apparatus or system 2100 may comprise an electrical component 2102 for communicating with a central server. The component 2102 may be, or may include, a means for processing and delivering data to the central server. Said means may include the processor 2110 coupled to the memory 2116, and to the network interface 2114, the processor executing an algorithm based on program instructions stored in the memory. Such algorithm may include a sequence of more detailed operations, for example, an method described herein As illustrated in FIG. 21, the apparatus or system may comprise an electrical component 2104 for detecting and transmitting data regarding user habits such as: how deep each puff is, duration and frequency of use, vapor, mix, location of user, location of use, and inhalation techniques to a central server. The component 2102 may be, or may include, a means for detecting and transmitting data regarding user habits. Said means may include the processor 2110 coupled to the memory 2116, and to the network interface 2114, the processor executing an algorithm based on program instructions stored in the memory. Such algorithm may include a sequence of more detailed operations, for example, retrieving a network address from the memory 2116, sending a query requesting the data to a network address, and receiving a transmission including the requested data from a server at the network address. In the alternative, or in addition, such algorithm may include receiving a data broadcast or unicast message including the data from the server or from a coupled ancillary device, without the broadcast or unicast message being preceded by a data request. For example, a server may transmit vaporization control parameters periodically or automatically as part of a device initiation process.

The apparatus 2100 may optionally include a processor module 2110 having at least one processor, in the case of the apparatus 2100 configured as a controller for a fluid dispenser 2118. The processor 2110, in such case, may be in operative communication with the memory 2116, interface 2114 or dispenser/vaporizer 2118 via a bus 2112 or similar communication coupling. The processor 2110 may effect initiation and scheduling of the processes or functions performed by electrical components 2102-2104.

In related aspects, the apparatus 2100 may include a network interface module 2114 operable for communicating with a server over a computer network. The apparatus may include a controllable dispenser for a vaporizable material, for example, a heat-driven vaporizer for which vaporization rate is correlated to power supplied, or a micro-valve for which vaporization is proportional to valve position. In further related aspects, the apparatus 2100 may optionally include a module for storing information, such as, for example, a memory device/module 2116. The computer readable medium or the memory module 2116 may be operatively coupled to the other components of the apparatus 2100 via the bus 2112 or the like. The memory module 2116 may be adapted to store computer readable instructions and data for enabling the processes and behavior of the modules 2102-2104, and subcomponents thereof, or the processor 2110, or the methods disclosed herein. The memory module 2116 may retain instructions for executing functions associated with the modules 2102-2104. While shown as being external to the memory 2116, it is to be understood that the modules 2102-2104 may exist within the memory 2116.

In view of the foregoing, and by way of additional example, FIG. 22 shows aspects of a method 2200 for monitoring and controlling usage of a first device comprises, at 2210, coupling the first device to a second device, at 2220, monitoring, by a processor, the usage of the first device, at 2230, controlling, by the processor, the first device based on the usage, and at 2240, transmitting, by a transmitter, usage information regarding the usage to a central server.

The method 2200 may include receiving instructions based on the usage information from the central server. The method 2200 may include dictating usage of the first device using the instructions. In related aspects the first device may be an electronic vaporizing or nebulizing device, and the second device may be a smart phone. The first device may be adapted to provide power to the second device. The first device may comprise a battery, a CPU, memory, and a hard drive. The first device may be adapted to couple to the second device via a device link and secured through a lock.

An assembly is disclosed comprising at least an integrated electrical circuit for providing a material in an inhalable form and for electronic communications, and an integrated exterior design. The assembly can comprise a first device integrated with a design and functionality of a second device. The first device and the second device can be enclosed in a shared exterior housing that is continuous between the first and second devices. The assembly can further comprise an arrangement of lights on the shared exterior housing, wherein the arrangement is configured to display a light pattern that is continuous between the first and second devices when viewed from outside of the shared exterior housing.

The first device can comprise at least one of a vaporizing device, a nebulizing device, a dispensing device producing an inhalable or ingestible output, or a combination of the foregoing, and wherein the second device can comprise an electronic communication device. The second device can comprise at least one of a vaporizing device, a nebulizing device, a dispensing device producing an inhalable or ingestible output, or a combination of the foregoing, and wherein the first device can comprise an electronic communication device.

The assembly can further comprise at least one processor configured for enabling use of first device via the second device. The at least one processor can be further configured for enhancing resources available to the first device via coupling to the second device. The resources comprise at least one of electrical power, communications bandwidth, data, applications, processing bandwidth, memory, graphics processing, sensor capability, communications technology, user interface display, light, camera, microphone, or ancillary equipment.

The at least one processor can be configured for at least one of simultaneous use of both first and second devices, data gathering, and data distribution. The at least one processor can be configured for sharing application resources with the second device comprising at least one of: messaging and chat functions, access control functions, interface functions, and e-commerce functions. The at least one processor can be configured for sharing data with the second device comprising at least one of: user or device registrations, encryption keys, user data, messaging third party communications, usage information, biographical information, recommendations, third party information, billing and verification messages, power information, system gauges and efficiency settings, alerts, visual information & functions, audio information. The at least one processor can be configured for at least one of: operating independently of the second device, with limited resource sharing such as data and power, operating as a slave or terminal of the second device, or operating as a peer of the second devices.

The assembly can further comprise a coupling between the first device and the second device configured as at least one of a wireless or wired coupling. The coupling can comprise a physical coupling configured as at least one of a magnet, a clip, a physical weld, a screw in component a male/female connector, a zipper, Velcro, a third party agent, snap in lock, a key lock, a combination lock, a spiral brace, a spiral lock, a flexible screw or tier system which locks and unlocks at multiple tiers, an oscillating or telescopic click, twist, slide, grasp, pull push, fluid lock, pressure lock, temporary adhesive, permanent adhesive, brace, tooth locking mechanism. The physical coupling can comprise a locking mechanism controlled by at least one of a voice profile module, password or passcode module, physical key, fingerprint scanner, iris identification scanner, third party device authorization, or other biometric data, for locking or unlocking. The physical coupling can be configured so that the first and second devices appear to be non-continuous as separate, independent devices.

An electronic assembly is disclosed for providing a compound in an inhalable form while transmitting and receiving data between the assembly and other electronic devices. The assembly can further comprise a first device coupled to a second device, the first device adapted to vaporize or nebulize a substance, the second device providing power to the first device, and the second device adapted to monitor and control the first device. The assembly can further comprise the second device adapted to transmit usage information regarding the first device to a central server.

The second device can be adapted to receive instructions regarding the first device from the central server. The instructions can be based on the usage information. The first device can be an electronic vaporizing device. The first device can be an electronic nebulizing device. The second device can be a smart phone. The first device can be adapted to provide power to the second device. The first device can comprise a battery. The assembly of claim 18 further comprising a CPU, memory, and a hard drive. The first device couples to the second device via a device link. The device link can comprise a lock.

Referring to FIG. 23, a method 2300 of transmitting and receiving data between an electronic assembly and other electronic devices is disclosed comprising monitoring, by a processor, usage of a first device at 2310 and transmitting, by a transmitter, usage information regarding the usage to a central server. The method 2300 can further comprise coupling the first device to a second device, controlling, by the processor, the first device based on the usage of the first device. The method 2300 can further comprise, receiving, by the transmitter, instructions from the central server. The instructions can be based on the usage information. The instructions dictate usage of the first device. The first device can be an electronic vaporizing device. The first device can be an electronic nebulizing device. The second device can be a smart phone. The first device can be adapted to provide power to the second device. The first device can comprise a battery. The first device can comprise a CPU, memory, and a hard drive. The first device can couple to the second device via a device link. The device link can comprise a lock.

A first device is disclosed that can be configured for integration with the design and functionality of a second device, wherein the assembly includes at least a vaporizing function and a mobile communication function. The first device can comprise at least one of a vaporizing device, a nebulizing device, a dispensing device producing an inhalable or ingestible output, or a combination of the foregoing, and wherein the second device can comprise an electronic communication device. The second device can comprise at least one of a vaporizing device, a nebulizing device, a dispensing device producing an inhalable or ingestible output, or a combination of the foregoing, and wherein the first device can comprise an electronic communication device.

The first device can further comprise a coupling to the second device, configured for at least one of permanent or temporary coupling. The first device can be integrated in a shared housing with the second device. The first device can further comprise a processor configured for enabling use of first device via the second device. The processor can be further configured for enhancing resources available to the first device via coupling to the second device. The resources can comprise at least one of electrical power, communications bandwidth, data, applications, processing bandwidth, memory, graphics processing, sensor capability, communications technology, user interface display, light, camera, microphone, or ancillary equipment.

The processor can be configured for at least one of simultaneous use of both first and second devices, data gathering, and data distribution. The processor can be configured for sharing application resources with the second device comprising at least one of: messaging and chat functions, access control functions, interface functions, and e-commerce functions. The processor can be configured for sharing data with the second device comprising at least one of: user or device registrations, encryption keys, user data, messaging third party communications, usage information, biographical information, recommendations, third party information, billing and verification messages, power information, system gauges and efficiency settings, alerts, visual information & functions, audio information. The processor can be configured for at least one of: operating independently of the second device, with limited resource sharing such as data and power, operating as a slave or terminal of the second device, or operating as a peer of the second devices.

The first device can further comprise a coupling to the second device comprising at least one of a wireless or wired coupling. The coupling can comprise a physical coupling comprising at least one of a magnet, a clip, a physical weld, a screw in component a male/female connector, a zipper, Velcro, a third party agent, snap in lock, a key lock, a combination lock, a spiral brace, a spiral lock, a flexible screw or tier system which locks and unlocks at multiple tiers, an oscillating or telescopic click, twist, slide, grasp, pull push, fluid lock, pressure lock, temporary adhesive, permanent adhesive, brace, tooth locking mechanism. The physical coupling can comprise a locking mechanism controlled by at least one of a voice profile module, password or passcode module, physical key, fingerprint scanner, iris identification scanner, third party device authorization, or other biometric data, for locking or unlocking. The physical coupling can be designed on that the look and feel of the first and second devices can be one of: a continuous, integrated device, or non-continuous separate, independent devices.

An apparatus is disclosed comprising a vapor output, a container for storing a vaporizable material, a vaporizer component coupled to the container, configured for vaporizing the vaporizable material to create a vapor and expelling the vapor out the vapor output, a processor, coupled to the vaporizer component, configured to control the vaporizing of the vaporizable material, and an input/output connector, coupled to the processor, configured for coupling to an electronic communication device to exchange one or more of power and data.

The apparatus can further comprise a physical coupling component, configured to securely physically couple the apparatus to the electronic communication device. The apparatus can further comprise a housing configured to enclose the apparatus and the electronic communication device when coupled. The electronic communication device can comprise one or more of a smartphone, a smart watch, a tablet, a laptop, and combinations thereof. The input/output connector can comprise one or more of a USB connector, a lightning connector, a micro-USB connector, a mini-USB connector, a dock connector, a Portable Digital Media Interface, and combinations thereof.

The processor can be configured to receive and execute one or more commands received from the electronic communication device via the input/output connector. The one or more commands can comprise a command to cause the vaporizer component to vaporize the vaporizable material. The processor can be configured to receive commands and provide data via the input/output connector to a software application running on the electronic communication device. The processor can be configured to transmit data to the electronic communication device via the input/output connector for wireless transmission by the electronic communication device to a remote server. The processor can be configured to share one or more resources with the electronic communication device via the input/output connector. The one or more resources comprise processing bandwidth, memory, graphics processing, sensor capability, a light, a camera, a microphone, and a communications device.

A system is disclosed comprising an electronic vapor device comprising, a vapor output, a container for storing a vaporizable material, a vaporizer component coupled to the container, configured for vaporizing the vaporizable material to create a vapor and expelling the vapor out the vapor output, a first processor, coupled to the vaporizer component, configured for controlling one or more functions of the electronic vapor device, an input/output connector, coupled to the first processor, configured for coupling to an electronic communication device, and an electronic communication device, comprising, an input/output port, coupled to the input/output connector of the electronic vapor device, and a second processor, configured for controlling one or more functions of the electronic communication device, and a user input interface for controlling the one or more functions of the electronic vapor device.

The input/output connector can be configured to exchange one or more of power and data. The electronic vapor device further can comprise a first power source and the electronic communication device can comprise a second power source. The user input interface for controlling one or more functions of the electronic vapor device can be configured to enable and disable the first power source and the second power source. The user input interface for controlling one or more functions of the electronic vapor device can be configured to cause a transfer of power between the first power source and the second power source. The electronic communication device further can comprise a network access device configured to transmit data received from the electronic vapor device via the input/output connector and the input/output port. The data can comprise usage data and wherein the usage data can be transmitted to a remote server. The network access device can be further configured to receive an instruction from the remote server based on the usage data and to provide the instruction to the electronic vapor device.

Referring to FIG. 24, a method 2400 is disclosed comprising receiving, at an electronic vapor device, a command to generate a vapor from an electronic communication device via an input/output port coupling the electronic communication device and the electronic vapor device at 2410. The electronic communication device can comprise one or more of a smartphone, a smart watch, a tablet, a laptop, and combinations thereof.

The method 2400 can comprise drawing power from one or more of a first power source located in the electronic communication device via the input/output port coupling or a second power source located in the electronic vapor device at 2420. The method 2400 can comprise applying the power to vaporize a vaporizable material to create the vapor at 2430. The method 2400 can comprise expelling the vapor through an exhaust port of the electronic vapor device at 2440. The method 2400 can further comprise transmitting, by the electronic vapor device, data to the electronic communication device via the input/output port coupling, wherein the electronic communication device further transmits the data to a remote server. The data can comprise usage data.

The method 2400 can further comprise receiving, by the electronic vapor device, an instruction from the electronic communication device via the input/output port coupling, wherein the instruction was received by the electronic communication device from the remote server in response to the usage data.

The methods disclosed may include any one or more of additional operations of any other method in any operable order. Each of these additional operations is not necessarily performed in every embodiment of the method, and the presence of any one operation does not necessarily require that any other additional operations also be performed.

In view of the exemplary systems described supra, methodologies that can be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks can be required to implement the methodologies described herein. Additionally, it should be further appreciated that the methodologies disclosed herein are capable of being stored on an article of manufacture to facilitate transporting and transferring such methodologies to computers.

Those of skill would further appreciate that the various illustrative logical blocks, modules, circuits, and algorithm steps described in connection with the aspects disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component can be localized on one computer and/or distributed between two or more computers.

As used herein, a "vapor" includes mixtures of a carrier gas or gaseous mixture (for example, air) with any one or more of a dissolved gas, suspended solid particles, or suspended liquid droplets, wherein a substantial fraction of the particles or droplets if present are characterized by an average diameter of not greater than three microns. As used herein, an "aerosol" has the same meaning as "vapor," except for requiring the presence of at least one of particles or droplets. A substantial fraction means 10% or greater; however, it should be appreciated that higher fractions of small (<3 micron) particles or droplets can be desirable, up to and including 100%. It should further be appreciated that, to simulate smoke, average particle or droplet size can be less than three microns, for example, can be less than one micron with particles or droplets distributed in the range of 0.01 to 1 micron. A vaporizer may include any device or assembly that produces a vapor or aerosol from a carrier gas or gaseous mixture and at least one vaporizable material. An aerosolizer is a species of vaporizer, and as such is included in the meaning of vaporizer as used herein, except where specifically disclaimed.

Various aspects presented in terms of systems can comprise a number of components, modules, and the like. It is to be understood and appreciated that the various systems may include additional components, modules, etc. and/or may not include all of the components, modules, etc. discussed in connection with the figures. A combination of these approaches can also be used.

In addition, the various illustrative logical blocks, modules, and circuits described in connection with certain aspects disclosed herein can be implemented or performed with a general purpose processor, a digital signal processor (DSP), an application specific integrated circuit (ASIC), afield programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein can be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor can read information from, and write information to, the storage medium. In the alternative, the storage medium can be integral to the processor. The processor and the storage medium may reside in an ASIC or may reside as discrete components in another device.

Furthermore, the one or more versions can be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices e.g., card, stick). Those skilled in the art will recognize many modifications can be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein can be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. An electronic vapor device comprising:
   a processor operable for controlling the electronic vaporizer device;
   at least one container for storing a vaporizable material;
   a vaporizer component operatively coupled to the processor and controlled in part by the processor, wherein the vaporizer component is in fluid communication with the at least one container for receiving at least a portion of the vaporizable material therefrom, wherein the vaporizer component is operable to vaporize the vaporizable material received therein;
   at least one vapor outlet coupled to the vaporizing component and configured to receive vapor generated by the vaporizing component, the at least one vapor outlet operable to expel the generated vapor from the vapor device;
   an input/output connector operatively coupled to the processor and configured to operatively connect the processor to an associated electronic communication device, wherein the input/output connector is operable to receive a plurality of commands generated by the associated electronic communication device for controlling at least one operation of the electronic vapor device, and to transmit the plurality of received commands to the processor for controlling at least one operation of the electronic vapor device;
   at least one power source operatively coupled to the vaporizer component, wherein the at least one power source is operable to generate a supply of power for operation of at least the vaporizer component; and
   a power input port operatively connected to the at least one power source and configured to connect with a power output port of the associated electronic communication device, wherein the power input port is operable to receive at least a portion of a supply of power generated by a power source of the associated electronic communication device.

2. The electronic vapor device of claim 1, further comprising: a power control component operatively coupled to the processor and controlled in part by the processor, wherein the power control component is operatively coupled to the at least one power source and is operable to regulate a generated supply of power provided to the vaporizer component in response to at least one command received from the associated electronic communication device.

3. The electronic vapor device of claim 1, wherein the at least one power source is selected from the group of power sources consisting of at least one of: a battery source, a connection to an electrical power source, and combinations thereof.

4. The electronic vapor device of claim 3 wherein the battery source is selected from the group of battery sources consisting of at least one of: lithium-ion batteries, thin film lithium-ion batteries, lithium-ion polymer batteries, nickel-cadmium batteries, nickel metal hydride batteries, lead-acid batteries, and combinations thereof.

5. The electronic vapor device of claim 1, wherein the input/output connector is selected from the group of connectors consisting of: a Universal Serial Bus (USB) port, a micro-USB port, a mini-USB port, a lightening port, a dock connector, and a wireless charging area.

6. The electronic vapor device of claim 1, wherein the associated electronic communication device is selected from the group of electronic communication devices consisting of: a portable computing device, a smartphone, a mobile phone, a music player, and an electronic gaming device.

7. The electronic vapor device of claim 1, wherein the plurality of received commands comprises at least one of: a command for controlling an amount of vaporizable material to be vaporized by the vaporizer component, a command for controlling an amount of generated vapor to be expelled from the vapor outlet, a command for controlling a timing for vaporizing an amount of vaporizable material, and combinations thereof.

8. The electronic vapor device of claim 1, further comprising: a memory device coupled to the processor, wherein the processor is further operable to generate vaporization data indicating a quantity of the vaporizable material consumed by the vaporizer component in a defined period of time, and to save the generated vaporization data in the memory device.

9. The electronic vapor device of claim 8, wherein the processor is further operable to associate the generated vaporization data with at least one associated user and transmit at least a portion of the generated vaporization data associated with at least one user to the associated electronic communication device via the input/output connector for further processing thereof.

10. A system for operating an electronic vapor device in conjunction with an electronic communication device comprising:
   an electronic vapor device comprising:
      a first processor operable for controlling the electronic vaporizing device, at least one container configured to store a vaporizable material, a vaporizer component operatively coupled to the first processor and controlled in part by the first processor, wherein the vaporizer component is in fluid communication with the at least one container for receiving at least a portion of the vaporizable material therefrom, wherein the vaporizer component is operable to vaporize the vaporizable material received therein, at least one vapor outlet coupled to the vaporizer component and configured to receive a vapor generated by the vaporizer component, the at least one vapor outlet operable to expel the generated vapor from the vapor device, an input/output connector operatively coupled to the first processor and configured to operatively connect the first processor to the electronic communication device, wherein the input/output connector is operable to receive a plurality of commands from the electronic communication device for controlling at least one operation of the electronic vapor device and to transmit the plurality of commands to the processor for controlling at least one operation of the electronic vapor device, at least one vaporizer power source operatively coupled to the vaporizer component, wherein the at least one vaporizer power source is operable to generate a supply of vaporizer power for operation of at least the vaporizer component, and a power input port operatively connected to the at least one vaporizer power source and configured to connect with a power output port of the electronic communication device, wherein the power input port is operable to receive at least a portion of a supply of external power generated by a power source of the electronic communication device; and the electronic communication device comprising, a second processor operable for controlling the electronic communication device, wherein the second processor is further operable to generate the plurality of commands for controlling at least one operation of the electronic vapor device, an input/output port operatively coupled to the first processor of the electronic vapor device and configured to transmit the plurality of commands to the electronic vapor device, the power source of the electronic communication device operatively connected to the second processor and operable to generate the external supply of power for operation of at least the electronic communication device, and the power output port operatively coupled to the power source of the electronic communication device and configured to connect to the electronic vapor device, wherein the power output port is operable to provide at least a portion of the supply of external power to the electronic vapor device.

11. The system of claim 10, wherein the electronic vapor device further comprises a power control component operatively coupled to the first processor and controlled in part by the first processor, wherein the power control component is operatively coupled to the at least one vaporizer power source and operable to regulate the supply of vaporizer power provided to the vaporizer component in response to at least one of the plurality of commands received from the electronic communication device.

12. The system of claim 11, wherein the supply of vaporizer power provided to the electronic vapor device is used for at least one of operating the electronic vapor device, charging a rechargeable power source of electronic vapor device, and combinations thereof.

13. The system of claim 10, wherein the plurality of commands comprises at least one of: a command for controlling an amount of vaporizable material to be vaporized by the vaporizer component, a command for controlling an amount of generated vapor to be expelled from the vapor outlet, a command for controlling a timing for vaporizing an amount of vaporizable material, and combinations thereof.

14. The system of claim 10, wherein the electronic vapor device further comprises a memory device coupled to the first processor, wherein the first processor is further operable to generate vaporization data indicating a quantity of the vaporizable material consumed by the vaporizer component in a defined period of time, and to save the vaporization data in the memory device.

15. The system of claim 14, wherein the first processor is further operable to associate the vaporization data with at least one associated user and transmit at least a portion of the vaporization data associated with at least one user to the electronic communication device via the input/output connector for further processing thereof.

16. A method of operating an electronic vapor device in conjunction with an electronic communication device, wherein (a) the electronic vapor device comprises a vaporizer component operable to vaporize a plurality of materials received therein and expel a generated vapor from the electronic vapor device, a vaporizer source operatively coupled to the vaporizer component, a power control component operatively coupled to at least one vaporizer power source and operable to regulate a supply of power provided to the vaporizer component, a power input port operatively connected to the at least one vaporizer power source and configured to connect with a power output port of the electronic communication device, wherein the power input port is operable to receive at least a portion of a supply of external power generated by a power source of the electronic communication device, and (b) the electronic communication device comprises a processor operable to generate a plurality of commands for controlling at least one operation of the electronic vapor device, the power source of the electronic communication device, and a power output port operable to provide at least a portion of the supply of external power to the electronic vapor device, the method comprising the steps:

receiving by the electronic vapor device at least one of the plurality of commands from the electronic communication device to activate at least one of the at least one operation of the electronic vapor device;

determining an amount of power required by the electronic vapor device to perform the at least one of the at least one operation in accordance with at least one of the plurality of commands;

generating at least the amount of power required by the electronic vapor device to perform the at least one of the at least one operation, from at least one of the vaporizer power source and the power source of the electronic communication device; and activating the electronic vapor device in accordance with the at least one of the plurality of commands.

17. The method of claim 16, wherein the plurality of commands comprises at least one of: a command for controlling an amount of vaporizable material to be vaporized by the vaporizer component, a command for controlling an amount of generated vapor to be expelled from the vapor outlet, a command for controlling a timing for vaporizing an amount of vaporizable material, and combinations thereof.

18. The method of claim 16, further comprising the steps: receiving a plurality of power provision parameters from an associated user via at least one input/output interface, for the provision of at least a portion of the at least the amount of power required by the electronic vapor device to perform the at least one of the at least one operation.

19. The method of claim 16, further comprising the steps: generating vaporization data indicating a quantity of the vaporizable material consumed by the vaporizer component in a defined period of time and saving the vaporization data to an associated memory device.

20. The method of claim 19, further comprising the steps: associating the vaporization data with at least one associated user and transmitting at least a portion of the vaporization data associated with at least one user to a remote server for further processing thereof.

* * * * *